Feb. 5, 1952  M. M. GOLDBERG  2,584,864
ACCOUNTING MACHINE
Filed Nov. 2, 1946  19 Sheets-Sheet 1

Inventor
MAXIMILIAN M. GOLDBERG
By Carl Benst
His Attorney

Feb. 5, 1952     M. M. GOLDBERG     2,584,864
ACCOUNTING MACHINE
Filed Nov. 2, 1946     19 Sheets—Sheet 2
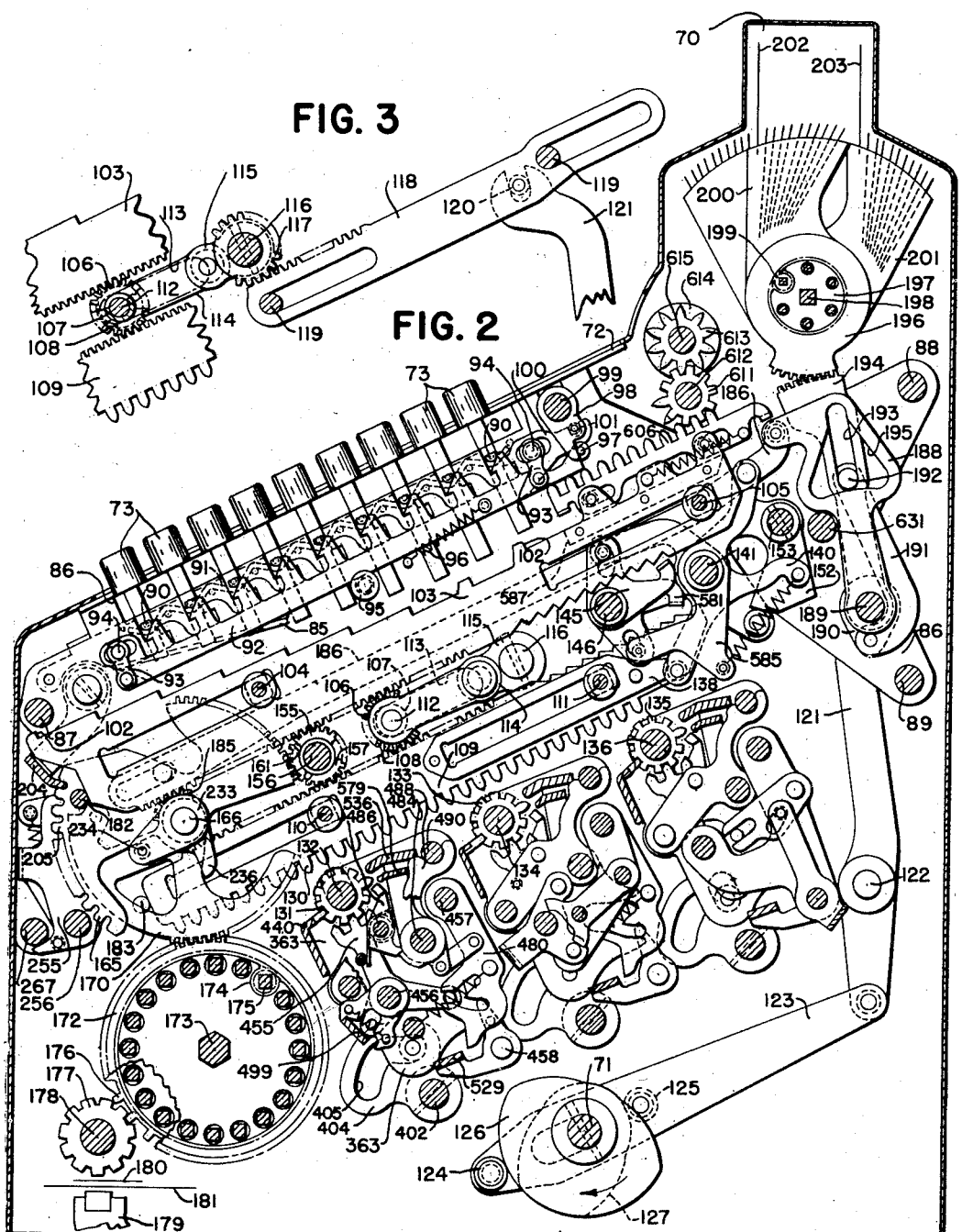
Inventor
MAXIMILIAN M. GOLDBERG
By *Earl Bennett*
His Attorney

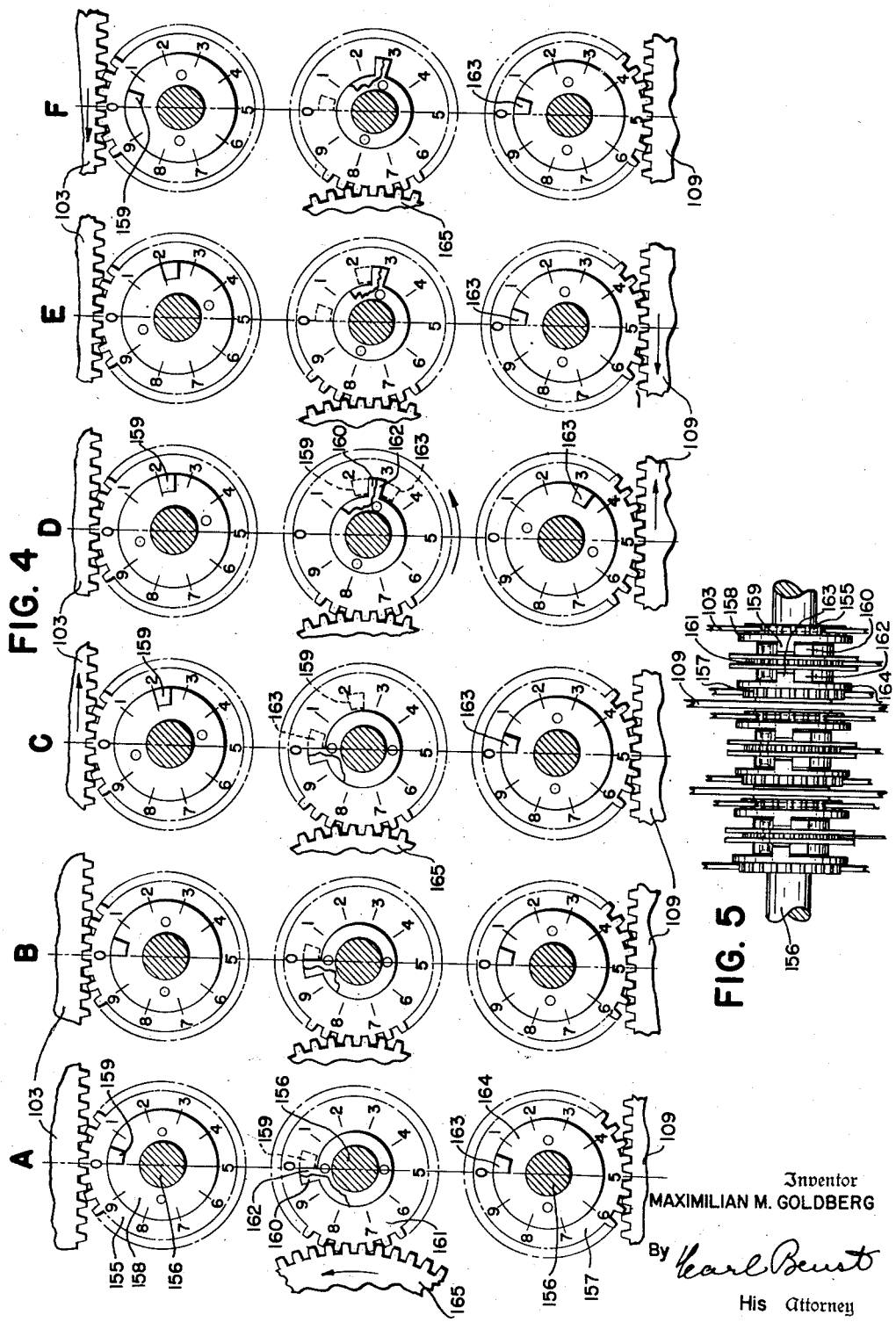

Feb. 5, 1952  M. M. GOLDBERG  2,584,864
ACCOUNTING MACHINE
Filed Nov. 2, 1946  19 Sheets-Sheet 4

Inventor
MAXIMILIAN M. GOLDBERG
By Carl Benst
His Attorney

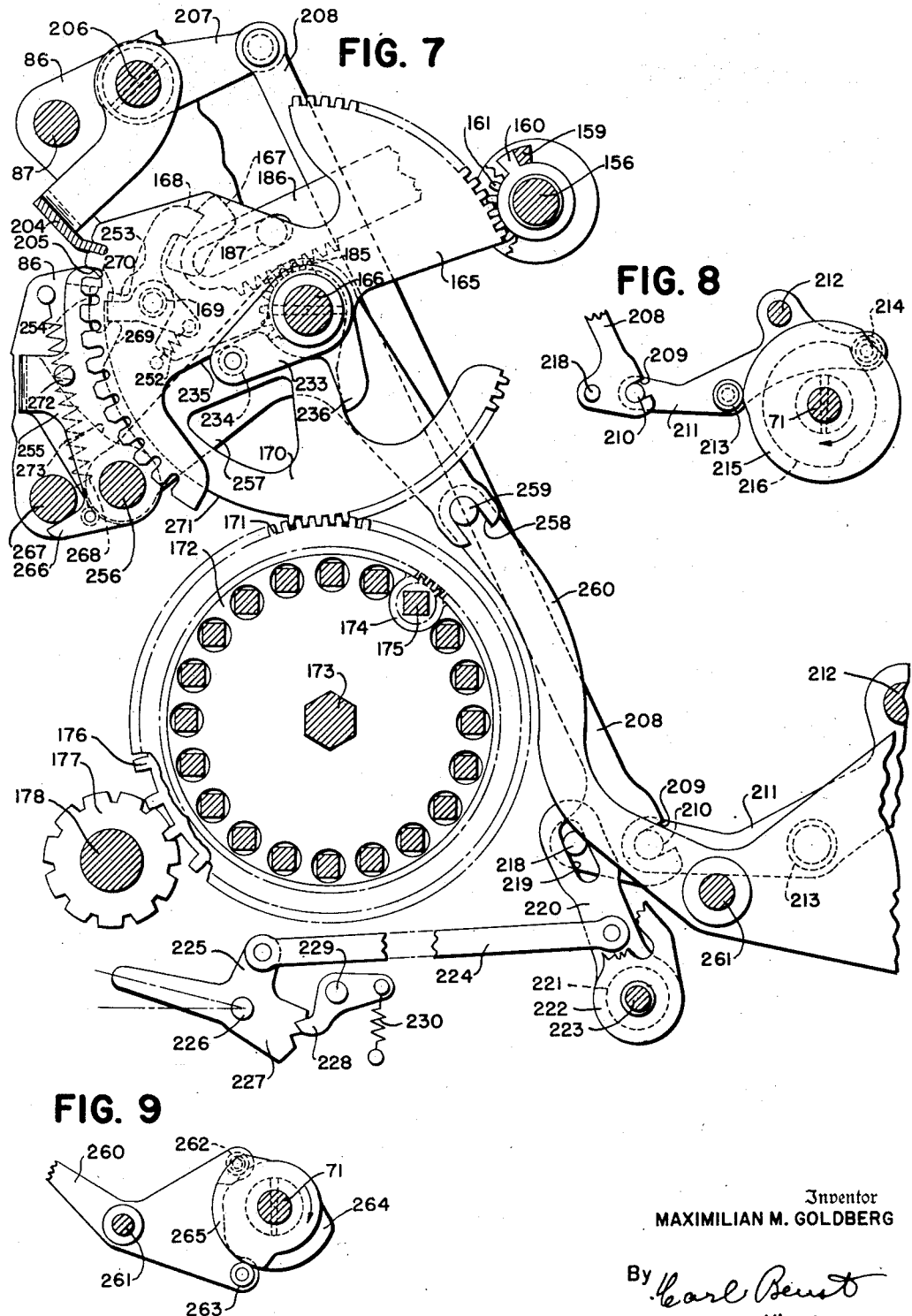

Feb. 5, 1952 M. M. GOLDBERG 2,584,864
ACCOUNTING MACHINE
Filed Nov. 2, 1946

Inventor
MAXIMILIAN M. GOLDBERG
By Carl Benst
His Attorney

Feb. 5, 1952 M. M. GOLDBERG 2,584,864
ACCOUNTING MACHINE
Filed Nov. 2, 1946 19 Sheets-Sheet 7
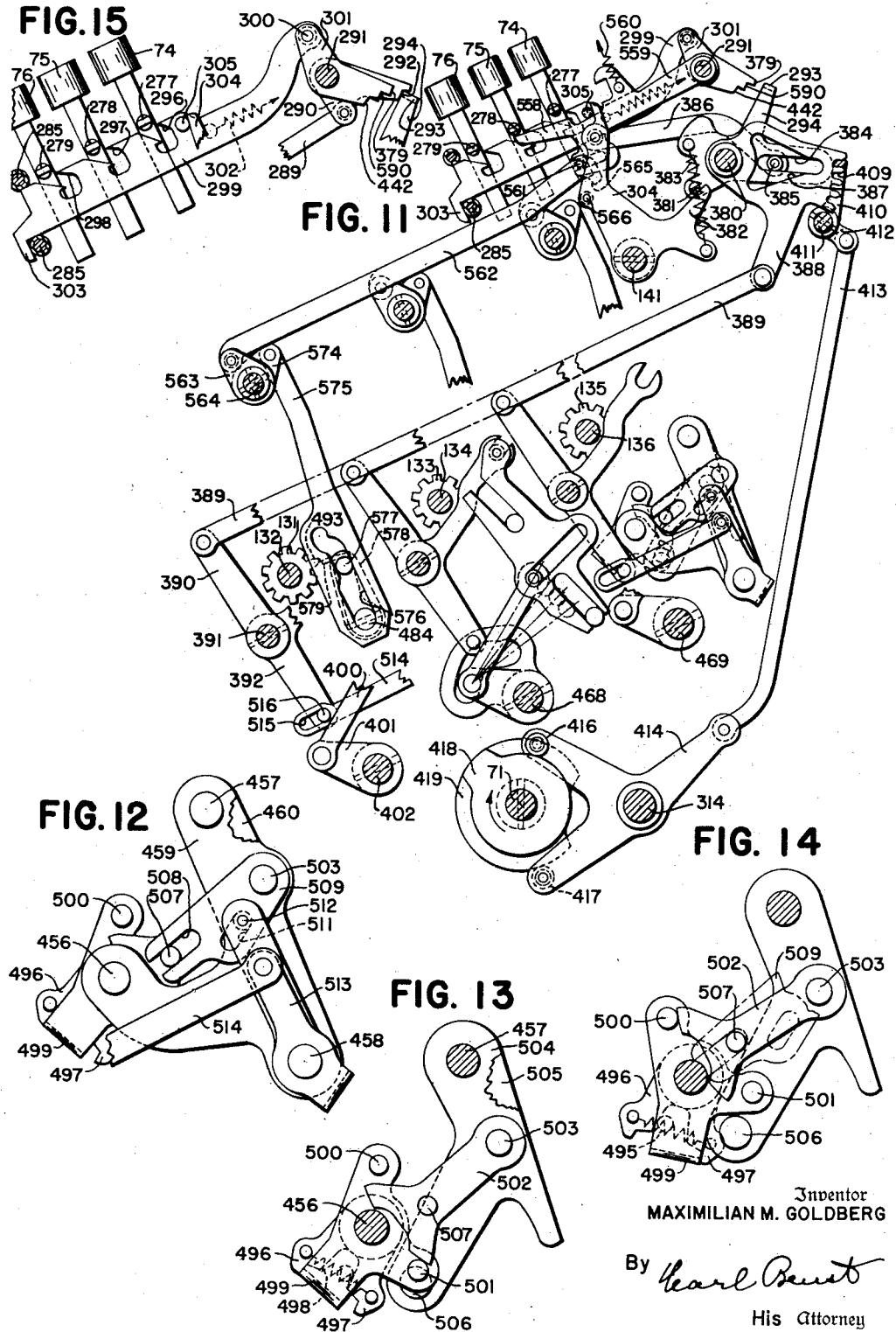
Inventor
MAXIMILIAN M. GOLDBERG
By Pearl Brust
His Attorney Feb. 5, 1952  M. M. GOLDBERG  2,584,864
ACCOUNTING MACHINE
Filed Nov. 2, 1946  19 Sheets-Sheet 8

Inventor
MAXIMILIAN M. GOLDBERG
By Carl Bernt
His Attorney

Feb. 5, 1952     M. M. GOLDBERG     2,584,864
ACCOUNTING MACHINE
Filed Nov. 2, 1946     19 Sheets-Sheet 9
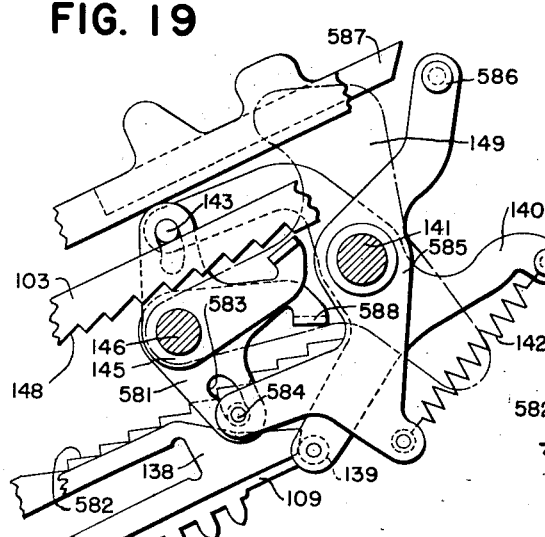
FIG. 19
FIG. 20
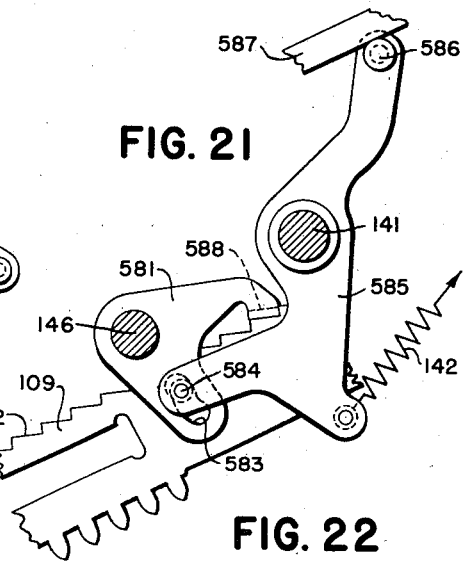
FIG. 21
FIG. 22
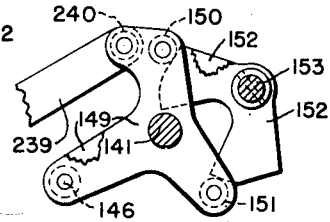
FIG. 23
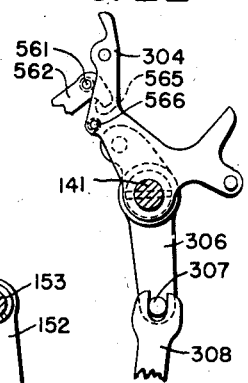
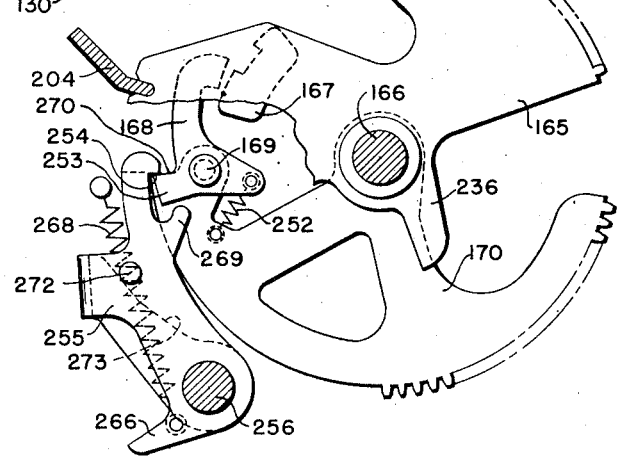
FIG. 25
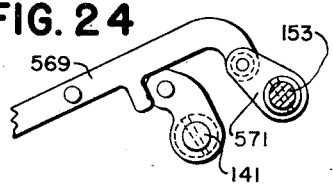
FIG. 24
Inventor
MAXIMILIAN M. GOLDBERG
By *Earl Benst*
His Attorney Feb. 5, 1952

M. M. GOLDBERG 2,584,864

ACCOUNTING MACHINE

Filed Nov. 2, 1946

Inventor
MAXIMILIAN M. GOLDBERG

By Earl Beust

His Attorney

Feb. 5, 1952 — M. M. GOLDBERG — 2,584,864
ACCOUNTING MACHINE
Filed Nov. 2, 1946 — 19 Sheets-Sheet 11

Inventor
MAXIMILIAN M. GOLDBERG

By Carl Benst
His Attorney

Feb. 5, 1952        M. M. GOLDBERG        2,584,864
ACCOUNTING MACHINE
Filed Nov. 2, 1946        19 Sheets-Sheet 12
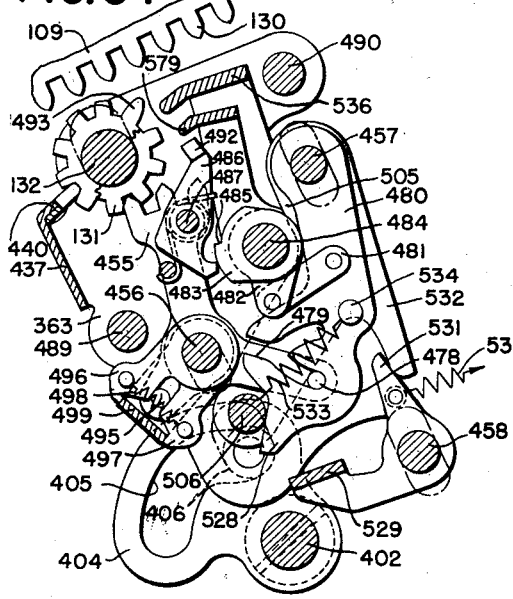
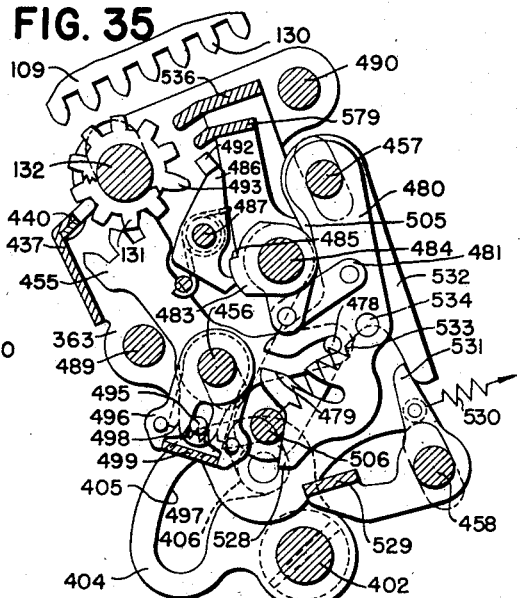
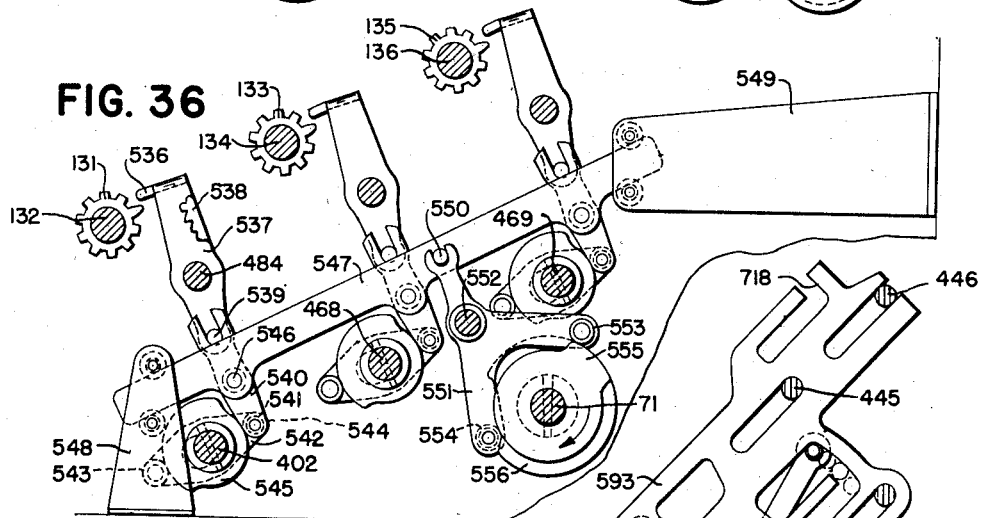
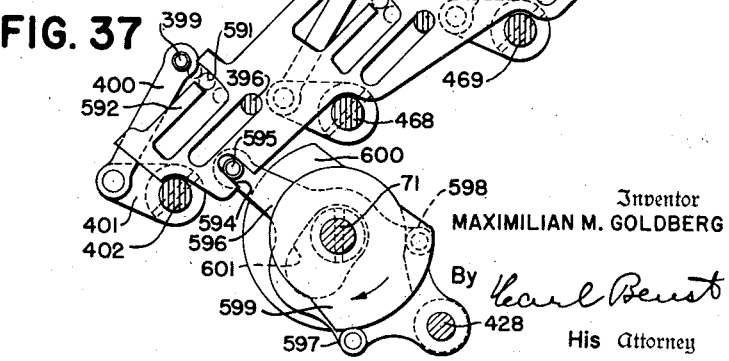
Inventor
MAXIMILIAN M. GOLDBERG
By
His Attorney Feb. 5, 1952      M. M. GOLDBERG      2,584,864
ACCOUNTING MACHINE Filed Nov. 2, 1946      19 Sheets-Sheet 13

Inventor
MAXIMILIAN M. GOLDBERG
By Karl Beust
His Attorney

Feb. 5, 1952      M. M. GOLDBERG      2,584,864
ACCOUNTING MACHINE

Filed Nov. 2, 1946      19 Sheets-Sheet 14

Inventor
MAXIMILIAN M. GOLDBERG

By Karl Beust

His Attorney

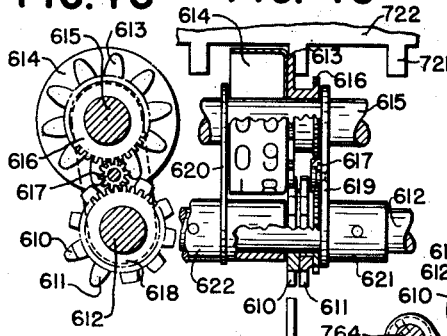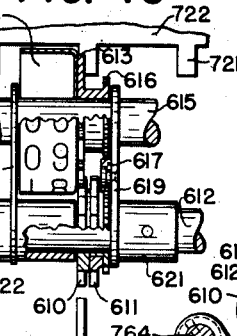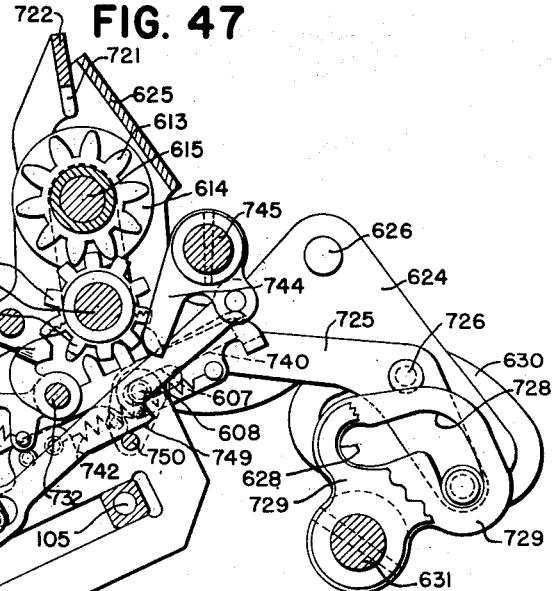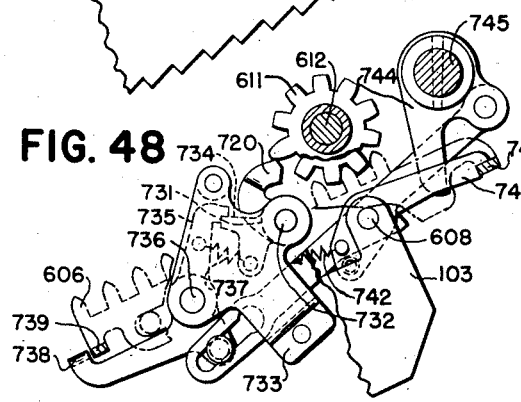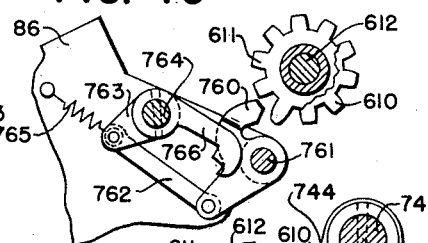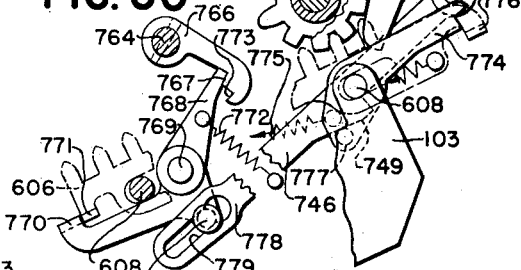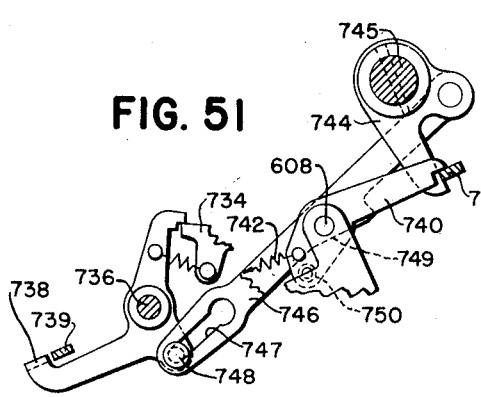

Feb. 5, 1952 — M. M. GOLDBERG — 2,584,864
ACCOUNTING MACHINE
Filed Nov. 2, 1946 — 19 Sheets-Sheet 16
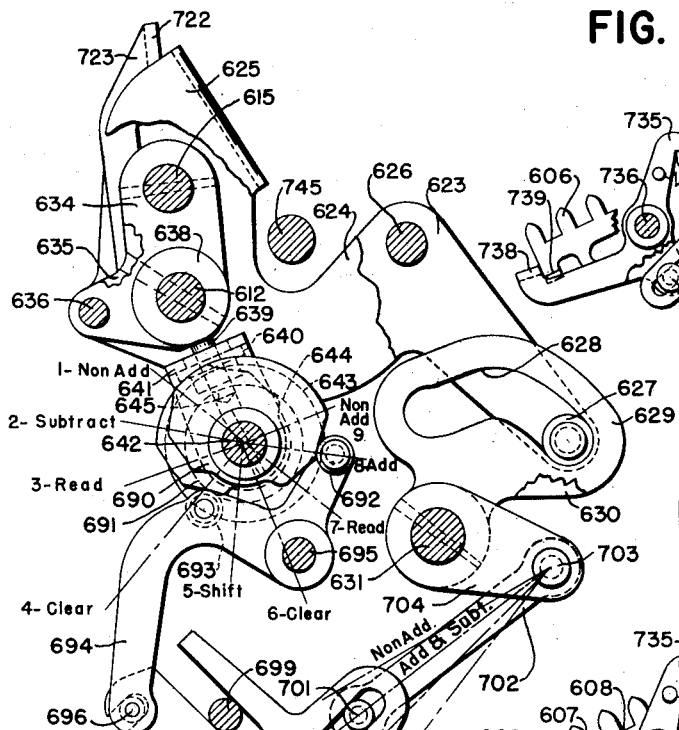
FIG. 52
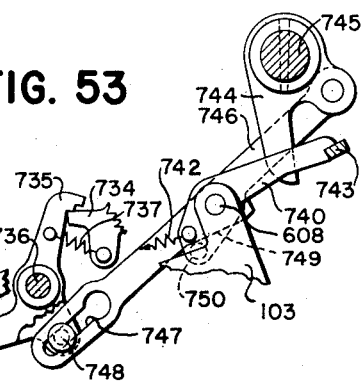
FIG. 53
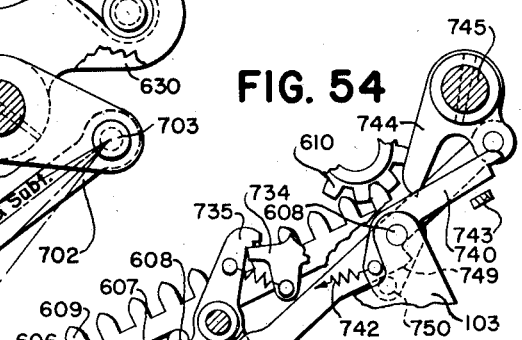
FIG. 54
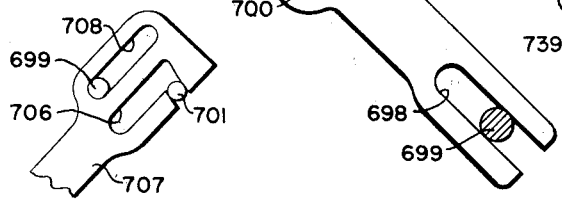
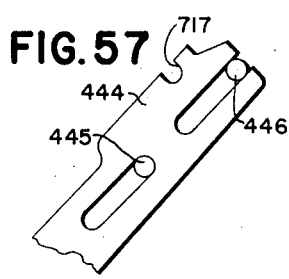
FIG. 56
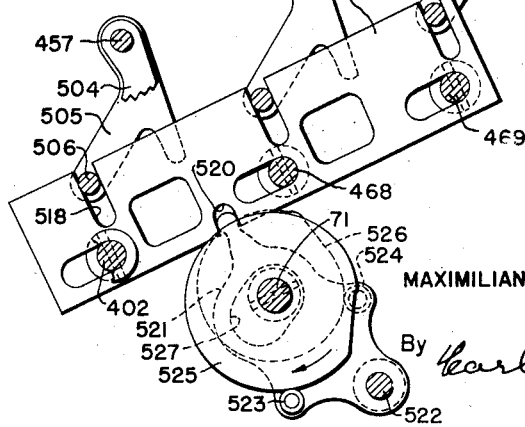
FIG. 55
FIG. 57
Inventor
MAXIMILIAN M. GOLDBERG
By Earl Beust
His Attorney Patented Feb. 5, 1952

2,584,864

UNITED STATES PATENT OFFICE 2,584,864

ACCOUNTING MACHINE

Maximilian M. Goldberg, Dayton, Ohio, assignor to The National Cash Register Company, Dayton, Ohio, a corporation of Maryland Application November 2, 1946, Serial No. 707,360

28 Claims. (Cl. 235—2)

The present invention relates to cash registers and accounting or bookkeeping machines and is particularly directed to the differential mechanisms and the totalizer mechanisms of such machines.

The main object of the present invention is the provision of an accounting machine having various unique features which make it easily adaptable to various business systems, the arrangement and the construction of the parts of said machine making for the economical manufacturing and assembling thereof and providing convenient and ready accessibility of the various units of the machine for the purpose of adjustment and/or repair in case these are desirable or necessary.

Another object is the provision of a novel differential mechanism for accounting machines.

A further object is to provide a novel differential mechanism having a novel zero elimination mechanism incorporated therein.

Another object of this invention is the provision of a differential mechanism having complementary movable members, one of which is positioned under influence of the amount keys and the other of which is positioned under influence of the said one member and in turn is directly engaged by the wheels of the selected totalizer or totalizers for the purpose of actuating same.

Still another object is the provision of a differential mechanism having complementary positionable members, one of which is positioned under influence of the corresponding depressed amount key and the other of which is positioned by the said one member, the differential setting of said members being transmitted through a unique driving mechanism to the corresponding recording and indicating mechanisms.

A further object of the present invention is the provision of a differential mechanism having a primary member which is positioned under influence of the corresponding depressed amount key, and having a secondary member which is positioned by the primary member, said secondary member in turn positioning a printer operating segment which simultaneously positions a corresponding type carrier and indicator in accordance with the value of the depressed key, said segment, said type carrier, and said indicator remaining in set positions at the end of machine operation.

Still another object is the provision of a differential mechanism having a primary member which is positioned under influence of the corresponding depressed amount key and having a secondary member which is positioned by the primary member, said secondary member actuating the corresponding totalizer wheels and likewise positioning the corresponding type carriers and corresponding indicators in accordance with the positioning thereof.

Another object is to provide novel means to repeat the amount of a previous operation without foreknowledge that such amount is to be repeated.

A further object is the provision of means controllable prior to an operation to repeat the amount of the previous operation without foreknowledge that such amount is to be repeated.

Another object is to provide means to repeat the amount of a previous operation without foreknowledge of such repetition, said means including differential mechanism and means positioned by said differential mechanism in one operation and controllable by choice prior to a succeeding operation to in turn position the differential mechanism in said succeeding operation.

Another object of the present invention is to provide a novel balance or auxiliary totalizer which is actuated by the complementary differential members and which may be used in connection with the other totalizers for the solving of accounting problems in connection with various business systems.

Another object of the present invention is to provide a balance totalizer with a novel tens transfer mechanism.

A further object is to provide an accounting machine having differential members connected for complementary movement, one of said members being positioned by the value-entering elements of the machine to the complement of the true value, and the other of said elements being positioned to the true value by said first element, with a novel balance totalizer actuated by said one differential member.

Another object is to provide a balance totalizer in which the complement of the true value is received from the value-entering elements, transposed to the true value, and registered and recorded as such by said balance totalizer.

A further object of the present invention is to provide a balance totalizer which is actuated by a differential member which is positioned to the complement of the true value by the value-entering elements, said balance totalizer arranged to transpose said complement to the true value and register and record it.

Still another object is the provision of a balance totalizer to receive complementary values, transpose them to true values, and register and record said true values.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In said drawings:

Fig. 2 is a cross-sectional view of the machine taken just to the right of one of the amount banks.

Fig. 3 is a detail view of the differential driving mechanism for one of the amount banks.

Fig. 4 is a series of schematic views showing the functioning of the amount differential mechanisms in adding and subtracting operations.

Fig. 5 is a side-spacing view of a portion of the differential mechanisms for several amount banks.

Fig. 7 is a right side elevation of a portion of the differential mechanism for one amount bank and illustrates in particular the zero elimination mechanism and the repeat mechanism for said differential mechanism.

Fig. 8 is a detail view of the cam mechanism for operating the aliner for the differential mechanism shown in Fig. 7.

Fig. 9 is a detail view of the cam mechanism for operating the differential restoring mechanism shown in Fig. 7.

Fig. 11 is a right side elevation showing in detail the conditioning mechanism for one of the lines of totalizers.

Figs. 12, 13, and 14 are detail views of a portion of the transfer controlling mechanism for one of the transaction totalizer lines.

Fig. 15 is a detail view of a portion of the conditioning mechanism for one of the transaction totalizer lines.

Figure 16:
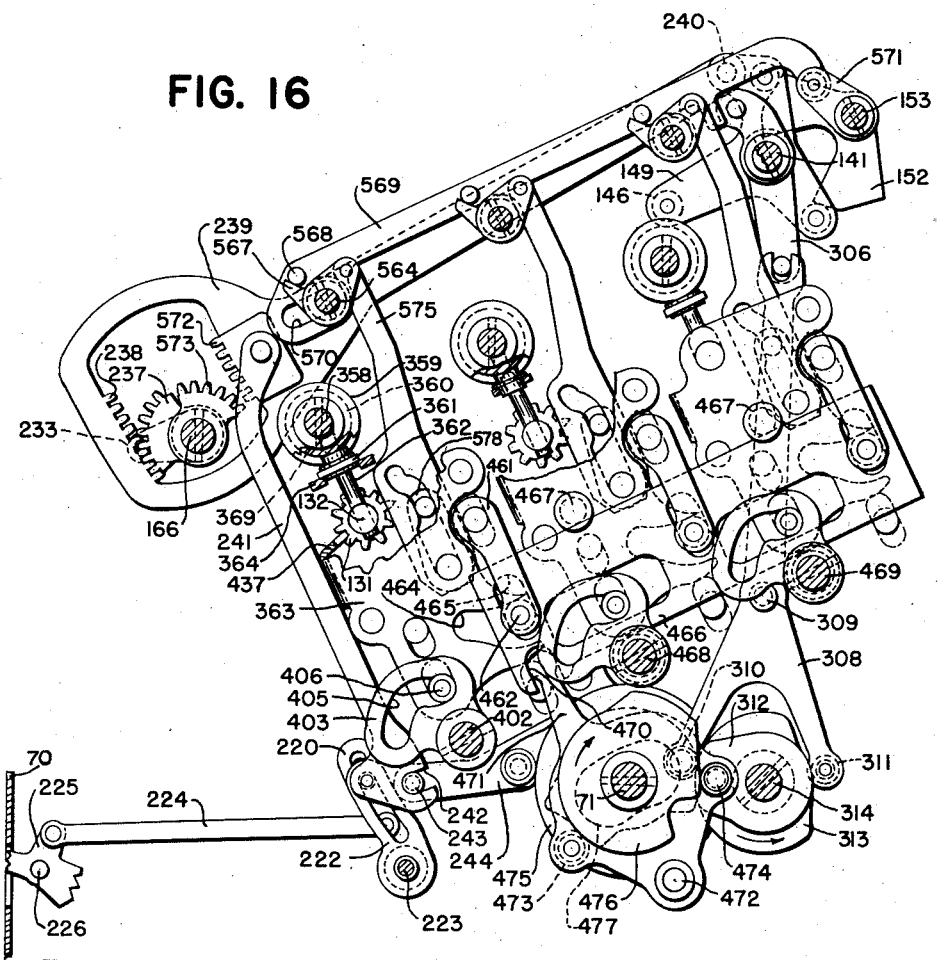

Fig. 16 is a right side elevation of the differential segment restoring mechanism and also shows a portion of the totalizer engaging mechanism.

Figures 17, 18:
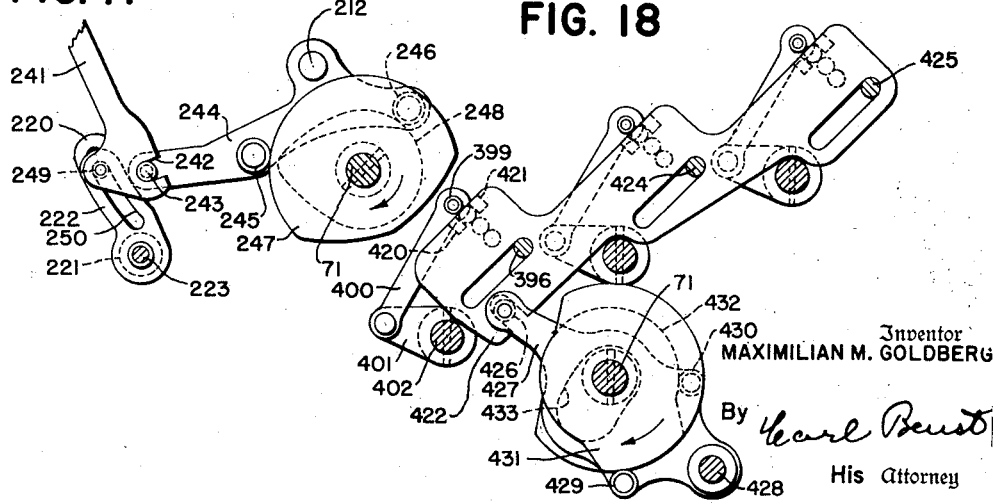

Fig. 17 is a detail view of the cams and associated mechanism for operating the differential segment restoring mechanism.

Fig. 18 is a detail view of the add-engaging mechanism for the three lines of transaction totalizers.

Fig. 19 is a detail view of the mechanism for retaining the differential members in set positions.

Fig. 20 is a detail view showing the mechanism for retaining the primary differential member in set position.

Fig. 21 is a detail view showing the mechanism for retaining the secondary differential member in set position.

Fig. 22 is a detail view of a portion of the total control mechanism for one of the totalizers.

Fig. 23 is a detail view of the cams and associated lever for shifting the differential member retaining mechanism.

Fig. 24 is a detail view of a portion of the mechanism for operating the mechanism shown in Fig. 23.

Fig. 25 is a detail vew showing the zero elimination mechanism of Fig. 7 as positioned at the end of machine operation.

Figs. 26, 27, 28, and 29 are detail end views, as observed from the right, showing in particular the shiftable framework for one of the transaction totalizers and the shiftable framework for the transfer mechanism for said totalizer in their different stages of movement during the engaging and disengaging of the selected set of totalizer wheels and the secondary differential members.

Figure 30:
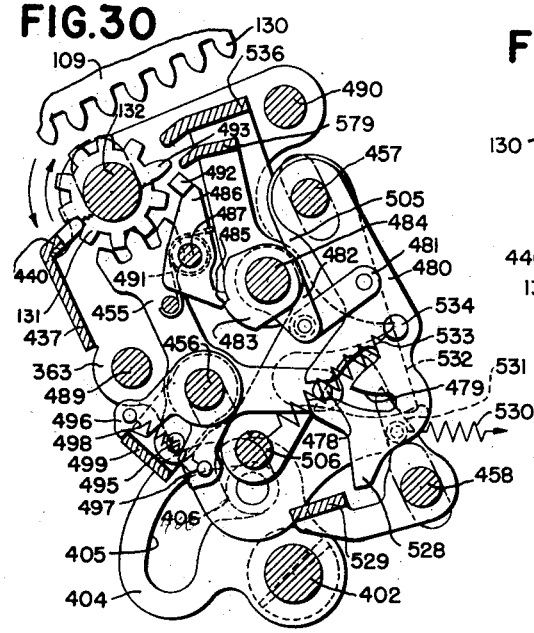

Fig. 30 is a cross-sectional view of one of the totalizers showing in detail the transfer restoring mechanism in normal or home position.

Figure 31:
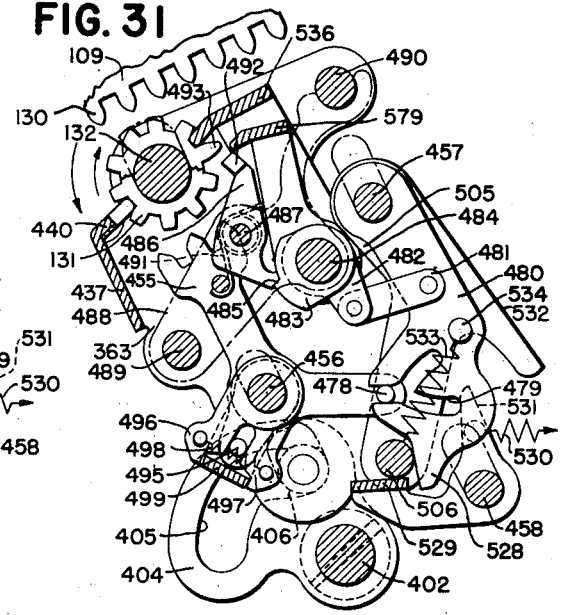

Fig. 31 is a view similar to Fig. 30, showing the transfer restoring mechanism in fully restored position, which occurs at the beginning of machine operation.

Figure 32:
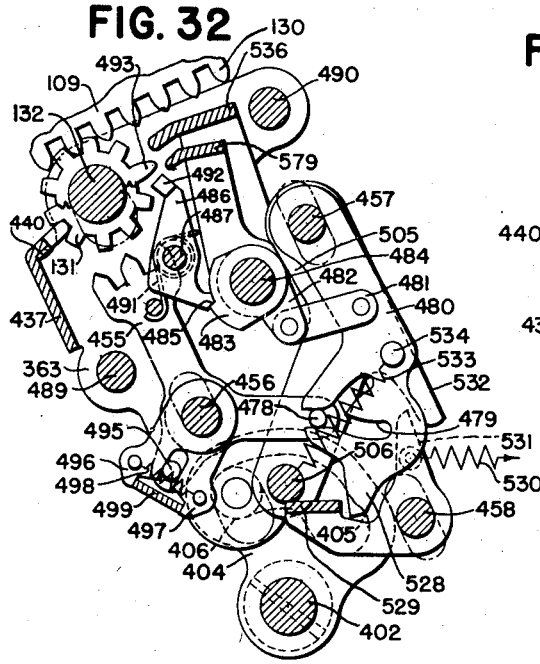

Fig. 32 is a view similar to Fig. 30, showing the transfer restoring mechanism in partially returned position and just prior to the tripping of the transfer mechanism.

Figure 33:
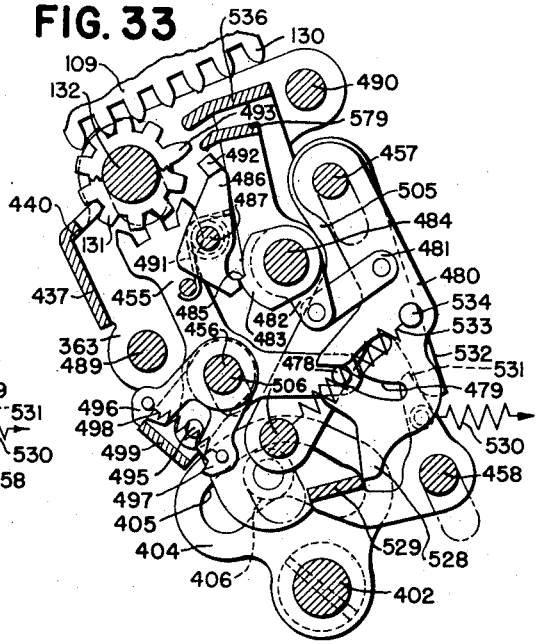

Fig. 33 is a view similar to Fig. 30, showing the transfer mechanism after it has been tripped by the long tooth on the corresponding totalizer wheel.

Fig. 34 is a cross-sectional view similar to Fig. 20, showing the transfer mechanism after it has operated in adding operations.

Fig. 35 is a view similar to Fig. 34, showing the operation of the transfer mechanism in subtracting operations.

Fig. 36 is a right side elevation showing the aliner mechanism for the three lines of transaction totalizers.

Fig. 37 is a right side elevation showing the mechanism for engaging and disengaging the three totalizers in reading operations.

Figure 38:
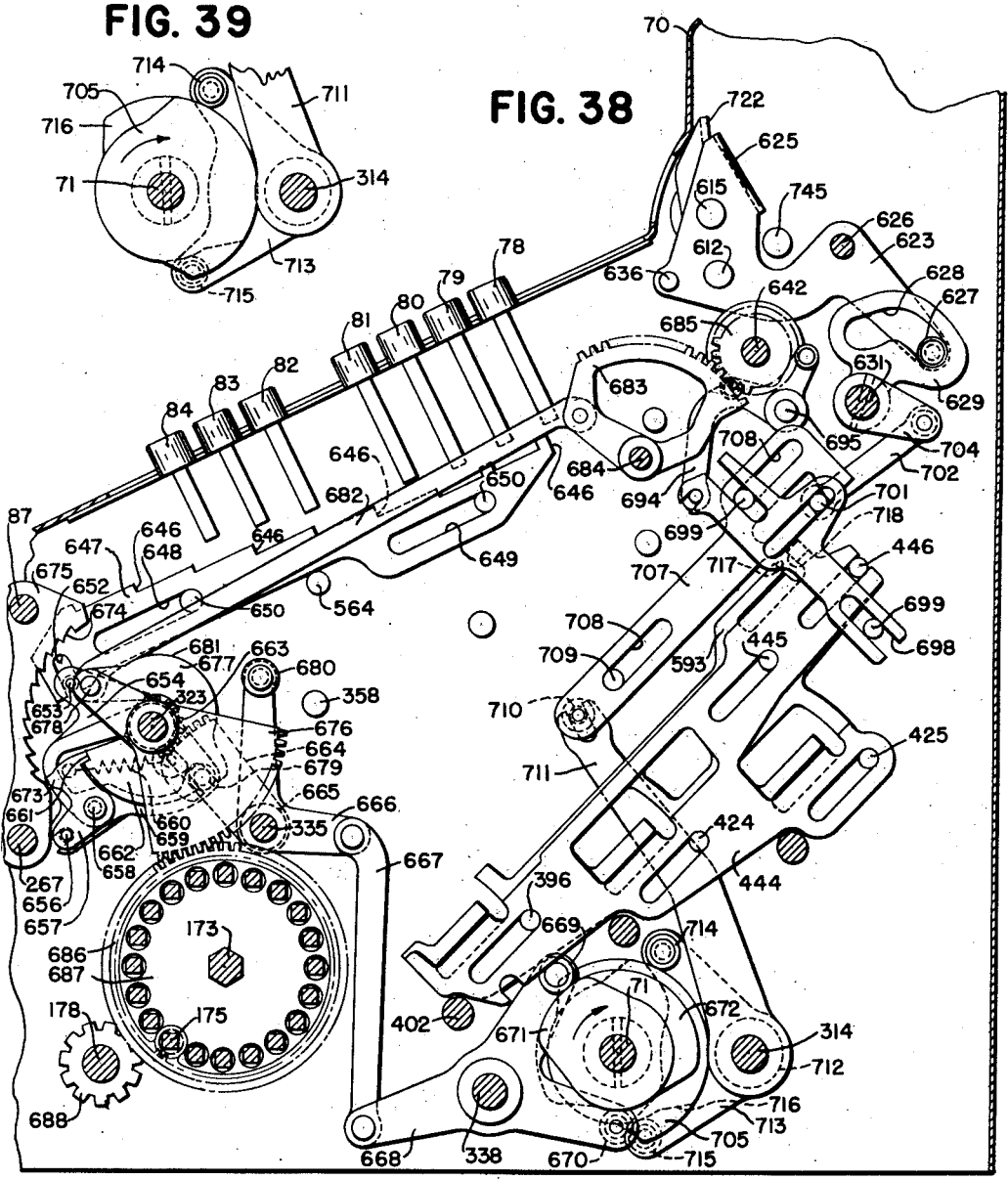

Fig. 38 is a right side elevation of the control keys and associated differential mechanism for the auxiliary or balance totalizer.

Figure 39:
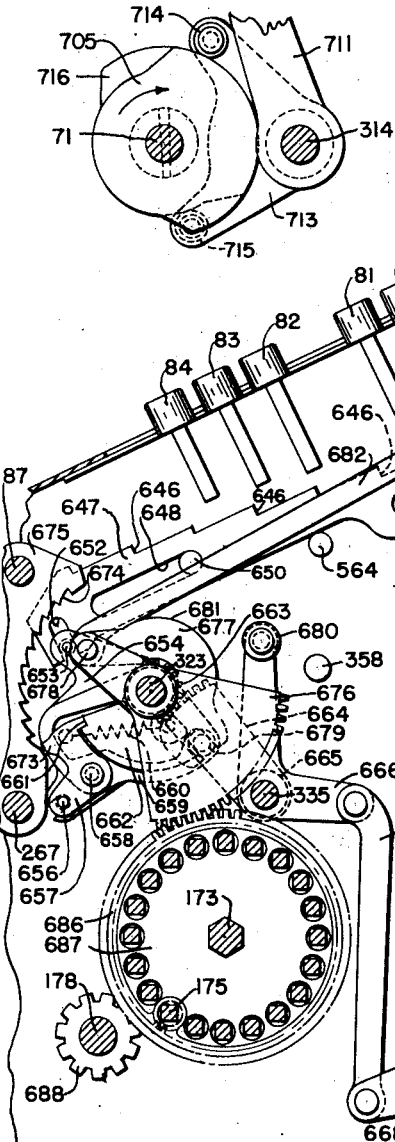

Fig. 39 is a detail view of the cam and associated mechanism for engaging and disengaging the auxiliary totalizer in adding operations.

Figure 40:
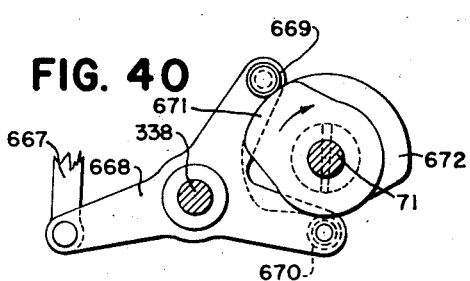

Fig. 40 is a detail view of the cam and associated mechanism for driving the differential mechanism for the control bank shown in Fig. 38.

Fig. 41 is a detail view of the differential mechanism for one of the control or transaction banks for one of the lines of transaction totalizers.

Fig. 42 is a diagrammatic view of the cam and associated mechanism for shifting the auxiliary totalizer laterally to aline the selected plus or minus wheels with the actuators.

Fig. 43 is a detail view of the aliner mechanism and the transfer restoring mechanism for the auxiliary totalizer.

Figure 10:
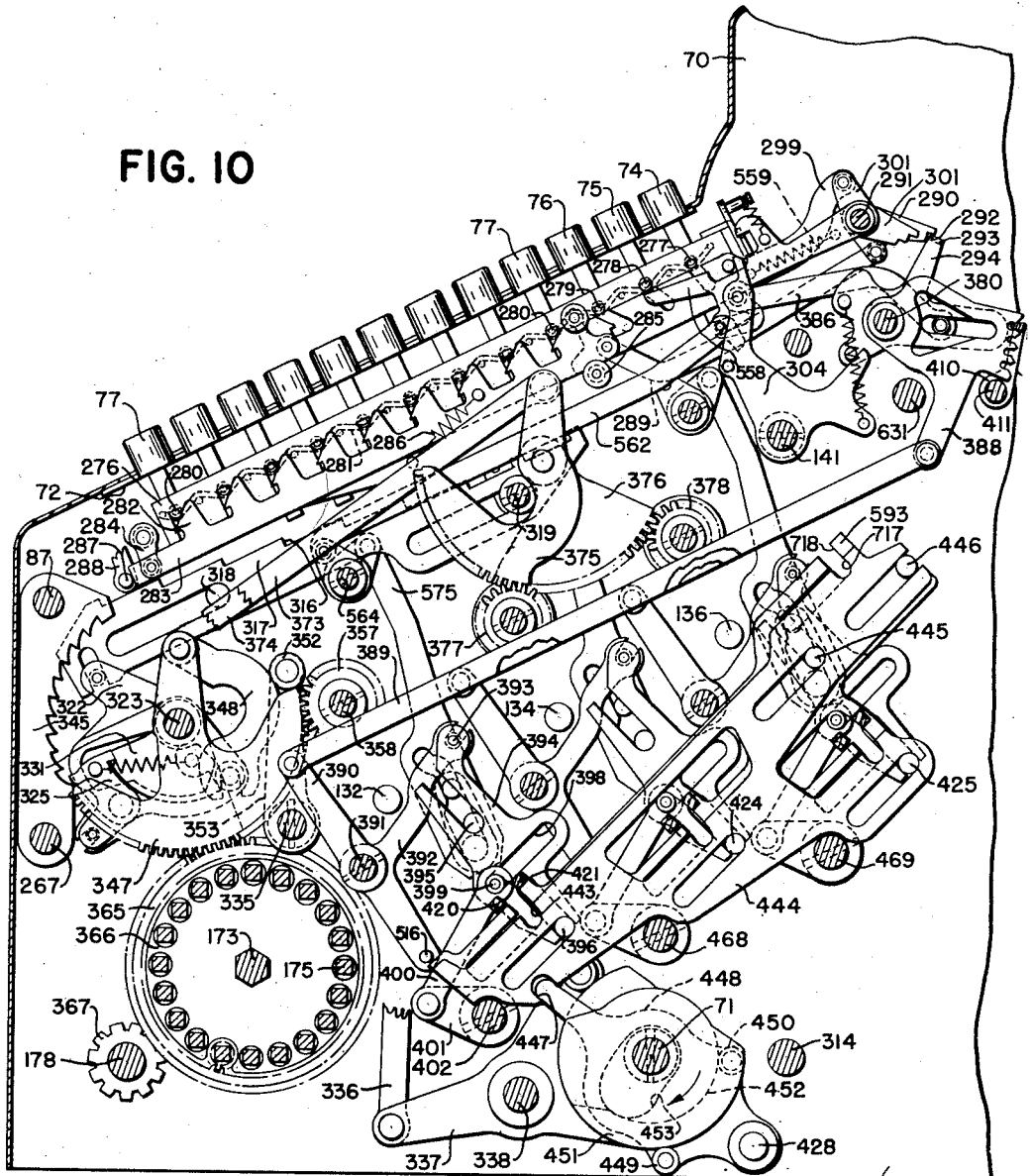
Fig. 10 is a right side elevation of the control bank and associated mechanism for one of the lines of transaction totalizers.

Fig. 44 is a detail view of the cams and associated mechanism for driving the differential mechanism for the totalizer control bank shown in Figs. 10 and 41.

Figs. 45 and 46 are, respectively, front and right side views of the plus and minus totalizer wheels and corresponding indicator wheel for one denominational order of the auxiliary totalizer.

Fig. 47 is a cross-sectional view of the auxiliary totalizer, showing in particular the operating connection between one denominational order and the corresponding primary differential member.

Fig. 48 is a detail view showing in particular the transfer mechanism for one order of the auxiliary totalizer.

Fig. 49 is a detail view showing the highest order totalizer wheels of the auxiliary totalizer and the "fugitive 1" mechanism associated therewith.

Fig. 50 is a detail view showing the lowest order wheels of the auxiliary totalizer and the "fugitive 1" mechanism associated therewith.

Fig. 51 is a detail view showing the transfer mechanism of one denominational order of the auxiliary totalizer in fully restored position, which is effected near the beginning of machine operations.

Fig. 52 is a cross-sectional view, showing in particular the engaging mechanism for the auxiliary or balance totalizer.

Fig. 53 is a detail view of the transfer mechanism for one denominational order of the auxiliary totalizer and shows said transfer mechanism just after it has been tripped by the adjacent lower order wheel.

Fig. 54 is a detail view showing the transfer mechanism for one order of the auxiliary totalizer and illustrates in particular the effecting of the transfer by relative movement of the auxiliary rack.

Fig. 55 is a right side elevation showing the mechanism for operating the transfer restoring means for the three transaction totalizer lines.

Fig. 56 is a detail view of a portion of the slide for engaging and disengaging the auxiliary totalizer in adding and subtracting operations.

Fig. 57 is a detail view of a portion of the plate for engaging and disengaging the auxiliary totalizer in clearing or resetting operations.

Figure 58:
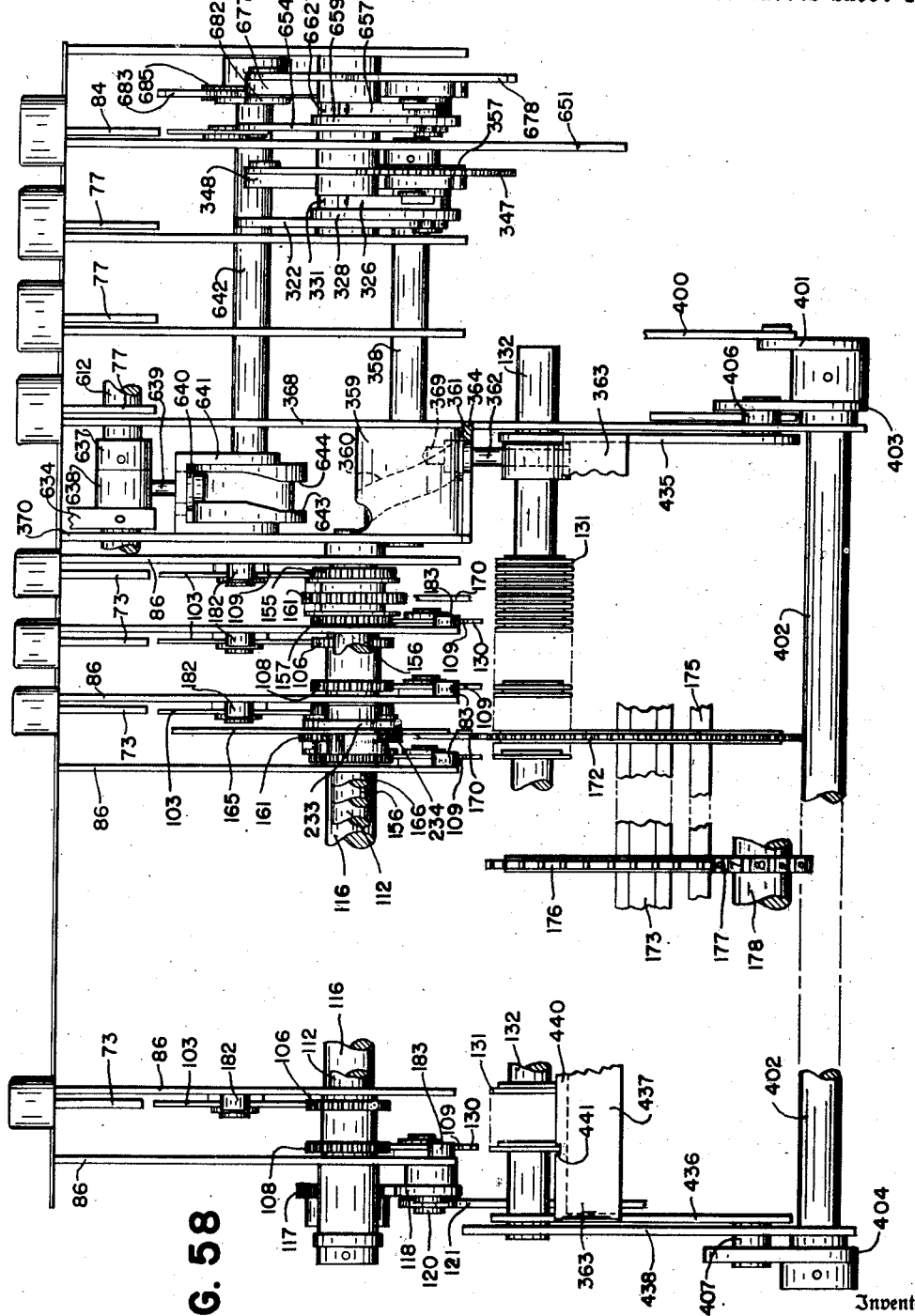

Fig. 58 is a general side-spacing view as observed from the front of the machine.

Figure 59:
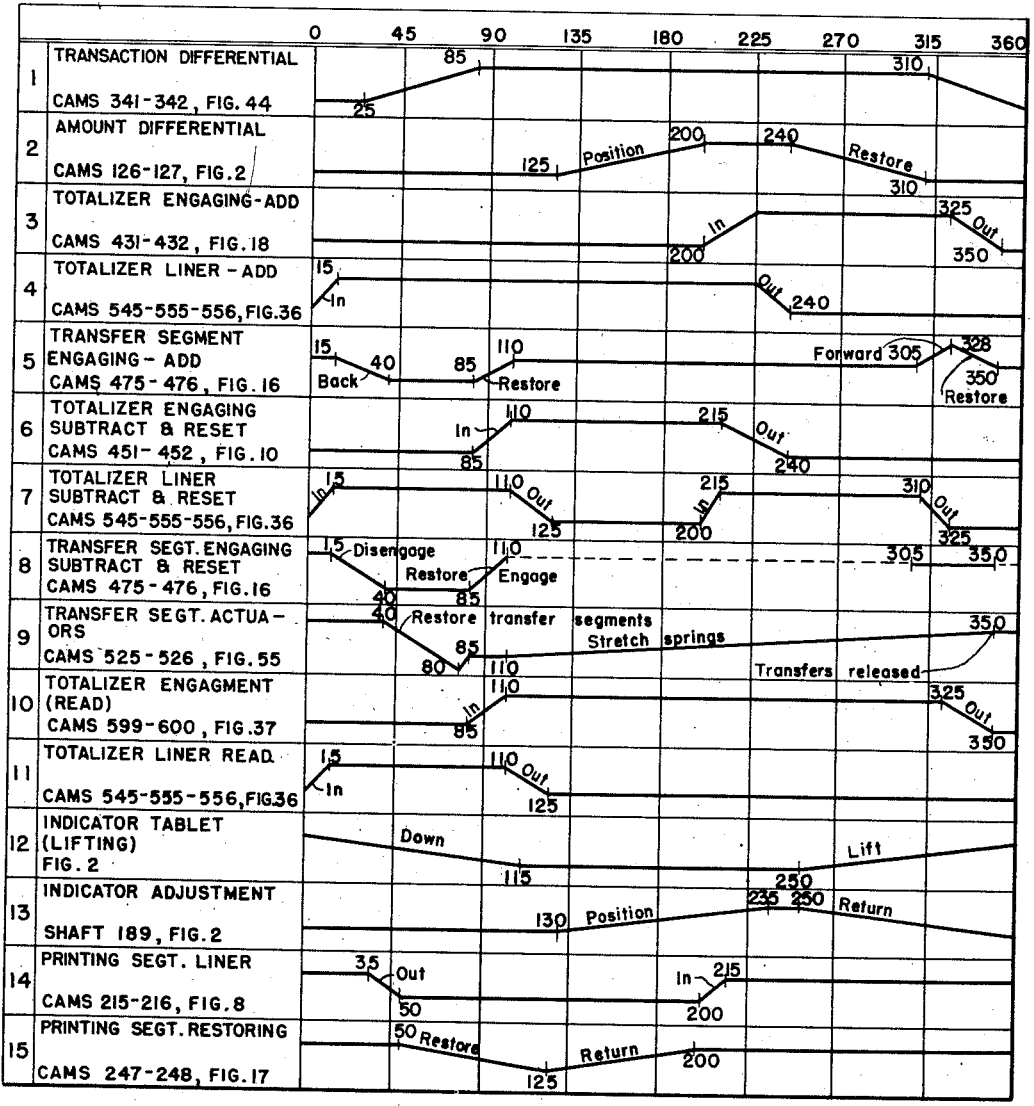
Figure 60:
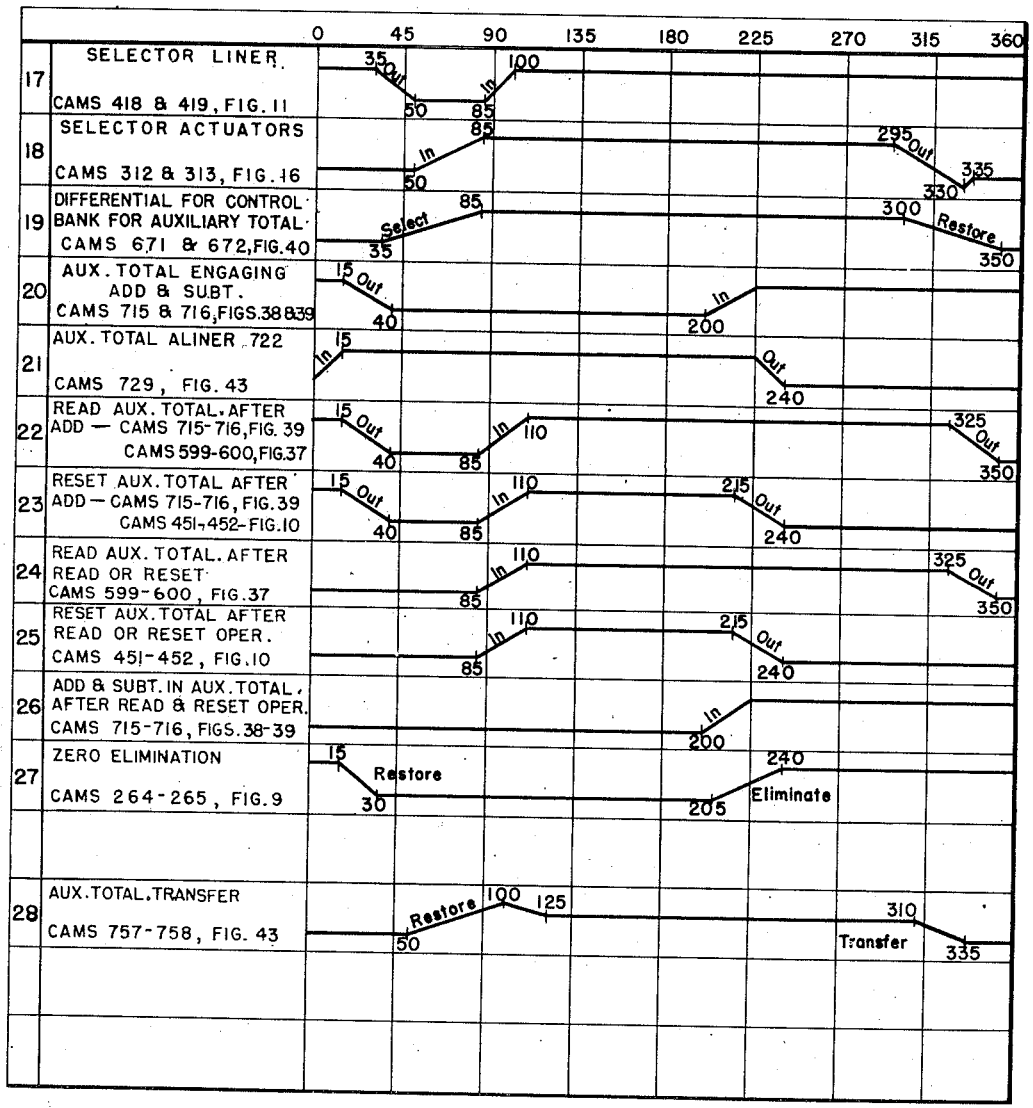

Figs. 59 and 60 are time charts giving in graphic form the movements of the various important mechanisms of the machine.

GENERAL DESCRIPTION

The machine embodying the present invention is provided with a flat keyboard, which is the most efficient type of keyboard for use in connection with accounting machines, and this keyboard comprises a plurality of denominational rows of amount keys for setting up values to be entered in the totalizers of the machine. Each amount bank is provided with a unique form of differential mechanism comprising a primary member, which is positioned directly by the depressed amount keys in the corresponding order, and a secondary differential member connected to the primary member for complementary movement in relation thereto, said secondary member having on its lower edge teeth which are engageable by the selected set of wheels on any one or all of the three transaction totalizer lines for actuation by said secondary member. The primary and secondary differential members are mounted for parallel shifting movement in relation to each other, and said members are driven by a constant displacement device which makes one complete excursion of movement each machine operation, including adding, subtracting, total recording, and sub-total recording operations. The unique construction of the differential mechanism eliminates the necessity for a zero stop mechanism in connection with the amount banks, which mechanism is usually a necessary part of accounting machines to stop the differential mechanisms in zero position when no key is depressed in the corresponding amount bank.

The primary differential members have thereon graduated steps which cooperate directly with the lower ends of the corresponding amount keys, and said primary differential members are directly positioned by the depressed amount keys to the complement of the values represented by said amount keys and in turn cause the corresponding secondary differential members to be positioned to the true values of said depressed amount keys. As a matter of convenience, the complement of 9 is used in setting the primary and secondary differential members in relation to each other. As an example of operation, when the 9 amount key is depressed in a particular order, the corresponding primary differential member is retained in zero or home position against any movement, and, as a result, the secondary differential member moves full distance to its ninth position. Likewise, when no amount key is depressed, the primary differential member is free to move full distance to ninth position, and, as a result, no movement is imparted to the secondary differential member, which remains in zero position. It is therefore quite obvious that this arrangement of the differential members obviates the necessity for a zero stop mechanism in the amount banks.

When the 5 amount key is depressed, the primary differential member moves four steps and the secondary member moves five steps. In other words, the total movement of the primary and secondary members is nine steps, and, as explained above, this movement may be confined to either of the members or divided between them to transmit the values set up on the amount keys to the totalizers, the recording mechanism, and the indicating mechanism, as will be explained more fully presently.

The present machine is provided with three lines of transaction totalizers, each line having thereon nine sets of interspersed totalizer wheels, which are actuated by teeth on the lower edges of the corresponding secondary differential members, and likewise said machine comprises a balance or auxiliary totalizer, often referred to as a crossfooter, the wheels of which are actuated by auxiliary racks connected to the corresponding primary differential members.

There is no desire or need to limit the present machine to three lines of totalizers, as these may be increased by the simple expedient of incorporating additional totalizer units in the machine and by extending the toothed portions of the secondary differential members to actuate the wheels of these additional totalizer units.

Likewise, it is but a matter of assembly to decrease the number of totalizer lines with which the machine is equipped.

There is a row of combined selecting and control keys for each of the transaction totalizer lines, and each row of these keys comprises keys numbered 1 to 9 for selecting the nine sets of totalizers on the corresponding line. In addition, each row of control keys contains a Read key, a Reset key, and a Subtract key for selecting and conditioning the corresponding totalizer line for the corresponding operations.

It is to be understood that throughout the present specification the term "Read" will be used interchangeably with the terms "sub-total" and/or "sub-totalize," and the term "Reset" will be used interchangeably with the terms "total taking," "totalizing," and/or "clearing."

Depressing a selecting key in one of the transaction banks and not depressing any of the three control keys in said banks automatically selects and conditions the corresponding totalizer line for an adding operation, and, when no key is depressed in a transaction bank, the corresponding totalizer line is automatically non-added.

From the foregoing explanation, it is obvious that the three transaction totalizers are of the adding and substracting type and are in many respects similar to those of a well-known type of accounting machine.

In adding operations, the wheels of the selected totalizer or totalizers are engaged with the teeth of the secondary differential members after they have completed their initial movement and prior to their return movement, which return movement rotates said selected wheels in an additive direction to enter therein the value of the depressed amount keys. In subtracting operations, the wheels of the selected totalizer or totalizers are engaged with the teeth of the secondary differential members prior to their initial movement, which initial movement reversely rotates said wheels to subtract therefrom the value of the depressed amount keys.

In reading and resetting operations, the wheels of the selected totalizer are engaged with the secondary differential members prior to their initial movements, which movements reversely rotate said wheels to zero position, which is determined by the long teeth on said wheels contacting a zero stop bar, which is normally ineffective but which is moved to effective position in reading and resetting operations.

In resetting operations, the wheels of the selected totalizer are disengaged from the secondary differential members after said members complete their initial movements, to zeroize said wheels, and consequently said wheels remain in a zeroized condition.

In reading operations, the wheels of the selected totalizer remain in engagement with the secondary differential members during their return movements, which movements restore said wheels to their original positions.

As previously explained, in adding and subtracting operations the primary differential members are positioned to the complement of the true values of the depressed amount keys and the secondary differential members are positioned to the true values of said amount keys. This positioning of the secondary differential members, in addition to actuating the totalizer wheels, also positions the corresponding printing wheels and the corresponding front and back indicator targets to cause the true values of said depressed amount keys to be recorded and indicated.

The primary differential members have, on their lower edges, teeth which engage corresponding pinions, and the secondary differential members have, on their upper edges, teeth which engage corresponding pinions, said pinions being mounted on a common axis. Each of the primary and secondary pinions has thereon a driving lug which cooperates, respectively, with a corresponding lug on a pinion mounted on the same axis as the primary and secondary pinions. The latter pinion meshes with a toothed portion of a corresponding differential segment, which is connected by a latch mechanism to a corresponding printer positioning sector, which latter, through the well-known Kreider type of internal-external gear driving mechanism, positions corresponding type wheels, in accordance with the values of the depressed amount keys, in adding and subtracting operations. Likewise, the printing sectors have gear teeth which engage rack teeth on corresponding pitmans which, through connecting trains of mechanisms, position the corresponding front and back indicator targets in accordance with the values of the depressed amount keys, in adding and subtracting operations.

At the beginning of each adding and subtracting operation, the corresponding segments and sectors are restored from the positions to which they were set in the preceding operation to normal or zero position. After the segments and the sectors have been restored to normal position, initial movement of the primary differential members revolves the corresponding primary pinions in unison therewith, to move the lugs carried thereby away from the corresponding lugs on the segment pinions and to positions corresponding to the complements of the depressed amount keys. After the primary differential members and their pinions have thus been positioned, initial movement of the secondary differential members and their corresponding pinions causes the lugs on said pinions, in cooperation with the corresponding lugs on the segment pinions, to carry said lugs and said pinions in unison therewith until said parts and the corresponding differential segments and printer segments are positioned in accordance with the values of the depressed amount keys. When the secondary differential members are finally positioned in accordance with the positions of the corresponding primary differential members, the lugs carried by the corresponding differential segment pinion are imprisoned, respectively, between the corresponding lugs on the secondary pinions and the corresponding lugs on the primary pinions, and thus a positive positioning of the corresponding printing wheels and indicators is obtained and maintained. In adding and subtracting operations, initial movement of the secondary differential members, after the primary members have been positioned, causes corresponding retaining pawls to engage corresponding notches on the lower edges of the primary members to retain said members in set positions during positioning of the secondary members.

The present machine is provided with a unique mechanism for eliminating the recording and indicating of zeros in the higher denominations. Instead of the usual practice of incorporating the zero eliminating mechanism in the printer mechanism, the zero elimination mechanism of the present machine is incorporated in the differential mechanisms, and, as a result, not only the zeros of the corresponding printer wheels are eliminated, but also the zeros of the corresponding indicators are likewise eliminated, thus simplifying and facilitating the reading of both the printed record and the indication.

As previously explained, a latch mechanism connects the corresponding differential segments and printer sectors for unitary movement under normal conditions. However, when no key is depressed in an amount bank, a spring-urged zero elimination pawl moves inwardly over a shoulder on the latch for this bank, and subsequent rotary movement of said pawl disengages said latch from the corresponding differential segment and moves said latch and the corresponding printer sector, to which said latch is connected, in a reverse direction one step beyond zero to a blank position. This causes said sector in turn to move the corresponding printing wheels and the corresponding indicators also one step beyond zero position to a blank position, so that the zeros of the higher orders will not be indicated or printed.

When the differential segments and the corresponding printer sectors are moved away from zero position, while being positioned under influence of the depressed amount keys, an arcuate surface on each of said printer sectors moves into the path of the corresponding zero elimination pawl to retain said pawls in ineffective positions. Each of the zero elimination pawls carries a stud which overlies a shoulder on the adjacent lower order zero elimination pawl, to retain said adjacent lower order pawls in ineffective position, and this action continues through all the lower orders, so that the zeros of the lower orders will be recorded when an amount key is depressed in a higher order.

The unique construction of the differential mechanism of the present machine provides for the inclusion of an efficient repeat mechanism of simple construction which may be rendered effective to repeat the amount of a previous operation without any foreknowledge that such previous amount is to be repeated.

It will be recalled that the differential segments and the corresponding printer sectors remain in set positions at the end of machine operation and are returned to home or zero positions at the beginning of the succeeding machine operation. In the present adaptation, manipulative means is provided for disengaging the liner for the differential segments from its operating means and locking said liner in engaged position to secure the differential segments in their preset positions, said manipulative means also being effective to simultaneously disengage the differential segment and printer sector restoring means from its operating mechanism. As a result, the segments and the sectors remain in the positions in which they were set in the previous operation, and likewise the type wheels and the indicators positioned thereby remain in their preset positions to repeat the amount of the previous operation. Securing of the differential segments in preset positions causes said segments, through the corresponding connecting pinions and the lugs carried thereby, to position the primary and secondary differential members in accordance with the preset positions of said segments, so that the repeated amount may be entered either additively or subtractively, as desired, in any selected totalizer. Obviously an amount may be repeated as many times as desired. Moreover, the amounts of previous reading and/or resetting operations may be repeated for the purpose of transferring totals, or for other purposes, in the same manner that the amounts of previous adding and subtracting operations are repeated.

In reading and resetting operations, often referred to as sub-total and total recording operations, it is necessary that the wheels of the selected totalizer position the secondary differential members, which in turn position the differential segments and the printer sectors. In this case, it is necessary that the secondary differential members receive their movements before the primary members, in order that said secondary members may be positioned by the wheels of the selected totalizer. This, is will be recalled, is the reverse of what takes pace in subtracting and adding operations, in which the primary members move first to be positioned by the depressed amount keys and afterwards position the secondary differential members in accordance therewith.

In order to free the secondary differential members for initial movement prior to the movement of the primary differential members, it is necessary that the corresponding differential segments and printer sectors be restored in a direction reverse to that in which they are restored in adding and subtracting operations, and this reverse restoring is accomplished automatically through conditions set up by depression of the Read or Reset key for the selected totalizer. This reverse movement of the differential segments moves the projecting lugs on the corresponding segment pinions out of the paths of the corresponding lugs on the secondary pinions and into the path of the lugs on the corresponding primary pinions, so that the secondary differential members are free to move first in reading and resetting operations.

In machines of this type, the usual practice is to use the transfer trip pawls in cooperation with the long teeth on the totalizer wheels to stop said wheels in zero position in reading and resetting operations. However, in the present machine, the same trip pawls are used to trip the transfer mechanism in both adding and subtracting operations, and for this reason a zero stop bar has been provided. Said bar is moved into effective position in reading and resetting operations and during other operations of the machine remains ineffective.

In reading and resetting operations, after the differential segments and the printer sectors have been restored in a reserve direction, and after the zero stop bar has been moved to effective position, the wheels of the selected totalizer are engaged with the secondary differential members. Initial movement of the secondary members rotates said selected wheels in a reverse direction until the long teeth thereon contact the zero stop bar to position said wheels at zero position. This positions the secondary differential members in accordance with the amount standing on the totalizer wheels. After the secondary differential members have been positioned in the manner explained above, the primary differential members are positioned in accordance therewith and, through their pinions and the lugs thereon, in cooperation with the corresponding lugs on the differential pinions, position the differential segments and the corresponding printer sectors in accordance with the amount standing on the selected totalizer wheels. The printer sectors in turn transmit their positioning to the corresponding printing wheels and the corresponding indicators.

In resetting operations, the wheels of the selected totalizer are disengaged from the corresponding secondary differential members prior to their return movements, and consequently said wheels remain in a zeroized condition. The only difference between reading and resetting operations is that in reading operations the wheels of the selected totalizer remain in engagement with the secondary differential members during their return movements, which movements restore said wheels to their original positions.

In reading and resetting operations, the action of the differential member retaining mechanism is reversed, and initial movement of the primary differential members, after the secondary differential members have been positioned, causes the retaining mechanism to engage corresponding notches in the secondary differential members to retain said members in set positions during positioning of the primary differential members. This, it will be recalled, is the reverse of the action of the retaining mechanism in adding and subtracting operations, in which operations initial movement of the secondary differential members, after the primary members have been positioned, causes the retaining mechanism to retain said primary members in set positions while the secondary members and the corresponding differential segments and printer sectors are being positioned in accordance therewith.

In addition to the three lines of interspersed transaction totalizers explained above, the present machine is also provided with an auxiliary or balance totalizer, sometimes referred to as a crossfooter. The balance totalizer is actuated by the primary differential members, which, it will be recalled, are positioned by the amount keys to the complement of the true value. Some of the details of construction of the balance totalizer are similar in many respects to those of the well-known Class 2000 type of accounting machine and comprise a set of denominational adding wheels and corresponding subtracting wheels, the adding and subtracting wheels of each order being geared together for reverse movement, as is the usual practice in totalizers of this type.

The selection and the functions of the balance totalizer (also referred to throughout this specification as an auxiliary totalizer) are controlled by a row of control keys located on the extreme right-hand side of the keyboard, said keys controlling the positioning of a differential mechanism which takes the place of the well-known total control lever to select the plus or minus side of the balance totalizer for engagement with the primary differential members for actuation thereby. The control keys for the auxiliary totalizer are often termed "motorized keys" in that, in addition to their other functions, they also initiate operation of the machine. As is the usual practice in adding operations, the add wheels of the balance totalizer are engaged with the actuators and are actuated thereby in an additive direction, and in subtracting operations the minus wheels of the balance totalizer are engaged with the actuators and are rotated thereby in an additive direction to subtract from the add wheels the amount set up on the keyboard.

The balance totalizer of the machine of this invention may be used in conjunction with the transaction totalizers in any way desired in connection with various business systems in the balancing and posting of accounts and the rendering of periodical statements. For example, the machine is well adapted for use as a bank posting machine in the computing and posting of individual and/or commercial checking accounts, and said machine is also well adapted for use by public utility concerns in the computing of the various accounts of their subscribers and in the rendering of periodical statements to the subscribers for the services rendered them.

It is not the desire to limit the machine of this invention to the applications set out above, as these are used only to illustrate the flexibility of the machine, which may be used to solve the accounting problems encountered in connection with practically any type of modern business system.

The plus and minus wheels of each denominational order of the balance totalizer are geared to and drive a corresponding indicator wheel having thereon two sets of numerals, one of which corresponds to the plus wheels and the other of which corresponds to the minus wheels, said numerals being visible through corresponding sight apertures in the front of the machine cabinet. A shutter mechanism, which may be controlled by the control keys for the balance totalizer, is provided for alternately exposing the plus figures on the indicator wheels and simultaneously hiding the minus figures on said wheels, or vice versa.

The plus and minus wheels for each order of the balance totalizer are driven by corresponding shiftable racks connected to the corresponding primary differential members, said racks being movable in relation to their corresponding members for the purpose of transferring tens digits from one order to the next.

In adding operations, the plus wheels of the balance totalizer are engaged with the corresponding racks and are positioned thereby to the complement of the amount set up on the keyboard. As the plus wheels are reversely geared to the minus wheels, they turn said wheels in a reverse direction to the true amount set up on the amount keys, and likewise the corresponding indicator wheels are positioned so that the minus numerals thereon indicate the true amount set up on the keyboard.

In subtracting operations, the minus wheels of the balance totalizer are engaged with the corresponding racks and are rotated thereby in an additive direction to the complement of the amount set up on the keyboard and, through the reverse gearing, rotate the corresponding plus wheels in a subtractive direction to subtract therefrom the true value of the amount set up on the keyboard. As long as the auxiliary or balance totalizer is in a positive condition, the minus numerals on the indicator wheels indicate the true value of the amount in said totalizer. However, this condition is reversed when the balance totalizer changes from a positive condition to a negative condition, and in this case the plus set of numerals on the indicator wheels indicate the true value of the amount in the totalizer.

In normal balance and sub-balance operations—that is, when the balance totalizer is in a positive condition—the plus wheels of said totalizer are read and reset, as they contain the complement of the true amount and position the primary differential members to said complement, said members in turn positioning the secondary differential members and the corresponding type wheels and indicators to the true value of the amount in the balance totalizer. When the balance totalizer is in an overdrawn condition, the minus wheels of said totalizer are read and reset, as they contain the complement of the overdraft, and position the corresponding primary differential members to the complement, said primary members in turn positioning the corresponding secondary members, type wheels, and indicators to the true negative balance, which is the result desired.

In the present adaptation, the plus wheels of the balance totalizer are set at 9 and the minus wheels of said totalizer are set at zero. This is contrary to the usual practice; however, this arrangement is necessary where complementary amounts are being dealt with. Likewise, the unusual construction of the balance totalizer makes it necessary to enter a "fugitive 1" in the units order every time the highest order wheel, either plus or minus, passes through zero while traveling in an additive direction.

As previously stated, the racks which drive the auxiliary totalizer wheels are mounted on their corresponding primary differential members for movement in relation thereto to effect the transferring of tens digits. The racks are urged in a digit-transferring direction by their corresponding springs but are normally retained against such movement by their corresponding trip pawls, which are normally effective but which are tripped and rendered ineffective when the adjacent lower order totalizer wheels pass through zero. However, the racks are further restrained against transferring movement by another set of corresponding retaining pawls, all of which are released near the end of machine operation to permit the racks, which were released by their trip pawls being rendered ineffective, to perform their transferring movements to effect the transferring of tens digits.

The construction of the machine embodying the present invention permits values to be transferred from the balance totalizer to any of the other totalizers on the three transaction totalizer lines, permits the simultaneous entering of values in any of the selected transaction totalizers and the balance totalizer, and likewise permits the transferring of values from any selected transaction totalizer to the balance totalizer.

In the ensuing pages, the mechanism described in general above will be described in detail with reference to the various figures of the drawings, throughout which similar reference numbers refer to similar parts.

DETAILED DESCRIPTION

Machine framework

The main framework of the machine embodying the present invention comprises a main right frame (not shown), a similar left frame 69 (Fig. 2), and various intermediate frames, said frames being secured to a machine base (not shown) in fixed relationship to each other and further secured in fixed relationship by various cross frames, tie bars, rods, and shafts. The mechanism of the machine is enclosed in a suitable case or cabinet 70 (Fig. 2), which is also secured to the machine base, said cabinet having suitable openings or apertures in its upper portion for displaying the front and back indicators, and a suitable opening just above its keyboard portion for displaying the numerals on the indicator wheels for the balance totalizer.

The machine may be operated by any suitable type of small electric motor or by means of a hand crank, which may be connected by a suitable gearing and a suitable clutch mechanism to a main cam shaft 71 (Figs. 2, 10, and 38), journaled in the main frames, for driving said shaft one clockwise revolution, which is required for each machine operation, including adding, substracting, reading, and resetting operations. Machine operation may be initiated by any suitable type of starting bar or motor key, or by the control keys for the balance totalizer, which may be motorized; or, if desired, by certain of the control keys for the transaction totalizers, which may also be motorized if desired.

In the present application, the machine operating motor and the mechanism associated therewith for driving the main cam shaft 71 have not been shown; neither has any manual mechanism been shown for operating the machine, as any desired type of starting or operating mechanism which is suitable may be used with satisfactory results, and, as such mechanism constitutes no part of the present invention, it is believed unnecessary to further describe and illustrate it.

Keyboard mechanism

The keyboard mechanism of the present machine is of unit construction and comprises a main keyboard plate 72 (Figs. 1 and 2), which is secured to the machine framework and which supports ten denominational rows of numeral or amount keys 73, each row comprising keys numbered from 1 to 9, as is the usual practice in machines of this character. The keyboard likewise comprises three rows of transaction keys for the three transaction totalizers, each of said rows of transaction keys including a Read key 74, a Reset key 75, a Subtract key 76, and nine totalizer selecting keys 77 for selecting the nine sets of interspersed totalizer wheels on the corresponding line. The keyboard likewise includes a row of control keys for the auxiliary or balance totalizer located just to the right of the transaction keys, said control keys including a Non-Add key 78, an Add key 79, a Sub-Balance key 80, and a Balance key 81, for controlling the plus side of said balance totalizer, and including a Balance of Overdraft key 82, a Sub-Balance of Overdraft key 83, and a Subtract key 84, for controlling the minus side of said balance totalizer. In addition to their other functions, the control keys 78 to 84 also initiate operation of the machine.

Amount differential mechanism

Inasmuch as the differential mechanisms in connection with each of the rows of amount keys 73 are similar in construction, it is believed that a detailed description of the ten-dollar amount bank and the differential mechanism associated therewith, shown best in Fig. 2, will be sufficient for the present purpose.

The amount key bank shown in Fig. 2 has nine amount keys 73 depressibly supported in notches formed in bent-over portions of an amount key frame 85, secured by proper screws to an order plate 86 for this particular denomination, there being such an order plate for each denomination, said plates being supported by rods 87, 88 and 89, in turn supported by the main right and left frames 69 of the machine. The finger tips on the upper ends of the amount keys 73 extend through corresponding openings in the keyboard plate 72.

Each of the amount keys 73 (Fig. 2) has a pin 90, which extends outwardly from both sides of the key, and a coil spring 91 laced alternately between the left-hand extensions of the pins 90 and fixed studs in the key frame 85 yieldingly urges the amount keys 73 upwardly to undepressed positions as shown here. The right-hand extensions of the pins 90 in the keys 73 (Fig. 2) cooperate with angular camming surfaces on corresponding upward extensions of a locking detent 92, shiftably mounted by means of similar links 93 pivotally connected to each end thereof, said links in turn pivotally mounted on corresponding studs 94 secured in the plate 86. A stud 95, secured in the plate 86, has an annular groove which engages the detent 92 near its center to prevent side displacement and/or springing of said detent. A spring 96 urges the detent 92 forwardly to normally maintain the angular camming surfaces on the projections thereof in yielding engagement with the corresponding pins 90 in the amount keys 73.

Depression of any one of the amount keys 73 (Fig. 2) causes the pin 90 therein, in cooperation with the angular camming surface on the corresponding projection of the detent 92, to shift said detent rearwardly against the action of the spring 96, until a flattened upward surface on said pin 90 moves downwardly beyond a shoulder or tooth formed on said projection, whereupon the spring 96 restores the detent 92 forwardly a sufficient distance to latch the tooth over the flattened surface of the pin 90 to retain the amount key in depressed position. After one amount key has been depressed (Fig. 2), depression of another amount key 73 in the same bank shifts the flexible detent 92 rearwardly to release the previously depressed key, and full depression of said latter depressed key causes the detent 92 to engage its flattened surface to retain said key in depressed position.

A rearward extension of the detent 92 (Fig. 2) has a stud 97, which cooperates with a downwardly extending finger on an arm 98 secured on a key release shaft 99 journaled in the framework of the machine. Suitable mechanism (not shown) is provided for rocking the key release shaft 99 back and forth in proper timing to control the releasing movement of the detent 92 and also to control the action of a locking plate 100, having in a rearward extension thereof a slot engaged by a stud 101 in the arm 98. The locking plate 100 is mounted for shifting movement by means of similar slots in opposite ends thereof which engage the studs 94. The downward edge of the locking plate 100 engages a corresponding annular groove in the stud 95 to prevent flexing or distortion of said locking plate.

At the beginning of adding and subtracting operations, the key release shaft 99 and the arm 98 are rocked clockwise to withdraw the finger of said arm 98 from the stud 97 and to cause the stud 101, in cooperation with the slot in the locking plate 100, to shift said locking plate forwardly. Forward movement of the locking plate 100 causes forwardly-extending hook-shaped projections thereof to move beneath the pins 90 of the undepressed amount keys 73 to lock said keys against depression, and causes the corresponding hook-shaped projection to latch over the pin 90 of the depressed amount key 73 to lock said depressed key against release during machine operation.

Near the end of adding and subtracting operations, the shaft 99 and the arm 98 are rocked counter-clockwise, causing the stud 101 in said arm to shift the locking plate 100 rearwardly to unlock the amount keys 73 and to cause the depending finger on said arm 98, in cooperation with the stud 97, to shift the flexible detent 92 also rearwardly, against the action of the spring 96, to release the depressed amount key 73 for upward restoring movement under influence of the spring 91.

Near the beginning of reading and/or resetting operations, the key release shaft 99 and the arm 98 (Fig. 2) are rocked counter-clockwise, causing the depending finger on said arm, in cooperation with the stud 97, to shift the flexible detent 92 rearwardly to release any inadvertently depressed amount key 73 prior to such reading and/or resetting operation. After the key releasing shaft 99 (Fig. 2) has been rocked counter-clockwise to release any depressed amount key at the beginning of reading and resetting operations, said shaft and the arm 98 are returned clockwise to shift the locking plate forwardly to lock the amount keys 73 in undepressed positions during reading and resetting operations.

The lower ends of the nine amount keys 73 (Fig. 2) cooperate with corresponding graduated steps 102 formed on the upper edge of a primary differential slide 103 mounted for linear shifting movement by means of parallel slots therein in cooperation with flat surfaces formed on studs 104 and 105 secured in the plate 86. The primary differential slide 103 (Fig. 2) has, on its lower edge, teeth which mesh with a corresponding pinion 106 fixedly connected by a sleeve 107 to a companion pinion 108, which meshes with teeth on the upper edge of a secondary differential slide 109 mounted for linear shifting movement in parallel relationship to the primary slide 103 by means of parallel slots therein in cooperation with flat surfaces formed on studs 110 and 111 secured in the order plate 86 for the next higher orders. The sleeve 107 fits freely on a rod 112, which extends the full width of the keyboard through suitable clearance slots 113 in the order plates 86. Opposite ends of the rod 112 (Figs. 2 and 3) are freely engaged by holes in the forward ends of two links 114 (only one shown here), the rearward ends of which links are pivotally connected to similar cranks 115 secured on a shaft 116 journaled in the machine framework.

Secured on the left-hand end of the shaft 116 (Figs. 2, 3, and 58), just to the right of the left-hand crank 115, is a pinion 117, which meshes with teeth in the upper edge of a slide 118 shiftably mounted by means of parallel slots therein in cooperation with stationary studs 119 secured in the machine framework. The slide 118 carries a stud 120, which engages a slot in the upper end of a lever 121 pivoted on a stud 122 (Fig. 2) in the machine framework. A downward extension of the lever 121 is pivotally connected to the rearward end of a pitman 123 having, in its forward end, a slot which slidably engages the main cam shaft 71. The pitman 123 carries rollers 124 and 125, which cooperate, respectively, with the peripheries of companion plate cams 126 and 127 secured on the shaft 71.

As previously explained, the main cam shaft 71 makes one clockwise revolution each machine operation, causing the cams 126 and 127, through the pitman 123 and the lever 121, to shift the slide 118 first forwardly and then back to normal position according to the time given in space 2 of the time chart (Fig. 59). Initial forward movement of the slide 118 (Fig. 3) revolves the pinion 117, the shaft 116, and the cranks 115 clockwise through 180 degrees of movement. Initial clockwise movement of the cranks 115, through the links 114, the rod 112, and the pinions 106 and 108, shifts the primary differential slide 103 and the secondary differential slide 109 rearwardly to position said differential slides in accordance with the value of the depressed amount keys 73, as will be explained more fully presently. Return forward movement of the slide 118 restores the differential slides 103 and 109 (Figs 2 and 3) to normal positions, as shown here.

In the present arrangement of the differential mechanism, the primary differential slide 103 (Figs. 2 and 3) is positioned to the complement of the value of the depressed amount key 73 and in turn controls the positioning of the secondary differential slide 109 to the true value of said depressed amount key. The reason the primary slide 103 is always positioned first in adding and substracting operations is that the secondary slide 109 is restrained against initial movement rearwardly by the corresponding recording and indicating mechanisms which it positions. In the present adaptation, it was found convenient to use the complement of 9 in positioning the differential slides 103 and 109 in relation to each other, and, when said differential slides are in home position, as shown in Fig. 2 the primary slide 103 is in 9 position and the secondary slide 109 is in zero position. This setting of the differential slides eliminates the necessity for a zero latch mechanism to retain the actuator mechanism in zero position when no amount key is depressed. In this arrangement, when no amount key 73 is depressed (Fig. 2), the unrestrained primary slide 103 moves full distance through nine steps of movement, and in this case the restrained slide 109 receives no movement and thus remains in zero position, as shown here. Likewise, when the 9 amount key 73 (Fig. 2) is depressed, the power end of said key is moved into the path of the corresponding step 102 on the upper edge of the primary slide 103 and retains said primary slide stationary in its initial position. This permits the secondary differential slide 109 to move full distance rearwardly from zero to 9 position, which is the true value of the depressed amount key 73.

The lower edge of the secondary differential slide 109 (Fig. 2) has actuator gear teeth 130, which cooperate with the corresponding denominational order or group of totalizer gear wheels 131 on the No. 1 transaction totalizer line 132 and with corresponding groups of totalizer wheels 133 and 135 on the No. 2 and No. 3 totalizer lines 134 and 136, respectively. There are nine sets of interspersed totalizer gear wheels on each transaction totalizer line, and these sets of wheels are selected for engagement with the secondary differential slides 109 by means of the corresponding selecting keys 77 (Fig. 1), as will be explained later.

A set of totalizer gear wheels comprises a wheel 131 for each denominational order, and the nine wheels of any single order—for example, the units order—are designated as a group.

As explained previously, depression of one of the amount keys 73 (Fig. 2) moves the lower end of its stem into the path of the corresponding step 102 on the primary differential slide 103. Initial forward movement of the slide 118 (Fig. 3), according to the time given in space 2 of the time chart (Fig. 59), rotates the pinion 117, the shaft 116, and the cranks 115, 180 degrees clockwise to shift the links 114, the rod 112, and the pinions 106 and 108 rearwardly. Rearward movement of the pinions 106 and 108 causes said pinion 108 to be revolved by the teeth on the upper edge of the secondary differential slide 109, which, as previously explained, is restrained against movement by the load of the recording and indicating mechanisms, and such movement of said pinion 108, through the pinion 106 in cooperation with the teeth on the lower edge of the primary differential slide 103, carries said slide 103, which is not restrained at this time, rearwardly in unison therewith until the corresponding step 102 engages the lower end of the stem of the depressed amount key 73. This positions the primary differential slide 103 to the complement of the true value of the depressed amount key and obstructs further rearward movement of said primary slide, whereupon the secondary differential slide 109, through continued initial movement of the pinions 106 and 108, is then shifted rearwardly against the action of the restraining load to be positioned in accordance with the positioning of the primary slide to the true value of the depressed amount key 73.

Differential rack retaining mechanism

The present machine is provided with retaining mechanism for retaining the primary slide 103 in set position in adding and subtracting operations during positioning of the secondary differential slide 109, and said retaining mechanism likewise functions in reading and resetting operations to retain the secondary differential slide 109 in set position during positioning of the primary slide 103. In reading and resetting operations, the secondary differential slide 109 is first positioned under influence of the corresponding totalizer wheel being read or reset and transmits this positioning to the primary differential slide 103. It will be understood that this is just the reverse of the positioning of the differential slides in adding and subtracting operations.

Directing attention to Figs. 2 and 20, initial movement of the secondary differential slide 109 away from home position, after the primary slide 103 has been positioned under influence of the depressed amount key in adding or subtracting operations, as explained above, causes a camming surface 137 on a plate 138 secured to said secondary slide 109, in cooperation with a roller 139 on an extension of an arm 140 free on a shaft 141 journaled in the machine framework, to rock said arm 140 counter-clockwise against the action of a spring 142. Counter-clockwise movement of the arm 140 causes a stud 143 in a forward extension thereof, in cooperation with a cam slot 144 in a retaining pawl 145 free on a rod 146, to rock said pawl also counter-clockwise to engage a bent-over retaining ear 147 thereon with the one of a series of similar notches 148 in the lower surface of the primary differential slide 103, corresponding to the depressed amount key 73 (Figs. 2 and 20), to secure said slide in set position. The rod 146 (Figs. 2, 19, 20, and 23) is secured between forward extensions of two similar arms 149 free on the shaft 141, said arms carrying, respectively, rollers 150 and 151, which cooperate with corresponding camming surfaces on their two respective plate cams 152, secured on a shaft 153 journaled in the machine framework.

In adding and subtracting operations, the shaft 153 and the cams 152 are positioned as shown here and in turn position the arms 149 and the rod 146 also as shown here, to render the retaining pawl 145 for the primary differential slide 103 effective and to simultaneously render a similar retaining pawl 581 (Figs. 19 and 21) for the secondary differential slide 109 ineffective.

In reading and resetting operations, the shaft 153 and the cams 152 (Figs. 16 and 23) are rocked clockwise in a manner to be described later, to in turn rock the arms 149 and the rod 146 counter-clockwise, from the position shown in Figs. 2, 19, and 20 to the position shown in Fig. 21, to render the retaining pawl 145 for the primary slide ineffective and to simultaneously render the retaining pawl 581 for the secondary slide effective, as will be explained more in detail later.

In adding operations, after the primary and secondary differential slides 103 and 109 (Figs. 2 and 3) have been positioned under influence of the depressed amount key 73, as explained above, the selected set of wheels 131, 133, or 135 on the No. 1, No. 2, or No. 3 transaction totalizer lines is engaged with the teeth 130 on the secondary slides 109. Inasmuch as the primary differential slides 103 are secured in set position by the retaining pawls 145, return movement of the slide operating mechanism returns the secondary slides 109 forwardly from set position to home position to rotate the wheels of the selected totalizer in an additive direction to enter therein the value of the depressed amount keys 73.

In subtracting operations, the selected set of totalizer wheels 131, 133, or 135 on the No. 1, No. 2, or No. 3 totalizer lines is engaged with the teeth 130 on the secondary differential slides 109 prior to their initial rearward movement, which movement rotates said selected set of wheels reversely or in a subtractive direction to subtract therefrom the value of the depressed amount key 73.

It is to be understood that it is possible to add and/or subtract in one set of wheels on each of the three transaction lines at one time if desired.

Each of the three transaction totalizers is provided with a transfer mechanism for transferring tens digits in adding and subtracting operations. The transaction totalizer mechanism will be explained more in detail later herein in connection with the transaction key banks and their associated differential mechanisms.

*Printer positioning mechanism*

The amount differential mechanism shown in Fig. 2, which is being used herein as representative of all of the amount differential mechanisms, is operatively connected to and positions corresponding type carriers for recording values in the various columns of suitable record material.

The primary differential slide 103 (Figs. 2, 4, and 5) has, on its lower edge, gear teeth which mesh with a gear 155 free on a shaft 156 journaled in the machine framework, and the secondary differential slide 109 has, on its upper edge, gear teeth which mesh with a gear 157, similar to the gear 155, also free on the shaft 156. Integral with the gear 155 is a disk 158 with a lug 159, which cooperates with a similar lug 160 integral with a disk in turn secured to one face of a gear 161 free on the shaft 156. Opposite the lug 160 is a similar lug 162 integral with a disk secured to the other face of the gear 161, said lug 162 cooperating with a lug 163 integral with a disk 164 in turn secured to the gear 157 for the secondary differential slide 109.

The gear 161 (Figs. 2 and 7) meshes with corresponding teeth in a differential segment 165 free on a shaft 166 journaled in the machine framework. Secured to the left face of the segment 165 is a plate 167 having therein a notch which is normally engaged by the tooth of a pawl 168 free on a stud 169 secured in a corresponding printer sector 170 also free on the shaft 166. The printer sector 170 has gear teeth which mesh with the external teeth of a corresponding external-internal gear 171. The internal teeth of the gear 171 bear on the periphery of a corresponding disk 172 supported by a hexagonal shaft 173 in turn supported by the machine framework. The internal teeth of the gear 171 mesh with the teeth of a corresponding pinion 174 rotatably supported in a suitable opening in the disk 172, said pinion 174, by means of a square hole therein, driving a shaft 175, which in turn drives other pinions, similar to the pinion 174, said other pinions in turn driving internal-external gears 176. The gears 176 have external teeth which mesh with and drive corresponding type wheels 177 (Figs. 2 and 7) free on a shaft 178 journaled in the machine framework, said type wheels being properly located in relation to the various columnar positions of the record material being used in a particular business system. Associated with the type wheels 177 (Fig. 2) are a suitable inking ribbon 180 and suitable impression hammers 179, between which is guided suitable record material 181 for receiving printed records of the amounts set up on the type wheels 177.

Figure 6:
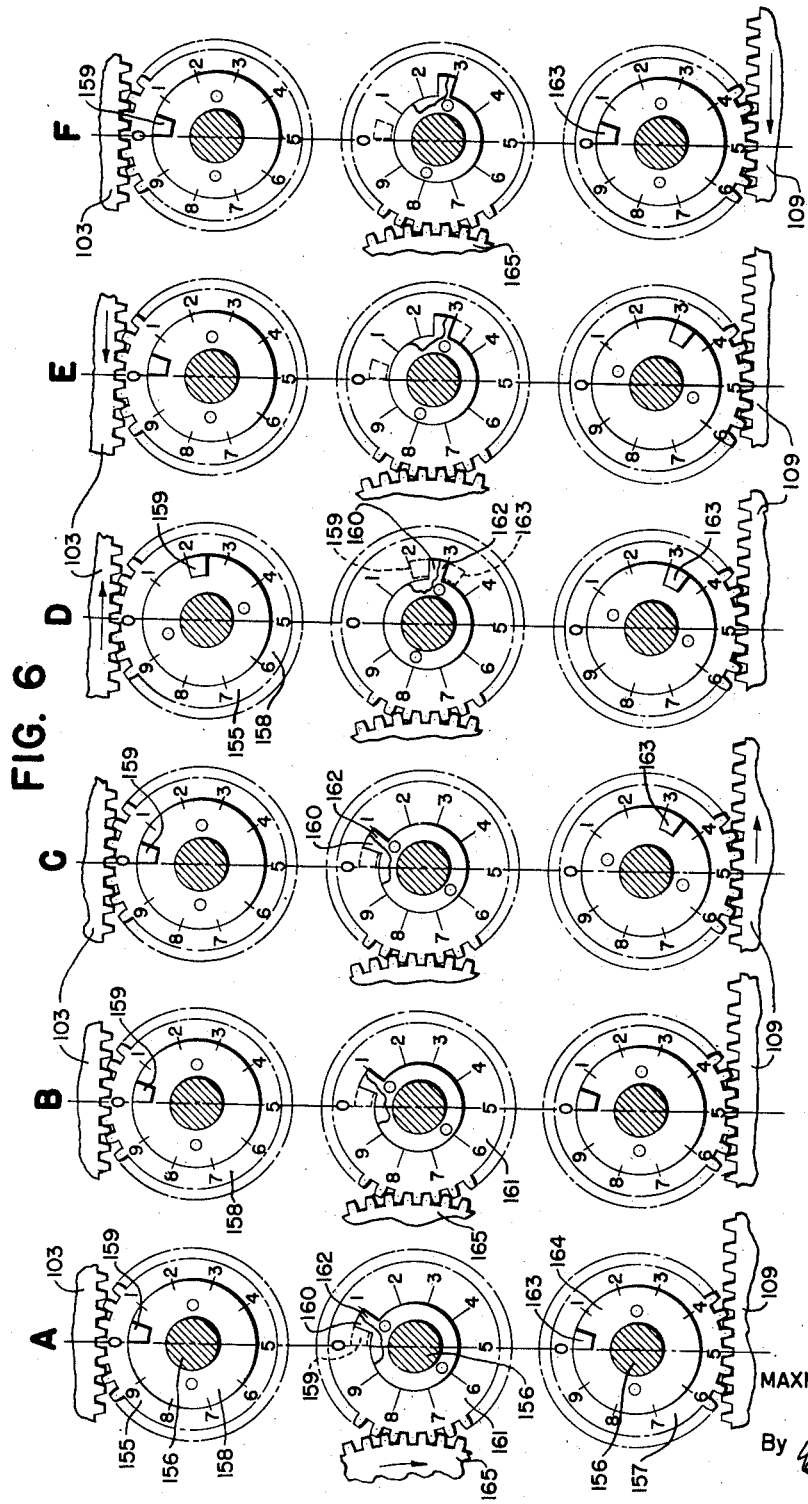
Fig. 6 is a series of schematic views showing the operation of the differential mechanism in total and sub-total recording operations.

It is to be understood that the showing of the differential slides and their associated gears and segments are purely diagrammatic in Figs. 4 and 6 as to both shape and position, as these views are not intended to constitute a true showing of the parts but are intended primarily to clearly illustrate the operation of the amount differential mechanism in adding and subtracting operations and in reading and resetting operations, respectively.

By referring to Fig. 2, it will be noted that the primary differential slide 103 is provided with a stop stud 182 secured in the corresponding order plate 86 for stopping said slide in home position, and that the secondary slide 109 is provided with a similar stop stud 183 for stopping and locating said slide in home position, as shown here.

With the differential slides 103 and 109 in home positions, as shown in Figs. 2 and 7, and with the corresponding differential segment 165 and sector 170 in restored position, as shown in Fig. 7 and as shown in vertical spaces A and B of Fig. 4, it will be noted that the lug 163, coacting with the lug 162, restrains movement of the secondary differential slide 109 rearwardly away from home position due to the resistance of the segment 165, the sector 170, and the printing and indicating mechanisms. It will likewise be noted that the lug 160 offers no restrain to clockwise movement of the lug 159 and the gear 155; consequently initial movement of the integral pinions 106 and 108 (Fig. 3) causes said pinion 108 to roll over the teeth on the restrained slide 109 and causes said pinion 106 to simultaneously shift the unrestrained primary slide 103 rearwardly. Initial rearward movement of the primary slide 103 from home position rotates the corresponding gear 155 clockwise to position the disk 158 and the lug 159, which are integral with said gear, as shown in space C of Fig. 4, to a position corresponding to the value of the depressed amount key 73. It will be noted that, during positioning of the lug 159, the restored position of the segment 165 is not interfered with, as the lug 159 is withdrawn from the corresponding lug 160 carried by the gear 161.

After the primary differential slide 103 has been positioned under influence of the depressed amount key 73 in adding and subtracting operations, as explained above, it cannot move any farther rearwardly, and so the restraint upon the secondary slide 109 is no longer sufficient to prevent continued initial movement rearwardly of the pinions 106 and 108 from moving said slide 109 rearwardly. Initial rearward movement of the secondary differential slide 109 away from home position, through the mechanism shown in Fig. 20 and explained earlier herein, secures the primary differential slide in set position and rotates the gear 157 (Figs. 2, 4, 5, and 7) counter-clockwise, causing the lug 163, which is integral with said gear, in cooperation with the corresponding lug 162 on the gear 161, to carry said gear counter-clockwise in unison therewith, as illustrated in space D of Fig. 4, until the lug 160 on the gear 161 contacts the corresponding lug 159 on the gear 155 to position said gear 161 in accordance with the value of the depressed amount key. Counter-clockwise movement of the gear 161 (Figs. 2 and 7) revolves the corresponding segment 165 and, through the pawl 168, the corresponding sector 170 to a position corresponding to the value of the depressed amount key. The sector 170 in turn transmits its positioning to the internal-external gear 171, and said gear, through the pinions 174 and the shaft 175, transmits its positioning to the corresponding internal-external gears 176, which drive the type wheels 177, to positions corresponding to the value of the depressed amount key 73.

After the segment 165, the sector 170, and the type wheels 177 have been positioned, an aliner 204 (Figs. 2 and 7) functions according to the time given in space 14, Fig. 59, to engage the corresponding one of a series of notches 205 in the periphery of said segment 165 to secure said segment and associated parts in set positions while the printer hammers 179 function to record the value of the depressed amount key upon the record material 181, and also while the indicator mechanism is being set, as will be explained more in detail later.

Inasmuch as the primary slide 103 is secured in set position, return movement forwardly of the pinions 106 and 108 (Figs. 2 and 3) first restores the secondary slide, which is not restrained against such movement, forwardly to home position. Near the end of restoring movement of the slide 109, the pawl 145 (Figs. 19 and 20) is disengaged from the corresponding notch 148 to free the primary slide 103, whereupon said primary slide is restored forwardly, as shown in space F of Fig. 4, and in turn restores the corresponding gear 155 and lug 159 to initial position, as shown here.

It will be noted that return movements of the secondary and primary slides 109 and 103 withdraws the associated lugs 163 and 159 from the corresponding lugs 162 and 160 so as not to interfere with the setting of the printing and indicating mechanisms, which remain in set positions at the end of machine operation and are restored to initial positions in the beginning of the succeeding operation, as will be explained later.

*Indicator positioning mechanism*

The differential positioning of the printer sector 170 (Figs. 2 and 7) under influence of the depressed amount key is transmitted to a corresponding indicator mechanism for visually indicating the value of the depressed amount key.

Directing attention to Figs. 2 and 7, integral with the sector 170 is a segment 185 having teeth which mesh with corresponding teeth on the downward edge of a pitman 186 having in its forward end a slot which slides on a stationary stud 187 in the adjacent higher order plate 86. The rearward end of the pitman 186 (Fig. 2) is pivotally connected to a cam arm 188 free on a shaft 189 journaled in the machine framework. Secured on the shaft 189 is a crank 190 pivotally connected to the downward end of a link 191. The link 191 has, in its upper end, a stud 192, which extends through a slot 193 in a segment 194 free on the shaft 189. The stud 192 likewise extends through a heart-shaped cam opening 195 in the upper end of the cam arm 188. The segment 194 (Fig. 2) meshes with external gear teeth on a segment 196, having internal gear teeth which bear on the periphery of a corresponding disk 197 secured on a square shaft 198 supported in the machine framework. The segment 196 has internal teeth which mesh with a corresponding pinion 199, which drives a square shaft, and another pinion similar to the pinion 199, which latter pinion, in cooperation with the internal teeth of a segment, not shown but similar to the segment 196 (Fig. 2), positions front and back indicator receptacles 200 and 201, which pivot on the shaft 198. The receptacle 200 slidably supports properly spaced front indicator tablets 202, and the receptacle 201 likewise slidably supports properly spaced back indicator tablets 203, said tablets 202 and 203 corresponding to the amount keys 73 for the denominational order being described.

It will be noted that the receptacles 200 and 201 contain eleven tablets 202 and 203, including one tablet for each of the nine amount keys 73, a zero tablet, and a blank tablet, which latter are displayed when the zero is eliminated in this amount bank, as will be explained later.

Positioning of the printer sector 170 (Figs. 2 and 7) under influence of the depressed amount key 73, as explained above, through the segment 185 and the pitman 186, positions the cam arm 188 and the heart-shaped cam opening 195 in accordance with the value of the depressed amount key.

After the cam arm 188 (Fig. 2) has been positioned by the sector 170 (Fig. 7) and alined in set position by the aliner 204, the shaft 189 and the crank 190 are operated first counter-clockwise and then back to normal position by a cam mechanism (not shown) according to the time given in space 13 of the time chart (Fig. 59). Initial counter-clockwise movement of the shaft 189 and the crank 190 (Fig. 2) shifts the link 191 upwardly, causing the stud 192, in cooperation with the heart-shaped cam opening 195 in the arm 188, to be positioned in accordance with the value of the depressed amount key 73. Positioning of the stud 192, as explained above, through the slot 193 in the segment 194, positions said segment and the segment 196 in accordance with the value of the depressed amount key 73. Positioning of the segment 196 is transmitted by the pinions 199 and their corresponding square shafts to the receptacles 200 and 201 to bring the front and back indicator tablets 202 and 203 corresponding to the depressed amount key 73 into proper relative positions with the corresponding front and back apertures in the upper portion of the cabinet 70. After the tablets 202 and 203 have thus been positioned, an indicator lifting mechanism (not shown but which may be constructed in any suitable manner) functions according to the time given in space 12 of the chart (Fig. 59) to lift the selected indicator tablets 202 and 203 upwardly to the positions shown in Fig. 2, where said tablets are visible through their corresponding apertures in the cabinet 70.

After the indicators corresponding to the depressed amount key 73 have been positioned as explained above, the shaft 189 and the crank 190 (Fig. 2 and space 12, Fig. 59) are returned clockwise to home position to shift the stud 192 down into a wide portion of the heart-shaped opening 195, so that restoring movement of the printer sector 170 in the beginning of the succeeding operation, as will be explained presently, will not interfere with the positioning of the indicator mechanism, which remains positioned and is moved a minimum distance from its preset position to its new position without having to return to a home or initial position. If necessary or desirable, any suitable type of aliner mechanism may be used to aline the indicator mechanism in set position.

*Differential aliner operating mechanism*

The aliner 204 (Figs. 2 and 7) for the segment 165 and the sector 170 is secured on a shaft 206 journaled in the machine framework. The shaft 206 has secured thereon an arm 207, to which is pivotally connected the upper end of a pitman 208 having, in its lower end, a notch 209, which engages a stud 210 in a cam lever 211 (Figs. 7 and 8) pivoted on a stationary stud 212. The lever 211 carries rollers 213 and 214, which cooperate, respectively, with the peripheries of companion plate cams 215 and 216 secured on the main cam shaft 71 and operated thereby one clockwise revolution each machine operation. The lower end of the pitman 208 carries a stud 218, which engages a slot 219 in the upper end of an arm 220 connected in fixed relationship to a companion arm 222 by a hub 221 free on a stationary stud 223. The arm 220 is pivotally connected by a link 224 to an upward extension of a manually operable finger lever 225 free on a stationary stud 226. A segmental portion 227 (Fig. 7) of the lever 225 has two retaining notches corresponding to the two positions of said lever 225, which notches cooperate with an alining and retaining pawl 228 free on a stationary stud 229, said pawl being urged clockwise by a spring 230 into yielding engagement with said notches. Normally the lever 225 is in the position shown here, in which position the notch 209 in the lower end of the pitman 208 engages the stud 210, and in which the slot 219 is concentric with the pivot stud 212 for the lever 211, said slot, in cooperation with the stud 218, forming a guide for the lower end of the pitman 208.

When the notch 209 is engaged with the stud 210 (Figs. 7 and 8), revolution of the cams 215 and 216 rocks the lever 211 first counter-clockwise and then back to normal position to disengage and engage the aliner 204 according to the time given in space 14 of the time chart (Fig. 59). Moving the finger lever 225 counter-clockwise from normal position to repeat position, through the link 224, rocks the arm 220 also counter-clockwise to disengage the notch 209 in the lower end of the pitman 208 from the stud 210 to disconnect the aliner 204 from its operating lever 211 for the purpose of repeating the amount of the previous operation, as will be explained more fully presently.

*Differential segment restoring mechanism*

The differential segment 165 (Figs. 2 and 7) and the companion printer sector 170 remain in set positions at the end of machine operation and are restored to initial position at the beginning of the succeeding operation prior to initial movement of the differential slides 103 and 109. The segment and the sector are restored in one direction in adding and subtracting operations, so as to relieve load on the primary differential slide 103, which is positioned under influence of the depressed amount key, and in reading and resetting operations the segment and the sector are restored in the reverse direction at the beginning of such operations to relieve load on the secondary differential slide 109, which, in this case, is positioned prior to the primary slide 103 under influence of the corresponding wheel of the selected totalizer.

Directing attention to Figs. 2 and 7, secured on the shaft 166 is a crank 233 for the denomination being described, said crank carrying a stud 234, which cooperates with a surface 235 on the differential segment 165 in reading and resetting operations, and which cooperates with an extension 236 on said segment 165 in adding and subtracting operations.

Also secured on the shaft 166 (Fig. 16) is a gear segment 237, which cooperates with corresponding teeth 238 formed in an opening of an enlarged forward end of a lever 239 free on a stud 240 in an upward extension of the right-hand arm 149, which, together with its companion left-hand arm, supports the rod 146, which in turn supports the retaining pawls for the differential slides. The upper end of an operating pitman 241 (Figs. 16 and 17) is pivotally connected to the lever 239, while the lower end of said pitman has a notch 242, which cooperates with a stud 243 in a cam lever 244 free on the stud 212. The lever 244 carries rollers 245 and 246, which cooperate, respectively, with the peripheries of companion plate cams 247 and 248 secured on the main cam shaft 71. The pitman 241 carries in its lower end a stud 249, which engages a slot 250 in the arm 222, which, it will be recalled by referring to Fig. 7, is integral with the arm 220 and is controlled by the finger lever 225 for effecting repeat operations.

In adding and subtracting operations, the teeth 238 (Fig. 16) are in engagement with the corresponding teeth in the segment 237, and revolution of the cams 247 and 248 (Figs. 16 and 17) rocks the lever 239 first downwardly and then back to normal position, according to the time given in space 15 of the time chart (Fig. 59). Initial downward movement of the lever 239 rocks the segment 237, the shaft 166, and the crank 233 counter-clockwise, causing the stud 234 in said crank (Fig. 7), in cooperation with the extension 236 of the segment 165, to pick up said segment and carry it counter-clockwise from the position in which it was left in the preceding operation to initial or starting position. Inasmuch as the pawl 168 connects the segment 165 to its companion printer sector 170, said sector is returned counterclockwise in unison therewith to initial position and, in being thus returned through the gearing shown in Fig. 7, returns the corresponding printing wheels 177 to initial position.

Restoration of the differential segment 165 and the sector 170 to initial or zero position restores the gear 161 (Fig. 2 and spaces A and B, Fig. 4) and the corresponding lugs 160 and 162 clockwise to initial or zero position, as shown here, so as not to interfere with the lug 159 during positioning of the primary differential slide 103, which, it will be seen by comparing spaces 2 and 15, Fig. 59, occurs immediately after the restoration of said differential parts to initial or zero position.

By referring to Figs. 7 and 17, it will be noted that the slot 250 in the arm 222 is concentric with the stud 212 for the lever 244, and said slot, in cooperation with the stud 249, acts as a guide for the lower end of the pitman 241 during operation of the cams 247 and 248 and said lever 244.

A forward extension of the lever 225 (Figs. 7 and 16) extends through a suitable opening in the front of the cabinet 70 and provides convenient means for manually moving said lever from either of its two positions to the other.

If it is desired to repeat the amount of the previous operation in the immediately succeeding operation, movement of the finger lever 225 (Fig. 7) from "Normal" position, as shown here, downwardly or counter-clockwise to "Repeat" position, through the link 224, rocks the arms 220 and 222 counter-clockwise to disengage the notches 209 and 242 (Fig. 17) in the pitmans 208 and 241 from their respective studs 210 and 243 in their respective cam levers. This causes the aliner 204 to remain in engagement with the corresponding notch 205 in the segment 165 and the restoring lever 239 (Fig. 16) to be rendered inoperative; consequently the segment 165 and the printer sector 170 remain in the positions in which they were set in the preceding operation, and said segment, through the lugs 160 and 162 (Figs. 4 and 7), positions the differential slides 103 and 109 accordingly to repeat the amount of said preceding operation, which repeated amount is recorded by the type wheels 177 upon the record material, is indicated by the indicators 202 and 203 (Fig. 2) in the manner explained earlier herein, and may be simultaneously entered in the desired transaction totalizers and the auxiliary totalizer.

It is desirable that the amount keys 73 be locked against depression during repeat operations and also during sub-total and/or total recording operations, and any of the usual means which is suitable may be used for this purpose.

*Zero elimination mechanisms*

Each of the differential mechanisms of all the amount banks, except the three lower order amount banks, is provided with a zero elimination mechanism for eliminating the printing of zeros in the higher orders. The three lower orders of the present machine, as is the usual practice, have no zero elimination mechanism, as it is desirable that these zeros print at all times in order to properly record and indicate that no amount was involved in the transaction taking place. Normally the zeros are eliminated in all the higher order amount banks in which no amount key is depressed. However, depression of an amount key in a higher order bank renders the eliminating mechanism for that bank and all lower order banks inoperative, so that the zeros of the lower orders will print when an amount key is depressed in a higher order.

The zero elimination mechanism remains in eliminated position and retains the printer sector 170 in eliminated position, as shown in Fig. 25 at the end of machine operation, and, at the beginning of the immediately succeeding operation, the elimination mechanism is restored to zero position and carries the corresponding sector 170 to zero position in unison therewith, as shown in Fig. 7.

When the sector 170 is in zero position (Fig. 7), a spring 252 urges the pawl 168 clockwise to normally maintain said pawl in engagement with the notch in the plate 167 secured to the segment 165. The pawl 168 (Figs. 7 and 25) has a projection 253, which cooperates with a surface 254 on a zero elimination pawl 255, a yoked portion of which is free on a rod 256 supported by right and left arms 257 free on the shaft 166. The left arm 257 has a rearward extension with a notch 258 engaged by a stud 259 in the upper end of a lever 260 free on a stationary stud 261 (Figs. 7 and 9). The lever 260 carries rollers 262 and 263, which cooperate, respectively, with the peripheries of companion plate cams 264 and 265, secured on the main cam shaft 71.

When the pawl 255 is in restored position, as shown in Fig. 7, a forward extension 266 thereof engages a rod 267, supported by the order plates 86, to retain said pawl in counter-clockwise position, as shown here, against the action of a spring 268, to normally hold the surface 254 out of the path of the projection 253. Likewise, when the pawl 255 is in restored position, a finger 269 (Figs. 7 and 25) thereof engages the lower surface of the projection 253 to force the tooth of the pawl 168 into engagement with the notch in the plate 167 to insure that the printer sector 170 is connected to the corresponding differential segment 165 when said parts are in zero position.

When no amount key 73 is depressed in the amount bank being described (Figs. 2 and 7), the corresponding differential segment 165 remains in restored or zero position, as shown here, and, after the primary and secondary differential members or slides 103 and 109 have completed their initial movements to position the corresponding segments 165 and 170 of the other orders, and, after said segments 165 have been alined in set position by the aliner 204 (compare spaces 2 and 14, Fig. 59), the cams 264 and 265 (Figs. 7 and 9), operating according to the time given in space 27 of the chart (Fig. 60), rocks the lever 260 clockwise, said lever in turn rocking the arms 257, the rod 256, and the zero elimination pawl 255 counter-clockwise. Counter-clockwise movement of the pawl 255 withdraws the extension 266 thereof from the rod 267 and permits the spring 268 to rock said pawl clockwise to move its surface 254 over the upper surface of the projection 253 on the pawl 168. Continued counter-clockwise movement of the arms 257 causes the pawl 255 to rock the pawl 168 counter-clockwise, against the action of the spring 252, to disengage the tooth of said pawl from the notch in the plate 167 to disconnect the printer sector 170 from the segment 165. Continued counter-clockwise movement of the pawl 255 causes the surface 254 to engage a shoulder 270, formed on the periphery of the sector 170, and carry said sector counter-clockwise in unison therewith the equivalent of one space of the corresponding type wheels 177, to the position shown in Fig. 25. Counter-clockwise movement of the sector 170, through the gearing shown in Fig. 7, rotates the corresponding type wheels 177 also counterclockwise one space from zero position to a blank position, so that, upon operation of the printing mechanism, the zero for this denomination, in which no amount key is depressed, will not be recorded.

Eliminating counter-clockwise movement of the sector 170, through the pitman 186 (Figs. 2 and 7), rocks the cam arm 188 counter-clockwise from zero position to eliminating position. By comparing spaces 12, 13, and 27 of the time charts (Figs. 59 and 60), it will be seen that, while counter-clockwise movement is being imparted to the cam arm 188, the stud 192 is in its extreme upward position and connects said arm 188 to the corresponding segment 194 for unitary movement. It is therefore evident that counter-clockwise eliminating movement of the arm 188 and the segment 194 carries the corresponding receptacles 200 and 201 clockwise in unison therewith from zero position to zero eliminating position. Immediately thereafter, the indicator lifting mechanism functions according to the time given in space 12 (Fig. 59) to lift the blank tablets 202 and 203 (Fig. 2) upwardly into viewing position, to eliminate the indicating of zeros when no amount key 73 is depressed.

At the end of machine operation, the zero eliminating mechanism remains in eliminating position, as shown in Fig. 25, and, near the beginning of the next operation, the cams 264 and 265 (Fig. 9), operating according to the time given in space 27, Fig. 60, return the cam lever 260 counter-clockwise to in turn return the arms 257, the rod 256, and the pawl 255 clockwise or upwardly. Upward movement of the pawl 255 causes the finger 269 to engage the lower surface of the projection 253 and carry the pawl 168 and the sector 170 clockwise in unison therewith from eliminating position to zero position, during which movement the tooth of said pawl 168 rides on the periphery of the plate 167. As the pawl 255 (Figs. 7 and 25) nears the end of its restoring movement, its extension 266 engages the rod 267 and rocks said pawl counter-clockwise against the action of the spring 268 to move the surface 254 out of the path of the shoulder 270 and the projection 253. During disengaging movement of the pawl 255, its finger 269, in cooperation with the projection 253, forces the tooth of the pawl 168 into engagement with the notch in the plate 167 to insure that the sector 170 and the segment 165 are again connected for unitary movement.

In machine operations in which an amount key 73 (Fig. 2) is depressed, movement of the differential segment 165 and the corresponding sector 170 by the secondary differential slide 109, as explained earlier herein, moves a peripheral surface 271 on said sector 170 into the path of the upper end of the zero elimination pawl 255 to retain said pawl in its counter-clockwise or ineffective position, as shown in Fig. 7, and against clockwise movement when its extension 266 is withdrawn from the rod 267, as explained above. This restraining of the pawl 255 against clockwise engaging movement (Figs. 7, 25, and 58), through a stud 272 carried by said pawl, in cooperation with a surface 273 on the left arm of the adjacent lower order pawl 255, also holds said lower order pawl in ineffective position, so that the zero of that order will be recorded. This result extends on through the lower order, so that the zeros of said lower orders will be recorded in operations in which an amount key 73 is depressed in a higher order.

In the three lower orders, which have no zero elimination mechanisms, the pawls 255 (Figs. 2 and 7) may be omitted and the pawls 168 secured in the notches in the plates 167 carried by the corresponding segments 165, or said segments may be secured in some other suitable manner to the corresponding sectors 170 to insure that said corresponding parts will move in unison at all times. Another suitable alternative would be to combine the corresponding segments 165 and sectors 170 into one part for use in the three lower orders.

*Transaction keys and their differential mechanism*

Figure 1:
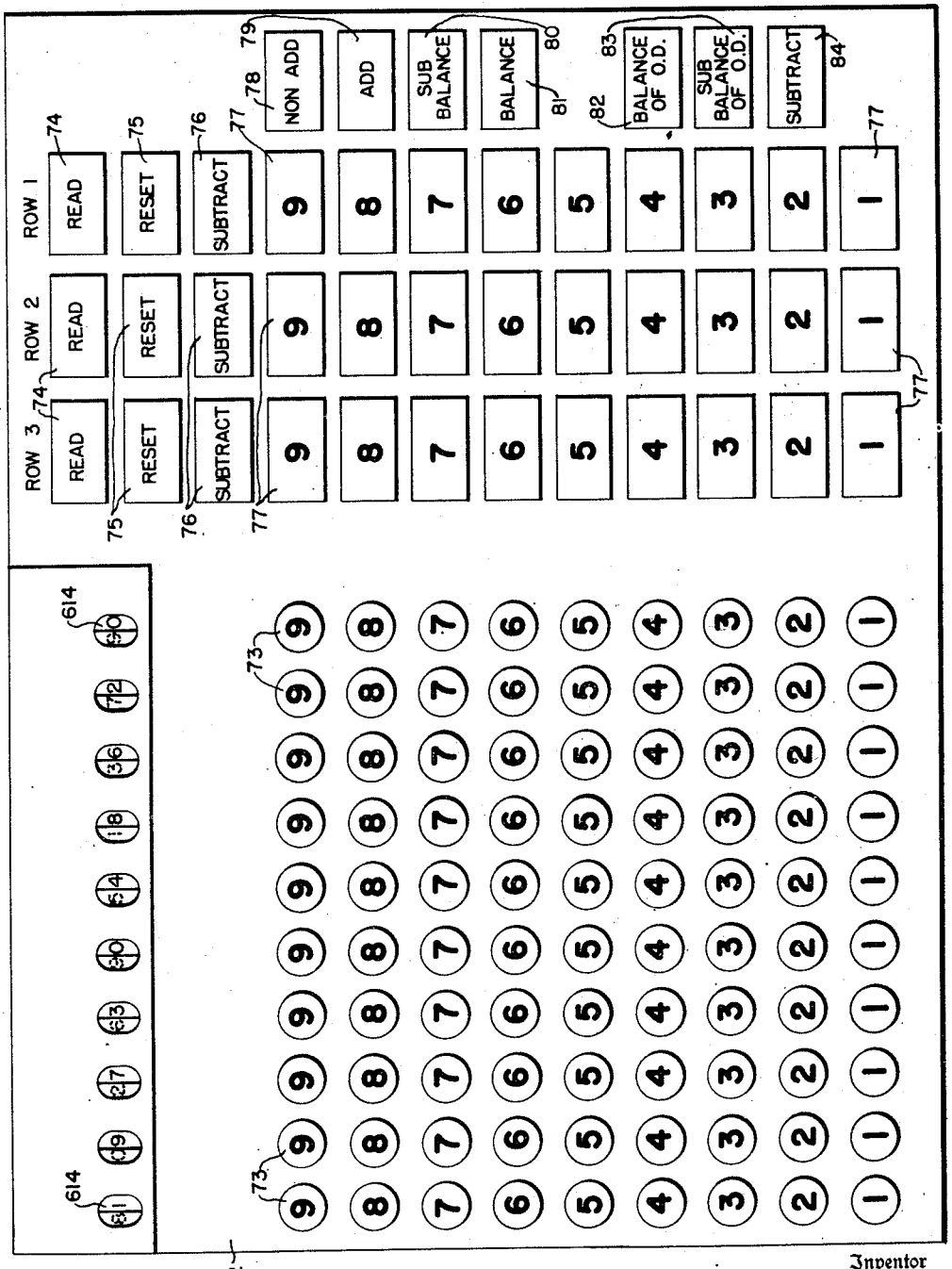
Fig. 1 is a diagrammatic plan view of the keyboard of the machine of the present invention.

The machine embodying the present invention has three transaction totalizer lines, each of which has nine sets of totalizer wheels thereon, which sets of wheels are selected for engagement with the secondary differential slides 109 by means of the corresponding rows of selecting keys 77 (Figs. 1 and 10). Each of the rows of selecting keys likewise includes corresponding Read, Reset, and Subtract control keys 74, 75, and 76, for controlling the functions of the corresponding totalizers. When no selecting key 77 is depressed, the corresponding totalizer line is non-added, and this is true regardless of whether or not one of the keys 74, 75, or 76 in the same row is depressed.

Depression of one of the selecting keys 77 without depression, in conjunction therewith, of one of the corresponding control keys 74, 75, or 76 in the same row causes the selected set of totalizer wheels to be engaged with and disengaged from the secondary differential slides 109 in adding time. Use of one of the control keys 74, 75, or 76 in conjunction with a selecting key 77 in the same row causes the corresponding set of totalizer wheels to be selected for engagement with and disengagement from the secondary differential slides in read, reset, or subtract timing, depending upon which of said control keys is depressed.

Inasmuch as the transaction differential mechanism is substantially duplicated for the three transaction totalizer lines, it is believed that a description of the transaction differential mechanism for the No. 1 totalizer line, in conjunction with a detailed description of said totalizer line, will be sufficient for the present purpose.

The control keys 74, 75, and 76 for the first transaction bank (Figs. 1 and 10) and the totalizer selecting keys 77 for said bank are depressibly mounted in a transaction key frame 276 secured to a corresponding transaction order plate similar to the order plate 86 for the amount bank (Fig. 2). The upper ends or finger tips of the transaction keys extend through corresponding clearance openings in the keyboard plate 72. The control keys 74, 75, and 76 carry, respectively, key pins 277, 278, and 279, which extend through corresponding clearance slots in the key frame 276, and each of the selecting keys 77 carries a corresponding key pin 280, which extends through corresponding slots in said key frame 276. A long coiled spring 281 (Fig. 10), alternately laced between the key pins 277 to 280 inclusive and between stationary studs in the key frame 276, urges the transaction keys upwardly to normal or undepressed position, as shown here. The pins 280 (Fig. 10), carried by the selecting keys 77, cooperate with corresponding camming surfaces on corresponding projections 282 formed on a flexible detent 283, the forward end of which is pivotally connected to a crank 284 free on a stud in the transaction order plate. The rearward end of the detent 283 is shiftably supported between rollers carried by studs 285 secured in the transaction key frame 276.

Depression of one of the keys 77 (Fig. 10) causes the corresponding pin 280, in cooperation with the camming surface on the corresponding projection 282, to shift the detent 283 rearwardly against the action of a spring 286 until an upper flattened surface on said pin 280 by-passes the locking tooth formed on said projection 282, whereupon the spring 286 returns the detent 283 forwardly a slight distance to latch the tooth over the flat surface to secure the key 77 in depressed position. Depression of a second key, after one key 77 has already been depressed, causes a corresponding pin 280 therein, in cooperation with the corresponding camming projection 282, to shift the detent 283 rearwardly to release the previously depressed key, thus providing what is commonly referred to as "flexible key action." A projection on the forward end of the detent 283 cooperates with a stud 287 in a crank 288 operatively connected to the key release shaft 99 (Fig. 2) for the amount keys 73. Near the end of machine operation, initial counter-clockwise movement of the crank 288 and the stud 287 (Fig. 10) shifts the detent 283 rearwardly against the action of the spring 286 to release the depressed selecting key 77.

A link 289 (Figs. 10 and 15) pivotally connects the flexible detent 283 to a non-add pawl 290 free on a short shaft 291 supported in the transaction portion of the machine framework. When no selecting key 77 is depressed, the non-add pawl 290 (Figs. 10 and 15) is positioned as shown here, in which position a shoulder 292 thereon is in the path of a bent-over ear 293 on an arm 294, which arm controls the functioning of the No. 1 transaction totalizer in a manner to be described presently. Depression of one of the keys 77 shifts the detent 283 rearwardly, as explained before, to rock the non-add pawl 290 counter-clockwise to move the shoulder 292 thereon out of the path of the bent-over ear, so that the arm 294 is free to move counter-clockwise to control the functioning of the No. 1 transaction totalizer.

Each of the pins 277, 278, and 279 (Figs. 10, 11, and 15) for the control keys 74, 75, and 76 of the transaction bank being described cooperates with corresponding camming slots 297, 296, and 298 in a control plate 299 shiftably supported at its forward end by the rollers on the studs 285 and having its rearward end pivotally connected to a stud 300 in an extension of a control pawl 301 free on the shaft 291. When none of the keys 74, 75, or 76 is depressed, a spring 302 urges the control plate 299 rearwardly to maintain a stop extension 303 on the forward end of said control plate in contact with the roller on the stud 285 to position the pawl 301 as shown here, in which position an add step 379 thereon is opposite the bent-over ear 293 to position the arm 294 in add position.

Depression of the Read key 74, through the pin 277 in cooperation with the slot 296, shifts the control plate 299 forwardly against the action of the spring 302, to position the pawl 301 so that the read step 590 thereon is opposite the ear 293 to position the arm 294 in read position, as will be explained presently. Inasmuch as the timing of the engaging and disengaging movement of the No. 1 totalizer line is the same in reset and subtract operations, depression of either the Reset key 75 or the Subtract key 76 causes the corresponding pin 278 or 279, in cooperation with the corresponding slot 297 or 298, to shift the plate 299 forwardly against the action of the spring 302 the proper extent to rock the pawl 301 counter-clockwise, so that the reset and subtract step 442 thereon is opposite the ear 293, to cause the arm 294 to be positioned in reset or subtract position.

The control plate 299 is mounted adjacent the transaction detent 283 (Fig. 10) and is properly spaced in relation to said detent by suitable spacing washers on the studs 285.

Full depression of any one of the keys 74, 75, or 76 (Figs. 10, 11, and 15) moves flattened upper surfaces on the corresponding pins 277, 278, and 279 thereof beyond a corresponding locking tooth in the bottom of the corresponding slots 296, 297, or 298, whereupon the spring 302 returns the control plate 299 a slight distance rearwardly to latch said tooth over said flattened surface to retain the corresponding key in depressed position. Likewise, forward movement of the plate 299, upon depression of any one of the keys 74, 75, or 76, moves obstructing surfaces formed adjacent the camming slots 296, 297, and 298 on the upper edge of said plate 299 beneath flattened lower surfaces on the pins 277, 278, or 279 of the undepressed control keys to lock said keys against depression when one control key has previously been depressed.

Near the end of machine operation, an arm 304 (Figs. 10, 11, and 15), secured on the shaft 141, receives an extreme counter-clockwise key-releasing movement to cause an upwardly-extending finger thereof, in cooperation with a stud 305 in the control plate 299, to shift said plate forwardly, against the action of the spring 302, a sufficient distance to move the teeth in the slots 296, 297, and 298 out of the path of the flat upper surfaces on the corresponding pins 277, 278, and 279 to release the corresponding Read, Reset, or Subtract key for restoring upward movement under influence of the spring 281 (Fig. 10).

Also secured on the shaft 141 (Figs. 16 and 22) is an arm 306 having a stud 307 engaged by a notch in the upper end of a lever 308 pivoted on a stationary stud 309. Angular arms of the lever 308 (Fig. 16) support rollers 310 and 311, which cooperate, respectively, with the peripheries of companion plate cams 312 and 313, secured on an auxiliary cam shaft 314 journaled in the machine framework and geared to and driven by the main cam shaft 71 one counter-clockwise revolution each machine operation. Counter-clockwise revolution of the cams 312 and 313, through the linkage shown in Fig. 16, rocks the shaft 141 and the arm 304 (Figs. 10, 15, and 22) first clockwise and then back to normal position according to the time given in space 18 of the chart, Fig. 60.

By referring to space 18 of the time chart, Fig. 60, it will be noted that rotation of the cams 312 and 313 through 295 to 330 degrees of their movement imparts return counter-clockwise movement to the arm 304, whereupon the upwardly extending finger of said arm, in cooperation with the stud 305 in the plate 299, shifts said plate forwardly, against the action of the spring 302, to release the depressed control key 74, 75, or 76 in the manner explained above. After the depressed control key has been released, the arm 304 is returned clockwise a slight distance to home position, as shown in Fig. 10, to permit the spring 302 to return the plate 299 to home position, as shown in Fig. 15.

*Transaction differential and totalizer selecting mechanisms*

Depression of one of the selecting keys 77 (Figs. 1 and 10) for the No. 1 transaction totalizer line moves the lower end of its stem into the path of a corresponding stop surface or step 316 on a transaction differential slide 317 mounted for linear shifting movement by means of two parallel slots therein in cooperation with a stationary stud 318 and a shaft 319 journaled in the transaction framework. The forward end of the slide 317 (Figs. 10 and 41) has a slot 320, which engages a stud 321 in a sector 322 free on a shaft 323 journaled in the transaction framework. The sector 322 has a notch 324, which engages a stud 325 in an extension of a transaction differential latch 326 pivoted on a stud 327 in a latch plate 328 free on the shaft 323. A spring 329 (Fig. 41) urges the latch 326 clockwise to normally maintain a driving tooth thereof in engagement with a notch 330 in a driving segment 331 secured on the shaft 323. Also secured on the shaft 323 (Figs. 41 and 44) is a segmental gear 332, which meshes with teeth in an upward extension of an arm 333 secured on a short shaft 335 journaled in the transaction framework. A rearward extension of the arm 333 is pivotally connected by a link 336 to a Y-shaped cam lever 337 journaled on a stationary stud 338. The lever 337 carries rollers 339 and 340, which cooperate, respectively, with the peripheries of companion plate cams 341 and 342, secured on the main cam shaft 71 and driven thereby one clockwise revolution each machine operation.

Revolution of the cams 341 and 342, through the mechanism shown in Fig. 44, rocks the drive segment 331 first clockwise and then back to normal position according to the time given in space 1 of the time chart (Fig. 59). Iinitial clockwise movement of the segment 331, through the notch 330 and the latch 326, carries the plate 328 (Fig. 41) and the sector 322 clockwise in unison therewith to shift the slide 317 (Figs. 10 and 41) rearwardly. The slide 317 moves rearwardly until such movement is terminated by the step 316 thereon contacting the lower end of the corresponding depressed selecting key 77, to position said slide 317 accordingly. Positioning of the slide 317 terminates clockwise movement of the sector 322 and positions said sector in accordance with the positioning of said slide 317. Continued clockwise movement of the plate 328 and the latch 326 causes the notch 324, in cooperation with the stud 325 (Fig. 41), to rock said latch 326 counter-clockwise against the action of the spring 329 to disengage the tooth of said latch from the notch 330 in the drive segment 331 and to simultaneously engage an alining tooth 343 on said latch with a corresponding alining notch 344 in a plate 345 supported by the rods 87 and 267.

This disengages the plate 328 from the drive segment 331 and positions said plate in accordance with the positioning of the slide 317, which, it will be recalled, is positioned by the depressed selecting key 77. After the driving tooth on the latch 326 (Fig. 41) has been disengaged from the notch 330, a peripheral surface 346 on the segment 331 moves opposite said tooth to secure the alining tooth 343 in engagement with the corresponding alining notch 344, to in turn secure the plate 328 and connected parts in set positions.

The differential positioning of the plate 328 (Figs. 10 and 41) is transmitted to a corresponding printer segment 347 free on the shaft 323, through a beam 348, which is pivotally connected at 349 to said segment and which beam has a slot 350, which engages a stud 351 carried by said plate 328. Initial counterclockwise movement of the shaft 335, under influence of the cams 341 and 342 (Figs. 41, 44, and space 1, Fig. 59), causes a roller 352, carried by an arm 353 secured on said shaft, in cooperation with an arcuate surface 354 on the beam 348, to force said beam forwardly or toward the shaft 323, until an inner arcuate surface 355 on said beam contacts a collar secured on said shaft 323. This positions the printer segment 347 (Figs. 10 and 41) in accordance with the depressed selecting key 77.

Directing attention to Figs. 10, 16, 41, and 58, the teeth on the periphery of the segment 347 mesh with and drive a corresponding gear 357 secured on a short shaft 358 journaled in the transaction framework. Also secured on the shaft 358 is a drum cam 359 having a helical camming groove 360 engaged by a roller 361 journaled on a totalizer shifting pin 362 secured to the No. 1 totalizer shaft 132. The No. 1 totalizer shaft 132 is mounted for axial shifting movement in a No. 1 totalizer framework 363, which is likewise shiftable inwardly and outwardly to engage and disengage the selected set of totalizer wheels 131 with and from the corresponding secondary differential slides 109 (Fig. 2). The drum cam 359 (Fig. 58) fits snugly between an order plate 368 for the No. 3 transaction bank and a shifting cam support plate 370. A cross plate 364, extending between the plates 368 and 370, has a guide slot which engages a tenon on the roller 361 to cause said roller to travel in a line under influence of the helical groove 360 to impart proper lateral selecting movement to the No. 1 totalizer shaft 132. A flange, formed approximately in the center of the roller 361, cooperates with the top surface of the plate 364 to retain said roller in engagement with the helical groove 360.

Positioning of the segment 347 (Figs. 10, 41, and 58) under influence of the depressed selecting key 77, as explained above, through the gear 357 and the shaft 358, rotates the drum cam 359 an extent corresponding to the depressed selecting key. Rotation of the drum cam 359 causes the helical groove 360 therein, in cooperation with the roller 361, to shift the No. 1 totalizer line or shaft 132 laterally to a position corresponding to said depressed selecting key. This alines the set of totalizer wheels 131 on the shaft 132 corresponding to the depressed selecting key 77 with the secondary differential slides 109. After the selected set of totalizer wheels 131 have thus been alined with the secondary differential slides, engaging and disengaging movement is imparted to the totalizer framework 363, as will be explained in detail later, to engage and disengage the selected set of totalizer wheels with and from the secondary differential slides 109 in proper timing to effect the type of operation desired.

The differential setting of the segment 347 (Figs. 10 and 41) is transmitted to a corresponding type wheel, so that a character, identifying the selecting key 77 and the set of totalizer wheels 131 corresponding thereto, will be printed upon the record material.

The teeth on the periphery of the segment 347 (Fig. 10) mesh with the external teeth on an external-internal gear 365, the internal teeth of which bear on the periphery of a corresponding disk 366 secured on the shaft 173. The gear 365 is similar in appearance and operation to the gear 171 for the amount bank shown in Fig. 2 and, through a corresponding one of the square shafts 175 and pinions similar to the pinions 174 for the amount bank, drives and positions a gear corresponding to the gear 176 for the amount bank, said gear in turn driving and positioning a corresponding type wheel 367 to print a character on the record material 181 for identifying the depressed selecting key 77 and the corresponding set of type wheels.

Engaging upward movement (Fig. 58) of the No. 1 totalizer shaft 132 shifts the pin 362 upwardly in unison therewith to cause said pin to engage the one of a series of holes 369 in the bottom of the groove 360 corresponding to the depressed selecting key 77, to aline and secure said No. 1 totalizer shaft and the totalizer wheels 131 is selected position.

Near the end of machine operation, the cams 341 and 342 (Figs. 41 and 44), functioning according to the time given in space 1 of the chart (Fig. 59), return the segment 331 counter-clockwise to home position. During return movement of the segment 331, the notch 330 therein moves opposite the tooth on the latch 326, whereupon the spring 329 disengages the tooth 343 on said latch from the corresponding alining notch 344 and simultaneously engages said latch with the driving notch 330. Simultaneously with the engaging of the latch 326 with the notch 330, a surface 371, formed on a right-hand extension of the segment 331, engages an enlarged portion 372 of the stud 351 and, during the remainder of the return movement of said segment, restores the plate 328, the sector 322, and the slide 317 to home or normal position.

It will be noted that restoration of the plate 328 to home position does not interfere with the positioning of the segment 347, and consequently said segment and connected mechanism remain in set positions at the end of machine operation and in the succeeding operation are moved directly from their preset positions to their new positions without having to return to a neutral or home position.

As explained previously, the No. 2 and No. 3 transaction banks have differential mechanisms similar in every respect to that described for the No. 1 transaction bank for selecting the different sets of wheels on the No. 2 and No. 3 totalizer lines for engagement with and disengagement from the secondary differential slides 109. However, the segments for the No. 2 and No. 3 transaction banks corresponding to the segment 347 for the No. 1 transaction bank, instead of directly positioning the corresponding drum cams, are connected by links 373 and 374 (Fig. 10) to corresponding segments 375 and 376, which, through corresponding gears similar to the gear 357, and corresponding shafts similar to the shaft 358, position corresponding drum cams 377 and 378 in exactly the same manner as described for the No. 1 transaction bank.

*Transaction totalizer engaging mechanism*

By referring to Figs. 2 and 10, it will be recalled that, when none of the keys of the first transaction bank are depressed, the No. 1 transaction totalizer line is non-added, and that, when a selecting key 77 is depressed alone—that is, not in conjunction with one of the control keys 74, 75, or 76—the No. 1 transaction totalizer is selected and conditioned for an adding operation. It will likewise be recalled that depression of a selecting key 77 (Figs. 10 and 15) shifts the detent 288 rearwardly, which movement, through the link 289, rocks the non-add pawl 290 counter-clockwise to move the shoulder 292 thereon out of the path of the ear 293 on the arm 294 and to free said ear 293 for engagement with the add step 379 on the control pawl 301.

The arm 294 (Figs. 10, 11, and 15) is free on a shaft 380, journaled in the transaction framework, and a downward extension of said arm carries a stud 381, which is normally maintained in yielding engagement with a finger 382 of the arm 304 by a spring 383 tensioned between said arms 304 and 294. The arm 294 has a slot 384, through which extends a roller 385, mounted on the rear end of a link 386, pivotally connected at its forward end to the arm 304. The roller 385 likewise extends within a heart-shaped cam slot 387 in an arm 388 free on the shaft 380. A downward extension of the arm 388 is pivotally connected by a link 389 to the upper end of a crank 390 secured on a shaft 391 journaled in the transaction framework. Also secured on the shaft 391 (Figs. 10 and 11) is an arm 392, an upward extension of which has a slot which embraces a stud 393 in the upper end of a plate 394, shiftably mounted by means of parallel slots therein, in cooperation with stationary studs 395 and 396 secured in the order plate 368 (Fig. 58) for the first transaction bank. The shifting plate 394 has a slot 398 engaged by a roller 399 in the rearward end of a link 400, the forward end of which link is pivotally connected to a crank 401 secured on a No. 1 totalizer engaging shaft 402 journaled in the transaction framework. Also secured on the shaft 402 (Figs. 16, 26, and 58) are similar cams 403 and 404 having identical camming slots 405, which cooperate, respectively, with rollers 406 and 407, supported by studs in the right-hand and left-hand side members of the totalizer framework 363.

Initial movement of the cams 312 and 313 (Figs. 11, 16, and 22), through the lever 308, rocks the arm 306, the shaft 141, and the arm 304 first clockwise according to the time given in space 18 of the time chart (Fig. 60). Initial clockwise movement of the arm 304 (Fig. 11), through the spring 383, carries the arm 294 counter-clockwise in unison therewith until the bent-over ear 293 of said arm engages the add step 379 (Figs. 11 and 15) on the pawl 301 to position said arm 294 in adding position. After counter-clockwise movement of the arm 294 has been terminated by contact of the ear 293 with the step 379, continued clockwise movement of the arm 304 tensions the comparatively strong spring 383 to insure that said arm 294 is firmly held in set position.

The arm 388 (Fig. 11) has four alining notches 409, corresponding to the four positions of said arm, which at certain times are engaged by an alining tooth on an aliner 410 secured on a shaft 411 journaled in the transaction framework. Also secured on the shaft 411 is a crank 412 pivotally connected by a link 413 to an arm of a lever 414 free on the shaft 314. Angular extensions of the lever 414 carry rollers 416 and 417, which cooperate, respectively, with the peripheries of companion plate cams 418 and 419, secured on the cam shaft 71.

Prior to initial clockwise movement of the arm 304 (Fig. 11), the cams 418 and 419, operating according to the time given in space 17 of the time chart (Fig. 60), rock the lever 414 clockwise, which movement is imparted by the link 413 to the crank 412, the shaft 411, and the aliner 410, to disengage the tooth of said aliner from the notches 409 in the arm 388.

Continued clockwise movement of the arm 304, after the arm 294 has been located in adding position, shifts the link 386 rearwardly, causing the roller 385 carried thereby, guided by the slot 384 in said arm 294, and in cooperation with the heart-shaped camming slot 387, to position the arm 388 in accordance with the positioning of the arm 294; that is, in adding position. After the arm 388 has thus been positioned, continued rotation of the cams 418 and 419 (Fig. 11 and space 17, Fig. 60) returns the lever 414 counter-clockwise to engage the tooth of the aliner 410 with the add notch 409 in said arm 388 to secure said arms 294 and 388 in set position. Counter-clockwise positioning movement of the arm 388 (Figs. 10 and 11), through the link 389, rocks the crank 390, the shaft 391, and the arm 392 clockwise to shift the plate 394 downwardly an extent corresponding to the positioning of the arm 294 to locate said plate 394 and, through the slot 398 in said plate, the roller 399 in adding position. Movement of the roller 399 (Figs. 10 and 18) to adding position places said roller between shifting lugs 420 and 421 on a totalizer engaging plate 422 mounted for linear shifting movement by means of three parallel slots therein, in cooperation with stationary studs 396, 424, and 425. The plate 422 has a notch which engages a roller 426 mounted on one end of a cam lever 427, the other end of which lever is pivoted on a stationary stud 428. The lever 427 carries rollers 429 and 430, which cooperate, respectively, with the peripheries of companion plate cams 431 and 432, secured on the main cam shaft 71. The lever 427 extends between the cams 431 and 432, and a clearance slot 433 therein encircles a hub connecting said cams, said hub being secured to the shaft 71.

The cams 431 and 432 (Figs. 10, 11, 16, 18, and 58), operating according to the time given in space 3 of the time chart (Fig. 59), shift the add-engaging plate 422 first rearwardly and then back to normal position. Initial rearward movement of the plate 422, through the lugs 420 and 421, the roller 399, and the link 400, rocks the crank 401, the shaft 402, and the cams 403 and 404 clockwise. Clockwise movement of the cams 403 and 404 causes the camming slots 405 therein, in cooperation with the rollers 406 and 407, to shift the totalizer framework 363 upwardly to engage the selected set of wheels 131 on the No. 1 totalizer line 132 with the teeth 130 in the lower edges of the secondary differential slides 109 (Fig. 2).

By comparing spaces 2 and 3 of the time chart (Fig. 59), it will be seen that in adding operations the wheels of the selected totalizer are engaged with the secondary differential slides after said slides have completed their initial movements and have been positioned under influence of the depressed amount keys 73, and that the said selected set of wheels remain in engagement with said secondary slides during their return forward movement, which movement rotates said wheels in an additive direction to enter therein the value of the depressed amount keys 73. After the secondary differential slides 109 have completed their return forward movements, the cams 431 and 432 return the engaging plate 422 forwardly to restore the engaging shaft 402 counter-clockwise, causing the cam slots 405 in the cams 403 and 404 to shift the totalizer framework 363 downwardly to disengage the selected set of totalizer wheels from the teeth 130 on the lower edges of the secondary differential slides 109.

Near the end of machine operation, the cams 312 and 313 (Figs. 11 and 16 and space 18, Fig. 60) restore the shaft 141 and the arm 304 counter-clockwise to normal position, as shown here, to move the roller 385 into the enlarged portion of the heart-shaped cam slot 387 and to simultaneously cause the finger 382 on said arm 304 to engage the stud 381 to restore the arm 294 clockwise to normal or non-add position, as shown here.

By referring to Fig. 11 and space 17, Fig. 60, it will be noted that the aliner 410 remains in engagement with the add notch 409 in the arm 388 at the end of machine operation to retain said arm and connected mechanism in set positions. In the succeeding machine operation, the arm 388 and connected mechanism are moved directly from their old positions to their new positions without having to return to a normal or home position.

The shiftable framework 363 (Figs. 16 and 58) for the No. 1 transaction totalizer comprises right and left plates 435 and 436, connected by a bail 437, a shaft 484, and rods 489 and 490. The framework 363 is mounted for shifting movement by means of vertical slots in the right transaction order plate 368 and in a left plate 438, in cooperation with opposite ends of the No. 1 totalizer shaft 132, which, it will be recalled, is mounted for axial shifting movement in said totalizer framework 363. The totalizer framework 363 is further supported for shifting movement by means of the rollers 406 and 407 in cooperation with corresponding slots in the plates 368 and 438. The bail 437 (Figs. 26, 30 and 58) has formed on its upper edge an alining bar 440, which engages the teeth of all of the No. 1 totalizer wheels except the selected set of wheels which are in alinement with the secondary differential slides 109. The alining bar 440 has therein a series of slots 441, which are in alinement with the secondary differential slides 109 to provide clearance for the selected set of totalizer wheels 131 so that said wheels may be actuated by said secondary differential slides.

*Subtract operation*

By referring to Fig. 10, it will be recalled that in subtract operations the Subtract key 76 is depressed in conjunction with the proper one of the selecting keys 77 and causes the selected set of totalizer wheels to be engaged with and disengaged from the secondary differential slides 1090 in subtract timing to subtract therefrom the value of the depressed amount keys 73.

In subtract operations, depression of the proper one of the selecting keys 77, through the detent 283 (Figs. 10 and 15), rocks the non-add pawl 290 to ineffective position, so that the arm 294 may be positioned under influence of the pawl 301, which pawl, it will be recalled, is normally in adding position, as shown here, but which may be positioned under influence of the keys 74, 75, and 76 to read, reset, and subtract positions, respectively. Depression of the Subtract key 76 (Figs. 10 and 15) causes the pin 279 therein, in cooperation with the cam slot 298, to shift the plate 299 forwardly against the action of the spring 302, until the flatted surface of said pin 279 by-passes the tooth near the bottom of said slot 298, whereupon the spring 302 returns the plate 299 a slight distance rearwardly to latch the Subtract key 76 in depressed position. Positioning of the plate 299 by the Subtract key 76 causes said plate in turn to position the pawl 301 so that a reset and subtract step 442 thereon is in alinement with the ear 293 on the arm 294.

Counter-clockwise positioning movement of the arm 294 (Figs. 10, 11, and 15), under influence of the arm 304, as explained in connection with adding operations, causes the ear 293 to contact the subtract and reset step 442 on the pawl 301 to position said arm 294 in subtract and/or reset position, whereupon the roller 385 in the link 386, in cooperation with the slot 384 and the heart-shaped cam slot 387 in the arm 388, positions said arm also in subtract and/or reset position. Positioning of the arm 388, through the link 389 (Figs. 10 and 11), the crank 390, the shaft 391, and the arm 392, shifts the plate 394 downwardly to subtract and/or reset position. Positioning of the plate 394 in subtract position engages the roller 399 with a notch 443 in a subtract and reset engaging plate 444 mounted for linear shifting movement by means of parallel slots therein, in cooperation with the studs 396, 424, and 425, and said plate is further supported by means of two other parallel slots therein, in cooperation with stationary studs 445 and 446. The subtract plate 444 (Fig. 10) has in its lower edge a notch 447 engaged by an extension of a lever 448 free on the stud 428. The lever 448 carries rollers 449 and 450, which cooperate, respectively, with the peripheries of companion plate cams 451 and 452, secured on the main cam shaft 71. The lever 448 is mounted between the cams 451 and 452 and has therein a clearance slot 453, which encircles a hub connecting said cams, said hub providing the means for securing said cams to the shaft 71. As in adding operations, the selecting keys 77 (Figs. 10 and 41), through the No. 1 transaction differential mechanism, controls the selection of the corresponding set of wheels 131 on the No. 1 totalizer line and likewise controls the positioning of the corresponding type wheel 367 to print an identifying character for the selected totalizer wheels.

The timing of the reset and subtract cams 451 and 452 is given in space 6 of the time chart (Fig. 59), and, by comparing space 6 with space 2, it will be seen that the engaging plate 444 is shifted rearwardly to rock the shaft 402 and the cams 403 and 404 (see also Figs. 26 and 58) clockwise to engage the selected set of wheels 131 of the No. 1 totalizer with the teeth of the secondary differential slides 109 (Fig. 2) prior to their initial rearward movement, which movement rotates the selected set of wheels in a subtractive direction to subtract therefrom the value of the depressed amount keys 73. After the selected set of totalizer wheels has been actuated in subtract operations and prior to return movement of the differential slides 109, the engaging plate 444 (Fig. 10 and spaces 2 and 6, Fig. 59) is returned forwardly to disengage said selected wheels from the secondary differential slides to properly effect a subtract operation.

*Tens transfer mechanism*

The present machine is provided with a tens transfer mechanism for transferring tens digits from lower to higher denominations in adding operations and for transferring tens digits from higher to lower denominations in subtracting operations. The transfer mechanism of the present machine is similar in some respects to the well-known types of transfer mechanisms and includes a transfer segment for each denominational order, which is engageable with the selected set of totalizer wheels in proper timing during adding and subtracting operations to transfer tens digits. The transfer segments are driven by corresponding spring-actuated operating arms, which are released for operation when the adjacent lower order wheel passes through zero. Each of the transfer operating arms has a Y-shaped slot therein for driving the corresponding transfer segment, and in adding operations a stud carried by an extension of said transfer segment is guided into the add branch of the Y-shaped slot, whereupon operation of the arm drives the segment one step in an additive direction to transfer tens digits. In subtract operations, the stud on the transfer segment is guided into the subtract branch of the Y-shaped slot, whereupon operation of said arm drives said segment one step in a subtractive direction to subtract one from the corresponding order when the adjacent lower order wheel passes through zero while traveling in a subtractive direction.

Directing attention to Figs. 2, 26, 30, and 34, each denominational order of the No. 1 transaction totalizer has a transfer segment 455 having, on its upper portion, teeth arranged to mesh with the teeth of the selected set of totalizer wheels 131 on the No. 1 totalizer line for the purpose of transferring tens digits. The transfer segments 455 are rotatably supported by a rod 456, which, together with a companion shaft 457 and rod 458, extends between side plates 459 and 460 (see also Fig. 58) of a transfer framework, shiftably mounted by means of corresponding parallel slots in the plates 368 and 438, in cooperation with said shaft 457 and said rod 458, and by means of slots in the side members 435 and 436 of the totalizer framework 363 in cooperation with opposite ends of the rod 456.

Secured on opposite ends of the shaft 457 (Figs. 15, 26, and 58) are two similar arms 461 having mounted on their lower ends similar rollers 462, which extend through and cooperate with corresponding camming slots 463 in the plates 368 and 438 and with corresponding cam slots 464 in the side members 435 and 436 of the No. 1 totalizer framework 363, for the purpose of shifting the transfer framework in relation to said totalizer framework, as will be explained in detail presently. The roller 462 on the righthand arm 461 (Figs. 16 and 26) extends through a corresponding slot 465 in a shifting plate 466, mounted for linear shifting movement between stationary studs 467 and engaging shafts 468 and 469 for the No. 2 and the No. 3 transaction totalizers, respectively, said engaging shafts 468 and 469 being similar to and functioning exactly like the shaft 402 for the No. 1 totalizer. The plate 466 (Fig. 16) has in its lower edge a slot 470 engaged by the rounded upper end of a lever 471 free on a stationary stud 472. The lever 471 carries rollers 473 and 474, which cooperate, respectively, with the peripheries of companion plate cams 475 and 476, connected in spaced relationship to each other by a hub secured to the main cam shaft 71. The lever 471 fits freely between the companion plate cams 475 and 476, and a clearance slot 477 therein encircles the hub which connects said cams, so that said lever is free to rock back and forth under the influence of said cams.

The cams 475 and 476 (Fig. 16) make one clockwise revolution each machine operation to shift the plate 466 back and forth according to the time given in space 5 of the time chart (Fig. 59) to rock the arms 461 (Figs. 16 and 26) back and forth accordingly. This causes the rollers 462, carried by said arms 461, in cooperation with the cam slots 463 and 464, to shift the transfer framework 459—460 up and down to engage and disengage the transfer segments 455 and the selected set of totalizer wheels 131, as will be explained more fully presently.

The transfer segment 455 for the order shown here (Figs. 2, 30, and 38) has, in a rearward extension thereof, a stud 478, which cooperates with a Y-shaped cam slot 479 in the lower end of a transfer operating arm 480 free on the shaft 457. A link 481 pivotally connects the arm 480 to a crank 482 integral with a tripping disk 483, said disk and said crank being free on the shaft 484 journaled in the totalizer framework 363 (see also Fig. 58). The disk 483 has a shoulder 485, which cooperates with a projecting finger on a transfer trip pawl 486 free on a stud 487 secured in a trip pawl support plate 488 (Fig. 31) for this particular denomination, said plate being supported by the shaft 484 and by the rods 489 and 490 secured in the totalizer framework 363. A torsion spring 491 (Figs. 2 and 30) urges the trip pawl 486 counter-clockwise to normally maintain its finger in engagement with the shoulder 485 and to normally maintain a tripping projection 492 on its upper end in the path of a long tooth 493 on the totalizer wheel 131 for the adjacent lower order to the order with which the transfer segment 455 cooperates.

The transfer segment 455 (Figs. 2, 12, 13, 14, and 30 to 35) has a downward extension carrying a stud 495, which cooperates with inner surfaces on companion scissors arms 496 and 497 free on the rod 456 and yieldingly urged toward each other by a spring 498 tensioned therebetween. Extreme outward extensions of the arms 496 and 497 cooperate with corresponding edges of the bail of a control yoke 499, the arms of which are pivoted on the rod 456.

Angular extensions of the right-hand arm of the yoke 499 (Figs. 12, 13, and 14) carry studs 500 and 501 which cooperate with corresponding projections on a pusher arm 502 free on a stud 503 in a right-hand arm 504 of the transfer restoring mechanism. The arm 504 and a companion left-hand arm 505 are free on the shaft 457 and are connected in fixed relationship to each other at their lower ends by a rod 506 extending therebetween. The arm 502 carries a stud 507 engaged by a slot 508 in a shifting arm 509 free on a stud 510 in the right-hand plate 459 of the transfer framework. The arm 509 has a cam slot 511 engaged by a stud 512 in the left-hand arm of a yoke 513 free on the rod 458. The right-hand arm of the yoke 513 has pivotally connected thereto the rearward end of a link 514, the forward end of which has a slot 515, which engages a stud 516 (Fig. 11) in the downward extension of the arm 392.

The complete train of mechanism for controlling the transfer segments of the No. 3 transaction totalizer is shown best in Fig. 11; however, this mechanism is a substantial duplicate of and functions exactly like the mechanism described above for the No. 1 transaction totalizer.

The left-hand end of the rod 506 (Figs. 55 and 58) engages a corresponding slot 518 in an operating slide 519 shiftably mounted by means of alined slots therein, in cooperation with the engaging shafts 402, 408, and 469 for the Nos. 1, 2 and 3 transaction totalizers, and said slide 519 is held against lateral displacement between collars secured on said shafts. The slide 519 has a notch 420 engaged by the rounded upper end of a lever 521 free on a stationary stud 522. The lever 521 carries rollers 523 and 524, which cooperate, respectively, with the peripheries of companion plate cams 525 and 526 secured to a hub in turn secured on the main cam shaft 71. The lever 521 fits freely between the companion plate cams 525 and 526, and a clearance slot 527 is provided in said lever to clear the hub connecting said cams.

A downward extension 528 of the arm 480 (Figs. 30 to 35 inclusive) cooperates with a release bail of a yoke 529, the right and left arms of which are free on the rod 458. The right and left arms of the loke 529 have upwardly-extending fingers 531, which cooperate with corresponding depending fingers 532 on the right and left restoring arms 504 and 505. A spring 530, tensioned between the finger 531 of the left-hand arm of the yoke 529, urges said yoke clockwise to normally maintain its bail in the path of the downward extensions 528 of the transfer operating arms 480.

At the end of machine operation, the arms 504 and 505 and the rod 506, carried thereby, are in fully moved positions, as shown in Fig. 30. At the beginning of the next operation, the cams 525 and 526 (Fig. 55), operating according to the time given in space 9 of the chart, Fig. 59, shift the slide 519 full distance rearwardly to rock the rod 506 and the arms 504 and 505 from the positions shown in Fig. 30 to fully restored position, as shown in Fig. 31. Full counter-clockwise restoring movement of the rod 506 causes it, in cooperation with the downward extensions 528 of the transfer arms 480, to pick up all such transfer arms which were tipped and operated in the previous operation, as shown in Fig. 35, and restore said tripped arms full distance counter-clockwise to the position shown in Fig. 31, in which position the downward extensions 528 of said arms are moved beyond or to the right of the bail of the yoke 529, which yieldingly engages said rod 506 and is retained thereby in proper relationship to the extensions 528, against the action of the spring 530.

The restoration of the transfer arm 480, for the order being described, from the position shown in Figs. 34 and 35 to the position shown in 31, through the link 481, restores the crank 482 and the connected disk 483 counter-clockwise in unison therewith until the shoulder 485 on said disk by-passes the tooth on the trip pawl 486, whereupon the spring 491 restores said tooth into the path of said shoulder, as shown in Fig. 32, to latch the arm 480 in restored position, in which its extension 528 is a slight distace beyond or to the right of the bail of the yoke 529.

Restoration of the transfer arms 480 causes the slots 479 therein, coacting with the studs 478, to restore the transfer segments 455 from operated position (Fig. 34) to normal position (Fig. 31).

Figure 26:
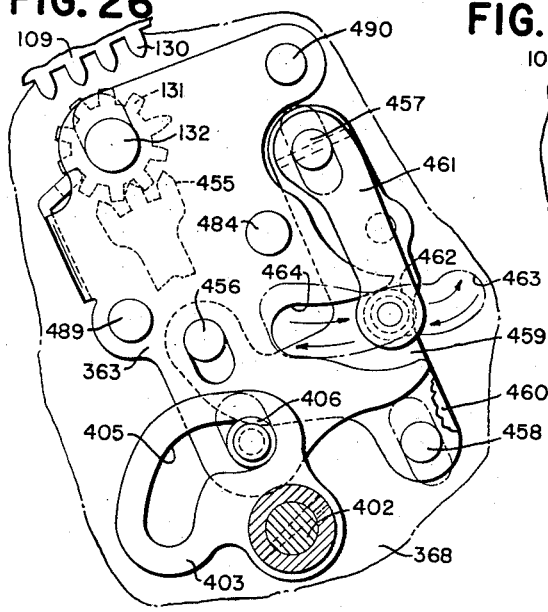
Figure 27:
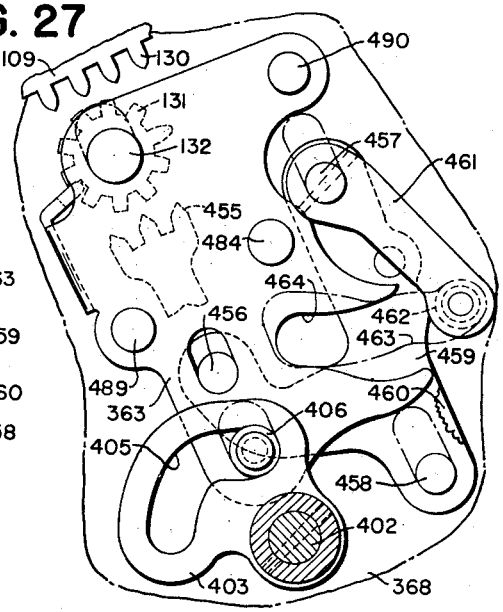

By comparing spaces 5 and 9 of the time chart (Fig. 59), it will be seen that the restoration of the transfer operating arms 480 (Figs. 30 and 31) takes place after the plate 466 (Fig. 16) has completed its initial movement toward the right, to rock the arms 461 from their normal or home position, as shown in Fig. 26, counter-clockwise to the position shown in Fig. 27, thereby causing the rollers 462, in cooperation with the slots 463, to shift the transfer framework downwardly to disengage the teeth of the transfer segments 455 from the corresponding wheels 131 of the No. 1 totalizer, to free said transfer segments for restoring movement.

Figure 28:
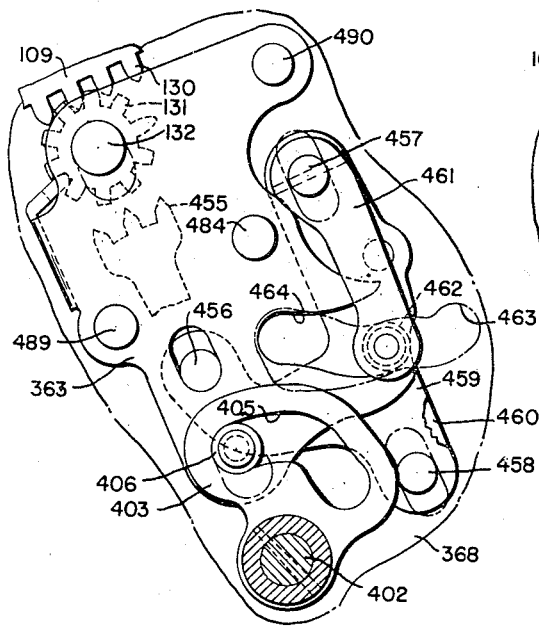

After the transfer segments 455 have been restored in the manner explained above, the arms 461 and the shaft 457 are returned to their central positions, as shown in Fig. 28, and in adding operations this engages the restored transfer segments 455 with the corresponding wheels 131 of the No. 1 totalizer.

After the primary and secondary differential slides 103 and 109 have completed their initial movements (Fig. 2 and space 2, Fig. 59) and have been positioned in accordance with the values of the depressed amount keys 73, the add-engaging mechanism shown in Fig. 18 and described earlier herein functions according to the time given in space 3, Fig. 59, to shift the No. 1 totalizer framework 363 upwardly, as shown in Fig. 28, to engage the selected set of wheels 131 with the teeth 130 on the secondary differential slides 109. In this engaging movement, the framework 363 moves upwardly, while the transfer framework, comprising the plates 459 and 460, remains stationary to disengage said selected set of wheels from the transfer segments 455.

While the totalizer framework 363 (Figs. 26 and 28) is moving upwardly to engage the selected set of totalizer wheels with the secondary differential slides, a totalizer aliner mechanism, to be described presently, remains in engagement with the totalizer wheels until they are engaged with the secondary differential slides to insure that said wheels remain in proper positions. The aliner mechanism for the totalizer wheels is disengaged from the teeth therein prior to actuating forward movement of the secondary differential slides 109 (Fig. 2). In adding operations, return forward movement of the secondary differential slides 109 rotates the selected set of totalizer wheels 131 counter-clockwise or in an additive direction to add therein the value of the depressed amount keys 73.

If, during actuating movement, the adjacent lower order wheel 131 passes through zero, the long tooth 493 thereon (Figs. 30 and 33), in cooperation with the tripping tooth 492 of the tripping pawl 486, rocks said pawl clockwise against the action of the spring 491 to disengage the tooth thereon from the shoulder 485 on the disk 483 for the adjacent higher order. This releases the disk 483 and the corresponding transfer operating arm 480 to the action of a spring 533, tensioned between the rod 506 and a stud 534 in said arm 480, whereupon the spring 533 rocks the arm 480 a slight distance clockwise until its downward extension 528 contacts the inner edge of the bail 529, as shown in Fig. 33.

Figure 29:
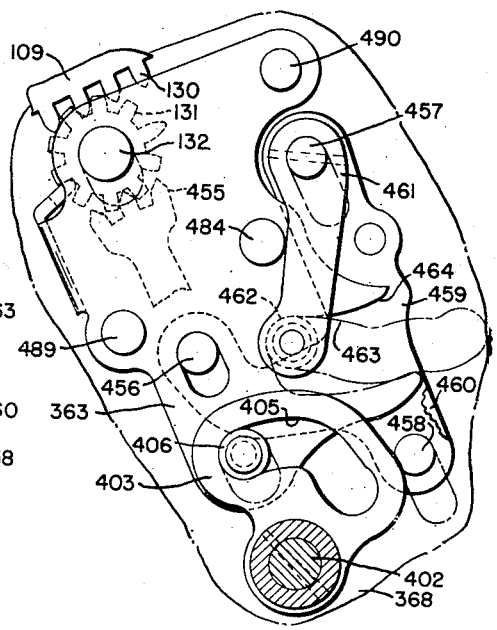

After the selected set of totalizer wheels has been actuated in adding operations, as explained above, the cams 475 and 476 and the plate 466 (Fig. 16), operating according to the time given in space 5 of the chart, Fig. 59, move the arms 461 and the shaft 457 forwardly or clockwise from the position shown in Fig. 28 to the position shown in Fig. 29. This movement of the arms 461, it will be seen, occurs at approximately 305 to 328 degrees of machine operation. Extreme clockwise movement of the arms 461 causes the rollers 462 carried thereby, in cooperation with the cam slots 464 in the totalizer framework 363, which is now in its upward or engaged position, as shown here, to shift the transfer framework 459 upwardly to engage the segments 455 with the corresponding wheels 131 of the selected totalizer. Immediately after the transfer segment has been engaged with the corresponding totalizer wheel, the cams 431 and 432 (Fig. 18), operating according to the time given in space 3 (Fig. 59), shift the totalizer framework 363 downwardly and, through the top portions of the slots 464, in cooperation with the rollers 462, also shift the transfer mechanism framework 459 downwardly in unison therewith to disengage the selected set of totalizer wheels from the secondary differential slides 109, as shown in Fig. 26.

Simultaneously with disengaging movement of the totalizer framework 363, the arms 461 and the shaft 457 are returned counter-clockwise from the position shown in Fig. 29 to the position shown in Fig. 26, the rollers 462 being guided in this case by the concentric portions of the slots 463 and 464, and consequently the transfer framework 459 and the totalizer framework 363 remain in the same relative positions to retain the transfer segments 455 in engagement with the corresponding wheels 131.

Return clockwise movement of the transfer restoring mechanism, including the arms 504 and 505 and the rod 506 (Figs. 33 and 34), increases the tension of the spring 533 to insure that the transfer arm 480 will function energetically at the proper time. When the arms 504 and 505 near the end of their return clockwise movement, the depending fingers 532 thereon engages the upwardly extending fingers 531 on the opposite arms of the yoke 529 and rock said yoke counter-clockwise a slight distance, against the action of the spring 530, from the position shown in Fig. 33 to the position shown in Fig. 34, to move the bail of said yoke 529 out of the path of the extension 528 on the arm 480. This immediately releases the transfer operating arm 480 to the action of the tensioned spring 533, which rocks said arm clockwise from the position shown in Fig. 33 to the position shown in Fig. 34, which latter position is determined by the extension 528 thereof contacting the rod 506.

Positioning of the engaging shaft 391 and the arm 392 for the No. 1 totalizer (Fig. 11) in adding position causes the stud 516 in said arm, in cooperation with the slot 515 in the link 514, to position the yoke 513 in its clockwise position, as shown in Fig. 12. This positioning of the yoke 513 causes the stud 512 in its left arm, in cooperation with the cam slot 511 in the arm 509, to rock said arm to its counter-clockwise position, as shown here. Counter-clockwise positioning of the arm 509, through the slot 508 in cooperation with the stud 507, positions the arm 502 (Figs. 12 and 13) in its counter-clockwise position, as shown here, in which position its downward extension is in the path of the stud 501 in the yoke 499. With the arm 502 thus positioned in relation to the stud 501, return clockwise movement of the arm 504 causes the arm 502, in cooperation with the stud 501, to rock the yoke 499 also clockwise. Clockwise movement of the yoke 499 (Figs. 13 and 30) carries the scissors arm 496 in unison therewith to tension the spring 498 between said arm and its companion arm 497 to yieldingly urge said arm 497, and through the stud 495, the transfer segment 455 in a clockwise or additive direction. This clockwise urging of the transfer segment 455 causes the stud 478 in its rearward extension to move into the downward branch of the Y-shaped slot 479 in the arm 480 during clockwise transfer operating movement of said arm, as shown in Fig. 34 and as explained above. The moving of the stud 478 into the downward branch of the slot 479 causes said slot to impart further clockwise movement to the transfer segment 455, whereupon said segment turns the selected totalizer wheel engaged therewith the equivalent of one tooth space in a counter-clockwise or additive direction to transfer a tens digit from the adjacent lower order thereto.

The transfer mechanism remains in the position shown in Fig. 34 at the end of machine operation, and at the beginning of the succeeding operation the restoring mechanism, including the arms 504 and 505 and the rod 506 (Fig. 31), receives its restoring or counter-clockwise movement to restore all previously tripped and operated transfer arms 480 and transfer pawls 486 to untripped positions, as shown here.

In subtract operations, positioning of the shaft 391 (Fig. 11) and the arm 392, under influence of the Subtract key 76, as explained earlier herein, to their extreme clockwise positions causes the stud 516 in said arm, in cooperation with the slot 515, to shift the link 514 forwardly to rock the yoke 513 (Figs. 12 and 14) counter-clockwise a slight distance. Counter-clockwise movement of the yoke 513 causes the stud 512, in cooperation with the slot 511, to rock the arm 509 upwardly or clockwise from the position shown in Fig. 12 to the position shown in dot-and-dash lines in Fig. 14. This clockwise movement of the arm 509, through the slot 508 and the stud 507, rocks the selecting arm 502 clockwise in unison therewith from the position shown in Figs. 12 and 13 to the position shown in Fig. 14, in which the upward extension of said arm is in the path of the stud 500 in the yoke 499.

With the arm 502 thus positioned, return clockwise movement of the arms 504 and 505 and the rod 506 causes said arm 502, in cooperation with the stud 500, to rock the yoke 499 counter-clockwise from the position shown in Fig. 13 to the position shown in Fig. 14. This counter-clockwise movement of the yoke 499 carries the scissors arm 497 counter-clockwise in unison therewith to withdraw it from the stud 495 and to tension the spring 498 to urge the companion scissors arm 496 also counter-clockwise. The arm 496, through the stud 495 (Figs. 14 and 35), urges the transfer segment 455 counter-clockwise to cause the stud 478 in the rearward extension of said segment to be directed into the upward branch of the Y-shaped slot 479 upon clockwise actuating movement of the arm 480. This causes the arm 480 to impart additional counter-clockwise movement to the transfer segment 455 (Fig. 35), causing said segment to rotate the selected totalizer wheel 131 of the corresponding order the equivalent of one tooth space in a clockwise or subtractive direction to borrow "1" from said order when the adjacent lower order wheel passes through zero while traveling in a subtractive direction.

The transfer mechanism remains in the position shown in Fig. 35 at the end of machine operation, and, at the beginning of the immediately succeeding operation, counterclockwise restoring movement of the rod 506 restores all operated arms 480, as shown in Fig. 31, and said arms 480 in turn restore the corresponding tripped transfer pawls 486 to untripped position, as shown here and in the manner explained previously.

*Aliner for totalizer wheels*

The No. 1 transaction totalizer, which is being described herein as representative of all three of the transaction totalizers, has an aliner 536 (Figs. 2 and 30 to 36 inclusive), which operates in conjunction with the transfer segments 455 to maintain the selected set of totalizer wheels 131 in alinement at the times when said wheels are not in engagement with said transfer segments or the secondary slides 109.

The aliner 536 has right and left arms 537 and 538 rotatably supported by the shaft 484, which, it will be recalled, is journalled in the framework 363 (Fig. 26) for the No. 1 transaction totalizer. A downward extension of the right arm 537 of the aliner 536 (Figs. 2 and 36) carries a stud 539, which engages a slot in the upper end of a lever 540, the lower end of which lever is pivotally connected at 541 to a pitman 542 shiftably mounted by means of a slot therein which snugly engages the shaft 402 for the No. 1 transaction totalizer. The pitman 542 carries rollers 543 and 544, which cooperate with the periphery of a plate cam 545 secured on the shaft 402. The lever 540 (Fig. 36) is pivoted near its center on a stud 546 secured in a bar 547 mounted for linear shifting movement between two rollers carried by a bracket 548 secured to the machine base and between two rollers carried by a bracket 549 secured to the machine back plate. The bar 547 carries a stud 550 engaged by a slot in an upward extension of a Y-shaped lever 551 pivotally supported on a stationary stud 552. The lever 551 carries rollers 553 and 554, which cooperate, respectively, with the peripheries of companion plate cams 555 and 556 secured on the main cam shaft 71.

The cams 555 and 556 (Fig. 36) make one clockwise revolution each machine operation and at the very beginning of machine operation rock the lever 551 clockwise to shift the bar 547 to engage the aliner 536 with the teeth of the No. 1 totalizer wheels 131. At approximately 310 to 325 degrees of machine operation, the cams 555 and 556 return the bar 547 forwardly to disengage the aliner 536 from the wheels 131. The cam 545, which operates according to the movement imparted to the engaging shaft 402 in different types of operations, works in conjunction with the cams 555 and 556 to further control the engaging and disengaging movements of the aliner 536.

In adding operations, the combined movements of the cams 555, 556, and 545 cause the aliner 536 to operate according to the timing given in space 4 of the chart (Fig. 59). At the beginning of adding operations, the cams 555 and 556 shift the bar 547 rearwardly to rock the lever 540 clockwise, said lever in turn rocking the aliner 536 counterclockwise to engage said liner with the wheels 131 of the No. 1 totalizer. Clockwise engaging movement of the shaft 402, according to the time given in space 3, Fig. 59, causes the cam 545 to shift the pitman 542 rearwardly to rock the lever 540 counter-clockwise. In this case, the stud 546 acts as a pivot for said lever. Counter-clockwise movement of the lever 540, through the slot in its upper end, in cooperation with the stud 539, rocks the aliner 536 clockwise out of engagement with the teeth of the wheels 131 of the No. 1 totalizer, after said wheels have been engaged with the secondary differential slides 109 (Fig. 2) and prior to return movement of said slides, which, it will be recalled by referring to space 2, Fig. 59, is the movement which actuates the selected set of totalizer wheels in adding operations. The slot in the upper end of the lever 540 permits the stud 539 to ride up and down therein as the totalizer framework 303 moves upwardly and downwardly to engage and disengage the totalizer wheels and the secondary slides.

After the amount differential slides have completed their forward return movements, the cam 545 functions during return movement, to again engage the aliner 536 with the totalizer wheels 131; however, the cams 555 and 556, operating in conjunction with said cam 545, counteract this action, as these latter cams operate at this time to disengage said aliner 536 from said wheels, and the net result is that the aliner 536 remains disengaged, as shown in space 4, Fig. 59. By referring to space 5, Fig. 59, it will be recalled that in adding operations the transfer segment 455 (Figs. 26 to 29 inclusive and Fig. 34) moves upwardly into engagement with the corresponding totalizer wheel prior to disengagement of said totalizer wheel and consequently retains said wheel in alinement even though at this time (in adding operations) the aliner 536 is disengaged therefrom.

The relative movements of the segment 455 and the aliner 536 are shown progressively in adding operations from Figs. 30 to 34 inclusive.

The timing of the movement of the aliner 536 (Fig. 36) into and out of engagement with the No. 1 totalizer wheels 131 in subtracting and resetting operations under influence of the combined action of the cams 545, 555, and 556 is given in space 7, Fig. 59. By comparing spaces 6, 7, and 8 (Fig. 59), it will be seen that, at the beginning of machine operation, before the transfer segments 455 are disengaged from the corresponding wheels 131, the aliner 536 is moved into engagement with said wheels and remains in engagement therewith until immediately after said wheels are engaged with the corresponding secondary differential slides 109, according to the timing in space 6. After the selected set of totalizer wheels has been actuated by initial movement of the differential slides, in the manner explained earlier herein, and just prior to the time that said totalizer wheels are disengaged from said secondary slides, the aliner 536 is again engaged with said totalizer wheels to insure that they remain in set positions while being disengaged from the secondary slides and again engaged with the corresponding transfer segments 455. Near the end of machine operation, the aliner 536 is again disengaged from the totalizer wheels and remains thus disengaged at the end of machine operation.

By comparing spaces 4, 7, and 9, Fig. 59, it will be noted that the aliner 536 is disengaged from the No. 1 totalizer wheels 131 prior to transferring movement of the segments 455, which occurs at approximately 350 degrees of machine operation.

The movement of the transfer segments 455 (Figs. 26 and 29) and their supporting framework in subtracting and resetting operations is given in space 8 of the time chart (Fig. 59), from which it will be seen that initial counter-clockwise movement of the arms 461 causes the rollers 462, in cooperation with the slot 463, to disengage the segments 455 from the corresponding wheels 131 prior to and during the restoration of the tripped and operated segments 455 to initial position, which restoration occurs according to the time given in space 9, Fig. 59. After the tripped transfer segments have been restored, the second movement of the arms 461 from their counter-clockwise position to their central position, as shown in Figs. 26 and 28, causes the rollers 462, in cooperation with the slot 463, to return the segments 455 into engagement with the corresponding wheels 131 prior to upward movement of the totalizer framework to engage said wheels with the secondary differential slides 109. While the arms 461 remain in the position shown in Fig. 28, engaging movement is imparted to the totalizer framework 363, and in this case the enlarged portions of the slots 464 in the side members of said framework permit it to move independently of the transfer segments 455, which therefore remain stationary while the corresponding totalizer wheels are disengaged therefrom.

In subtracting and resetting operations, the totalizer framework 363 is shifted downwardly to disengage the selected totalizer wheels from the secondary differential slides before the final clockwise movement is imparted to the arms 461 and the rollers 462, thus leaving the totalizer framework and the arms 461 in the same relative positions, as shown in Fig. 26. This positions the concentric portions of the slots 464 in the side members of the totalizer framework 363 opposite the rollers 462; consequently the third movement of said arms 461 clockwise to the position shown in Fig. 29 and the return of said arms from this position to central or normal position impart no up-and-down movement to the transfer segments 455 and their framework, comprising the plates 459 and 460, the shaft 457, and the rods 456 and 458 (Figs. 26 to 29 inclusive).

Reading and resetting operations

The timing of the engaging and disengaging movement of the No. 1 transaction totalizer and the mechanisms operating in conjunction therewith is the same in resetting operations as it is in subtracting operations. However, inasmuch as the single set of transfer trip pawls, provided for the present machine, function in both adding and subtracting operations for the transferring of tens digits, it was impossible to use said trip pawls as zero stops in reading and resetting operations, as is the usual practice. Instead, it was necessary to provide a zero stop bar which coacts with the long teeth of the selected set of totalizer wheels to stop said wheels at zero for the purpose of transmitting the amounts thereon to the recording mechanism and, if desired, to other totalizers.

In reading and resetting operations, the secondary differential slides 109 are positioned under influence of the selected set of totalizer wheels to the true value standing on said wheels, and said secondary slides in turn position their corresponding primary slides 103 to the complement of the value standing on said totalizer wheels. This is the reverse of the functioning of the differential mechanisms in adding and subtracting operations, in which the primary members are first set to the complement under influence of the depressed amount keys and in turn position the secondary slides to the true value of the amount set up on the keyboard. Inasmuch as in reading and resetting operations it is necessary to position the secondary differential slides first, it is essential to eliminate all unnecessary load on said secondary slides so that their positioning movements will be unhindered, and this is accomplished by restoring the amount differential segments 165 (Figs. 2 and 7) in a direction opposite to that in which said segments are restored in adding and subtracting operations, as will be explained in detail later.

Depression of one of the selecting keys 77 for the No. 1 transaction totalizer (Fig. 10) through the No. 1 transaction differential mechanism, causes the corresponding set of totalizer wheels on the No. 1 totalizer line to be alined with the secondary differential slides 109 in resetting operations, the same as in adding and subtracting operations. Likewise, depression of one of the selecting keys 77 shifts the detent 283 rearwardly, which movement, through the link 289, rocks the non-add pawl 290 counter-clockwise out of the path of the bent-over ear 293 on the control arm 294, the same as in adding and subtracting operations.

Depression of the Reset key 75 for the No. 1 transaction totalizer (Figs. 10, 11, and 15) causes the pin 278 therein, in cooperation with the slot 297, which, it will be recalled, is exactly the same as the subtract slot 298, to shift the plate 299 forwardly the same extent as in subtract operations, against the action of the spring 302 to rock the control pawl 301 counter-clockwise to move the subtract and reset step 442 thereon opposite the ear 293 of the arm 294. Depression of the Reset key 75 (Figs. 10, 11, and 22) causes the pin 278 therein, in cooperation with a finger 558 of a lever 559 pivotally supported by the shaft 291, to rock said lever counter-clockwise against the action of a spring 560. Counter-clockwise movement of the lever 559 causes a slot in a downward extension thereof, in cooperation with a stud 561 in the rearward end of a link 562, to rock said link downwardly or clockwise. The forward end of the link 562 is pivoted to a crank 563, secured on a shaft 564, journaled in the transaction framework. Clockwise movement of the link 562 (Figs. 11 and 22) moves a shoulder 565 on its rearward end into the path of a stud 566 carried by the arm 304.

It will be recalled that the arm 304 and the shaft 141 are rocked first clockwise and then back to normal position by the cams 312 and 313 (Fig. 16) according to the time given in space 18 of the time chart, Fig. 60, and consequently in resetting operations this movement of the arm 304 first shifts the link 562 rearwardly to rock the crank 563 and the shaft 564 (Figs. 10 and 11) first clockwise and then back to normal position, also according to the time given in space 18, Fig. 60. Initial clockwise movement of the shaft 564 (Fig. 16) causes a finger 567 secured thereon, in cooperation with a stud 568 in a pitman 569, to shift said pitman rearwardly. The pitman 569 has, in its forward end, a slot 570, which slidably engages the shaft 564, while the rearward end of said pitman is pivoted to a crank 571 secured on the shaft 153. Consequently initial rearward movement of said pitman 569 rocks the crank 571, the shaft 153, and the cam 152 clockwise. Clockwise movement of the cam 152 (Figs. 2 and 16) rocks the arms 149 and the rod 146 counter-clockwise, causing said arms to shift the lever 239 (Fig. 16) forwardly, to disengage the teeth 238 therein from the segment 237 and to simultaneously engage teeth 572, formed on a segment secured to said lever 239, with corresponding teeth in a segment 573 secured to the shaft 136.

During machine operations the cams 247 and 248 (Fig. 17) rock the lever 244 first counter-clockwise and then back to normal position to shift the pitman 241 downwardly to cause said pitman to rock the lever 239 downwardly or counter-clockwise to rotate the shaft 166 clockwise, which is just the reverse of the movement of said shaft in adding and subtracting operations. Clockwise movement of the shaft 166 (Figs. 2 and 7) and the crank 233, secured thereon, causes the stud 234, in cooperation with the surface 235, to rotate the segment 165 and the corresponding sector 170, which is connected thereto by the pawl 168, clockwise from zero position or from any intermediate position in which said segment and sector were left in the preceding operation, to their ninth position. Clockwise movement of the segment 165 (Figs. 4, 5, and 7) rotates the gear 161 counter-clockwise to move the lugs 160 and 162, secured thereto, from the positions shown in spaces A, B, and C (Fig. 4) to the positions shown in spaces A, B, and C (Fig. 6), so that the lug 162 will not interfere with the lug 163 during positioning of the corresponding secondary differential slide 109, as will be explained more fully presently.

Secured on the shaft 564 (Figs. 11 and 16) is a crank 574 having pivotally connected thereto the upper end of a stop bar shifting plate 575 with a slot 576 in its lower end which freely engages the shaft 484 for the purpose of shiftably supporting said plate 575. An upper camming portion of the slot 576 (Fig. 11) cooperates with a stud 577 in the upper end of a crank 578 secured on the shaft 484, which shaft, it will be recalled by referring to Figs. 26 and 30, is supported in the shiftable totalizer framework 363. Also secured on the shaft 484 are the yoked arms of a stop bar 579, said bar arranged to cooperate with the long teeth 493 on the No. 1 totalizer wheels 131.

In adding and subtracting operations, when the plate 575 is in normal position, as shown in Figs. 11 and 16, the stud 577 rides up and down in a straight portion of the slot 576, during engaging and disengaging movement of the framework 363, without imparting any rocking movement to the crank 578, the shaft 484, and the stop bar 579. However, clockwise movement of the shaft 564 in resetting operations, as explained before, through the crank 574, shifts the plate 575 downwardly to shift the upward camming portion of the slot 576 nearer the stud 577, so that, upon upward engaging movement of the totalizer framework 363, said stud 577, in cooperation with said camming portion of the slot 576, will rock the crank 578, the shaft 484, and the stop bar 579 outwardly or counter-clockwise to move said bar into the path of the long teeth 493 of the selected set of totalizer wheels 131.

Initial clockwise movement of the arm 304 (Figs. 10, 11, and 15) carries the arm 294 counter-clockwise in unison therewith through the medium of the spring 383, until the ear 293 of said arm contacts the reset step 442 on the pawl 301 to position said arm and, in turn, the companion arm 388 in reset position, which, it will be recalled, is exactly the same as subtract position. Positioning of the arm 388 in reset position, through the link 389, rocks the crank 390, the shaft 391, and the arm 392 clockwise in proportion to the movement of said arm 388 to cause said arm 392 (Fig. 10) to shift the plate 394 downwardly to engage the roller 399 in the link 400 with the notch 443 in the reset and subtract engaging plate 444.

Initial movement of the cams 451 and 452 (Fig. 10) shifts the plate 444 rearwardly according to the time given in space 6 (Fig. 59), which movement, through the link 400 and the crank 401, rocks the No. 1 engaging shaft 402 clockwise, causing the slot 405 (Figs. 2 and 58) in the cams 403 and 404 to shift the totalizer framework 363 upwardly to engage the selected set of totalizer wheels 131 with the teeth 130 in the secondary differential slides 109 prior to their initial rearward movement. Inasmuch as all restraint has been removed from the secondary slides 109, the mechanism of the denomination shown in Figs. 2 and 3 and explained earlier herein causes the secondary slide 109 to shift rearwardly while the corresponding primary slide 103 remains stationary in its normal or home position. Initial rearward movement of the secondary slide 109 reversely rotates the corresponding totalizer wheel 131 (Figs. 2 and 11) until the long tooth thereon contacts the stop bar 579 to locate said wheel in zero position and to in turn position the secondary slide 109 in accordance with the time value of the amount standing on said totalizer wheel. The long tooth contacting the stop bar terminates further rearward movement of the secondary slide 109, whereupon the corresponding primary slide 103 starts its initial positioning rearward movement and is positioned to the complementary value of the amount standing on the selected totalizer wheel and in complementary relationship to the secondary slide 109.

Counter-clockwise movement of the arms 149 and the rod 146 (Figs. 2, 19, and 23) rocks the pawl 145 out of cooperative relationship with the retaining notches 148 in the primary slide 103 and simultaneously rocks a similar pawl 581, free on the rod 146, into cooperative relationship with a series of retaining notches 582 in the upper edge of the corresponding secondary slide 109. The pawl 581 (Figs. 2, 19, and 21) has a cam slot 583 engaged by a stud 584 in a forward extension of an arm 585 free on the shaft 141. An upward extension of the arm 585 carries a stud 586, which cooperates with a cam rail 587 secured to the primary slide 103. The spring 142, which is tensioned between the companion arms 140 and 585, urges the arm 585 counter-clockwise to normally retain a bent-over retaining ear 588 on the pawl 581 out of engagement with the alining notches 582 and, in reading and resetting operations, to normally maintain the stud 586 in the path of the cam rail 587.

In reading and resetting operations, initial movement of the primary slide 103 away from home position causes a camming edge formed on the rail 587, in cooperation with the stud 586, to rock the arm 585 clockwise against the action of the spring 142. Clockwise movement of the arm 585 causes the stud 584, in cooperation with the slot 583, to rock the pawl 581 clockwise to engage the ear 588 with the notch 582 in the secondary slide 109, as shown in Fig. 21, corresponding to the position of said slide, to retain said slide in the position in which it was set by the corresponding totalizer wheel being read or reset while the corresponding type wheels and, if desired, the corresponding indicators are being positioned under influence of the primary slide 103, as will now be explained.

As previously explained, in reading and resetting operations the conditions are reversed which prevail in adding and subtracting operations, and, instead of the secondary differential slide 109 driving the printing and indicating mechanism, the primary differential slide 103 and the lug 159 on the gear 155 (Figs. 2, 6, and 7), in cooperation with the corresponding lug 160 carried by the gear 161, drive the segment 165 and the corresponding sector 170 from ninth position a distance equal to the complement of the amount on the selected totalizer wheel. This rotates the segment 165 and the sector 170 from ninth position in a reverse or complementary direction to position said segment and said sector and the corresponding type wheels 177 and indicator tablets 202 and 203 (Figs. 2 and 7) to the true value of the amount taken from the selected totalizer wheel, which is the result desired. After the type wheels 177 (Fig. 2) have been positioned as explained above, the impression hammer 179 makes its impression stroke to record the value of the amount taken from the totalizer wheel 131 on the record material 181. Prior to forward return movement of the differential slides 103 and 109, the cams 451 and 452 function according to the time given in space 6, Fig. 59, to shift the totalizer framework 363 downwardly to disengage the selected set of totalizers from the secondary differential slides 109, so that said wheels will remain in a zeroized condition.

After the totalizer framework has been moved downwardly to disengage the selected set of totalizer wheels 131 from the secondary slides 109 in reset operations, the primary slide 103 is first restored forwardly to normal position, according to the time given in space 2, Fig. 59, and, when said primary slide reaches home position, the camming surface on the rail 587 (Figs. 19 and 21) is withdrawn from the stud 586 to permit the spring 142 to restore the arm 585 counter-clockwise to disengage the ear 588 of the pawl 581 from the corresponding notch 582 in the secondary slide 109, after which said secondary slide 109 is restored forwardly to home or normal position. The restoration of the primary and secondary differential slides 103 and 109 (Fig. 2) to home or normal positions in resetting operations does not interfere with the positioning of the corresponding segment 165 and sector 170 (Fig. 7), which, together with their corresponding type wheels and indicators, remain in set positions at the end of resetting operations.

Spaces A to F inclusive of Fig. 6 illustrate in diagrammatic form the systematic and progressive movements of the differential parts and their relationship to each other during the various stages of resetting and/or reading operations.

Space A of Fig. 6 shows the differential segment 165 and the corresponding gear 161 and lugs 160 and 162 being restored in a reverse direction to ninth position. Space B (Fig. 6) shows the segment 165 and the corresponding gear 161 in restored position, and it will be noted that, during the restoring movement of said parts, the primary and secondary differential slides 103 and 109 remain stationary in home or normal position. Space C (Fig. 6) shows the secondary differential slide 109 and its corresponding gear 157 and lug 163 being positioned under influence of the selected totalizer wheel 131. It will be noted that in this case the reverse restoration of the segment 165 and the lugs 160 and 162 insures unrestrained positioning movement of the secondary slide 109 and connected parts. Space D (Fig. 6) shows the primary differential slide 103 and its corresponding gear 155 and lug 159 being positioned under influence of the secondary slide 109, and, during such positioning, through the lugs 159 and 160, the gear 161 and the segment 165 are carried in unison therewith to position said segment, the corresponding sector 170 (Fig. 2), and the corresponding type wheels and indicators to the value standing on the selected totalizer wheel 131.

By referring to space C, Fig. 6, it will be seen that in this particular case the selected totalizer wheel had seven stored therein. Consequently the secondary differential slide 109 and the corresponding gear 157 and lug 163 moved seven steps under influence of said totalizer wheel to seventh position, as shown here. Inasmuch as the primary slide 103 moves in complementary relationship to the secondary slide 109, said primary slide 103 and its corresponding gear 158 and lug 159 move two steps in this instance, as shown in space D, Fig. 6, and, in so moving, carry the gear 161, the segment 165 (Fig. 7), the sector 170, and the corresopnding type wheels and indicators in unison therewith from ninth position to seventh position, which is the true value of the amount on said selected totalizer wheel.

Spaces E and F (Fig. 6) show, respectively, the primary slide 103 and the secondary slide 109 being restored forwardly to normal position, and it will be noted that in this case, as usual, the lugs 160 and 162, the gear 161, the segment 165, the sector 170 (Fig. 2), and the corresponding type wheels and indicators remain in set position at the end of machine operation.

As explained before, Fig. 6 applies to both resetting and reading operations. In resetting operations, the corresponding selected wheel 131 of the No. 1 transaction totalizer is disengaged from the second differential slide 109 prior to its forward return movement, and consequently said wheel remains in a zeroized condition. In reading operations, the selected wheel remains in engagement with the slide 109 during its forward return movement, as shown in space F, Fig. 6, and consequently said wheel is restored to its original position.

*Reading operations*

In reading operations, as in other types of operations, the selecting keys 77 (Figs. 1 and 10) are used to select the desired set of totalizer wheels on the No. 1 totalizer line for engagement with the secondary differential slides 109. In reading operations, the selecting keys 77 are used in conjunction with the Read key 74 (Figs. 10 and 11), which causes the selected set of totalizer wheels to be engaged with and disengaged from the secondary slides 109 in reading time to print and indicate the amount standing on said selected set of totalizer wheels.

Depression of the Read key 74 (Figs. 10, 11, and 15) causes the pin 277 therein, in cooperation with the cam slot 296 in the plate 299, to shift said plate forwardly against the action of the spring 302, to position said plate in accordance with said Read key 74. Positioning of the plate 299 rocks the pawl 301 counterclockwise sufficiently to move the read step 590 thereon opposite the ear 293 of the arm 294. Likewise, depression of the Read key 74 causes the pin 277, in cooperation with the finger 558 (Figs. 10, 11, and 22) to rock the lever 559 counter-clockwise or downwardly to move the shoulder 565 on the link 562 into the path of the stud 566 in the arm 304.

Movement of the shaft 141 (Fig. 11) and the arm 304, according to the time given in space 18, Fig. 60, through the spring 383, causes the ear 293 to yieldingly contact the read step 590 to position the arm 294 and, subsequently, the companion arm 388 in read position. Positioning of the arm 388, through the link 389, the crank 390, the shaft 391, and the arm 392, shifts the plate 394 (Fig. 10) downwardly to engage the roller 399 in the link 400 with an operating notch formed by a surface 591 (Fig. 37) and the end of a finger 592 of an engaging plate 593 shiftably mounted by means of parallel slots therein in cooperation with the studs 396, 445, and 446. It will be noted that the engaging plate 593 has proper clearances for the roller 399 in all its positions except reading position.

The read engaging plate 593 (Fig. 37) has, in its lower edge, a notch 594 engaged by a roller 595 mounted on an upward extension of a cam lever 596 pivoted on the stud 428. The lever 596 carries rollers 597 and 598, which cooperate, respectively, with the peripheries of companion plate cams 599 and 600 connected in fixed relationship to each other by a hub which is secured to the main cam shaft 71. The lever 596 is interposed between the cams 599 and 600 and is provided with a clearance slot 601 for clearing the hub connecting said cams. Operation of the cams 599 and 600 during machine operation shifts the engaging plate 593 first rearwardly and then back to normal position.

In reading operations, shifting movement of the plate 593, through the roller 399, the link 400, the crank 401, the shaft 402, and the cams 403 and 404 (Figs. 2, 26, 30, 37, and 58), shifts the No. 1 totalizer framework 363 up and down according to the time given in space 10 (Fig. 59) to engage the selected set of totalizer wheels with and disengage said wheels from the secondary differential slides 109 in reading time. By comparing spaces 6 and 10, Fig. 59, it will be noted that in reading operations the selected set of totalizer wheels remain in engagement with the secondary differential slides 109 during their forward return movements, as shown in space F, Fig. 6, and are returned from zeroized position to their original positions by the forward movement of said differential slides 109. In all other respects, a reading operation is exactly like a resetting operation, as fully explained earlier herein.

Initial clockwise movement of the arm 304 in reading operations (Figs. 11 and 22) through the stud 566, in cooperation with the shoulder 565, shifts the link 562 rearwardly, which movement, through the crank 563, the shaft 564, and the crank 574, shifts the plate 575 downwardly exactly the same as explained in connection with resetting operations to cause the zero stop bar 579 to function in reading operations exactly the same as it does in resetting operations.

Counter-clockwise return movement of the arm 304, near the end of reading operations, shifts the plate 299 (Figs. 11 and 15) forwardly to release the depressed Read key to restore the pawl 301 to adding position, and to restore the arm 294 to normal position, as shown in Fig. 11 and as explained previously. The arm 388 and connected mechanism remain in set positions at the end of reading operations, the same as in other operations, and are moved directly from their old positions to their new positions in the next operation.

In reading operations, the amount differential mechanisms function exactly the same as illustrated in Fig. 6 and as explained in connection with resetting operations, to position the corresponding printing wheels and the corresponding indicators to the values standing on the selected set of totalizer wheels.

In reading operations, the combined movement of the cams 555 and 556 (Fig. 36) and the read engaging cams 599 and 600 (Fig. 37) causes the aliner 536 to be engaged with and disengaged from the selected set of totalizer wheels 131 on the No. 1 totalizer line, according to the time given in space 11 of the time chart, Fig. 59.

The retaining pawls 581 (Figs. 2, 19, and 21) function exactly the same in reading operations as in resetting operations to retain the secondary slides 109 in set position while the primary slides 103 and the other parts controlled thereby are being positioned.

In reading operations, as in resetting operations, the mechanism shown in Figs. 7 and 16 restores the segments 165 and the corresponding sectors 170 in a reverse direction to which they are restored in adding and subtracting operations, so that these members and their corresponding type wheels and indicators may be positioned under influence of the primary differential slide 103 in exactly the same manner as described for resetting operations.

Auxiliary or balance totalizer

In addition to the three lines of interspersed transaction totalizers explained in the preceding pages, the present machine is provided with an auxiliary or balance totalizer, sometimes referred to as a crossfooter, which is actuated by the primary differential slides 103 (Fig. 2) of the amount differential mechanism. Inasmuch as the primary slides are always positioned to the complement of the amount set up on the amount keys 73 and in turn position the corresponding secondary differential slides 109 to the true value of the amount set up on said amount keys for the proper positioning of the corresponding printing wheels and indicators, it was necessary to arrange the auxiliary totalizer for the accumulation of complementary values.

Each denominational order of the auxiliary totalizer comprises a plus gear wheel and a minus gear wheel, which are actuated by an auxiliary rack shiftably mounted upon the corresponding primary differential slides 103. The minus gear wheel of each denominational order has fixed thereto a gear connected by a small intermediate pinion to a corresponding gear, which is in turn fixed to a corresponding indicator wheel. The indicator wheel has, integral therewith, another gear which meshes directly with the teeth of the corresponding plus wheel.

It is therefore obvious that the plus and minus wheels of each denominational order are geared together for reverse movement; that is, when a plus wheel of one order is engaged with the corresponding actuator, as in adding operations, the minus wheel of the same order is rotated in a reverse direction, and when the minus wheel is engaged with the corresponding actuator, as in subtract operations, the corresponding plus wheel is driven in a reverse or subtractive direction.

The indicator wheel of each denominational order has thereon two sets of numerals; namely, a plus set corresponding to the plus wheel of the same order, and a minus set of numerals corresponding to the minus wheel of the same order. In adding operations, the plus wheels are engaged with the auxiliary actuator racks and are driven thereby in an additive direction to the complement of the true amount. However, as the corresponding plus wheels are reversely geared to the minus wheels, said minus wheels are positioned to the true amount, and, as a result, the negative numerals on the corresponding indicator wheels indicate the true amount.

The numerals on the indicator wheels are visible through corresponding openings in the upper portion of the machine cabinet, and said indicator wheels are provided with a shutter mechanism which functions automatically for covering the set of numerals on said wheels which are not to be read and for simultaneously exposing the set of numerals on said wheels which are to be read.

The mechanism for automatically shifting the shutter for the indicator wheels to expose the set of numerals thereon which indicate the true amount constitutes no part of the present invention and therefore has not been shown in detail or described herein, as any suitable type of mechanism may be used for this purpose.

In subtracting operations, the minus wheels are engaged with the auxiliary actuator racks (Fig. 2) and are driven thereby in an additive direction to rotate the corresponding adding wheels in a reverse direction to subtract therefrom the value of the depressed amount keys. In subtracting operations, as long as the auxiliary totalizer is in a positive condition, the minus numerals on the indicator wheels contain the true amounts and consequently are exposed by the automatic shutter mechanism for reading purposes, the same as in adding operations. If during a subtracting operation the balance or auxiliary totalizer becomes overdrawn, the plus set of wheels in this case contain the true negative balance, and likewise the plus numerals on the corresponding indicator wheels indicate the true negative balance and are consequently exposed by the shutter mechanism for reading in such cases.

In normal sub-balance and balance operations in the auxiliary totalizer—that is, when said totalizer is in a positive condition—the plus wheels of said totalizer are selected for engagement and disengagement with and from the auxiliary actuator racks and are reversely rotated by said racks to zero positions. Inasmuch as said plus wheels contain the complement of the true amount, they likewise position the primary differential slides to the complement, and said primary slides in turn position their corresponding secondary slides 109 to the true amount, said secondary slides in turn positioning the corresponding type wheels and indicators to the true amounts.

In normal balance operations, the plus wheels of the auxiliary totalizer are engaged with the auxiliary actuator racks prior to their initial movement, which movement rotates said wheels to zero positions, which are determined by the long teeth on said wheels contacting the corresponding transfer pawls. After said wheels have been zeroized and prior to forward return movement of the primary differential slides 103 and the auxiliary actuator racks carried thereby, said wheels are disengaged from said actuators so that they will remain in a zeroized condition. The only difference between a balance operation and a sub-balance operation is that in sub-balance operations the plus wheels of the auxiliary totalizer remain in engagement with the corresponding auxiliary actuator racks during their return forward movement, and consequently said wheels are restored to their original positions.

In balance and sub-balance of the overdraft operations, the minus wheels of the auxiliary totalizer are selected for engagement with the auxiliary actuator racks, as said minus wheels contain the complement of the true negative balance, and it is necessary to position the primary differential slides 103 to said complement. Positioning the primary differential slides to the complement of the true negative balance causes said slides in turn to position the corresponding secondary slides 109 and the corresponding type wheels and indicators to the true negative balance, so that said true negative balance will be indicated and recorded.

By referring to Fig. 1, it will be recalled that the functions of the auxiliary totalizer are controlled by the control keys 78 to 84 inclusive on the extreme right-hand side of the keyboard, and that by proper use of these control keys in conjunction with the three rows of transaction control keys 74 to 77 inclusive for the three lines of transactions totalizers, explained earlier herein, positive and/or negative amounts may be transferred from said auxiliary or balance totalizer to said transaction totalizers, and likewise positive and/or negative amounts may be transferred from said transaction totalizers to said auxiliary totalizer, as will be explained in detail later. It will likewise be recalled that the control keys 78 to 84 inclusive are motorized keys and that depression of any one of these keys, in addition to its other functions, initiates machine operation.

The mechanism of the auxiliary totalizer, explained in general above, will be explained in detail in the ensuing pages.

*Auxiliary totalizer actuator mechanism*

Each primary differential slide 103 (Figs. 2 and 47) has shiftably connected thereto an actuator rack 606, each of said racks being shiftably connected to its corresponding slide 103 by means of parallel slots 607 in said racks, in cooperation with studs 608 secured in upward extension of said slides 103.

Inasmuch as each denominational order of the auxiliary totalizer has similar mechanism, it is believed that a description of the $10.00 order— that is, the order corresponding to the amount differential mechanism shown in Figs. 2 and 7— will be sufficient.

The actuator rack 606 for the denomination being described has, on its upper edge, teeth 609, which are arranged to mesh with teeth in corresponding plus and minus auxiliary totalizer wheels 610 and 611 (Figs. 45, 46, and 47) free on a rod 612. Like the usual type of balance totalizer, the plus and minus wheels 610 and 611 are geared together for reverse movement, so that, when the plus wheel is engaged with the actuator 606, it is driven in an additive direction and through the reverse gearing drives the corresponding minus wheel 611 in a reverse or subtractive direction. Likewise, when the minus wheel 611 is engaged with the actuator 606 in subtract operations, it is driven in an additive direction and through the reverse gearing drives the corresponding plus wheel 610 in a subtractive direction, to obtain the desired result.

The teeth of the plus wheel 610 (Figs. 45, 46, and 47) mesh directly with the teeth of a gear 613 integral with an indicator wheel 614 free on a rod 615. Also integral with the wheel 614 and the gear 613 is a smaller gear 616, which meshes with an idler pinion 617, said pinion in turn meshing with a gear 618 integral with the minus wheel 611. It is obvious that, through the gearing described above, the plus wheel 610 and the minus wheel 611 are geared together for reverse rotation, so that, when one turns in a clockwise direction, the other turns in a counter-clockwise direction, and vice versa. The pinion 617 is pivotally mounted on a plate 619, having two holes which engage, respectively, the rods 612 and 615, and said plate, together with a companion plate 620, which is likewise supported by the rods 612 and 615, in cooperation with collars 621 and 622, retains the totalizer wheels 610 and 611 and the corresponding indicator wheel 614 for each denominational order in their proper lateral positions upon said rods 612 and 615.

The rods 612 and 615 (Figs. 38, 47, 52, and 58) are mounted for axial shifting movement between right and left arms 623 and 624 connected by a bail to form a rockable framework 625, said right and left arms being rockably supported on their respective studs 626 secured in axial alinement in the right and left machine frames. The similar arms 623 and 624 (Figs. 38 and 52) carry, respectively, rollers 627, which cooperate, respectively, with identical cam slots 628 in cams 629 and 630 secured on a shaft 631 journaled in the machine framework.

The manner in which the cams 629 and 630 are operated to in turn rock the totalizer framework 625 back and forth to engage and disengage the totalizer wheels with and from the auxiliary actuator racks 606 will be explained in detail later.

The rods 612 and 615 (Figs. 52 and 58) are further braced and secured in spaced relationship to each other by similar arms 634 and 635 secured to said rod, said arms having, in forward extensions thereof, holes which slidably engage a rod 636 extending between and secured in the right and left arms 623 and 624. Rotatably supported on the rod 612, between the right-hand arm 634 and a spacing collar 637 secured on said rod, is a collar 638 having secured therein a pin 639, which freely engages a hole in a roller 640, a reduced upper portion of which engages a slot in the cross member of a bracket 641. Opposite arms of the bracket 641 have holes which freely engage a shaft 642 journaled in the machine framework, the left arm of said bracket 641 being secured to the order plate 370 (Fig. 58).

The arms of the bracket 641 straddle and snugly embrace a drum-shaped shifting cam 643 secured on the shaft 642, said cam having a shifting groove 644 engaged by a reduced downward portion of the roller 640. An enlarged flange, formed between the upper and lower reduced portions of the roller 640, fits between the cross member of the bracket 641 and the periphery of the cam 643 to prevent displacement of said roller.

In Fig. 42, which shows a diagrammatic view of the cam 643 and the shifting groove 644, it will be seen that the plus portion of the groove 644, which alines the plus wheels 610 of the auxiliary totalizer with the actuators 606, has four positions corresponding to the four control keys 78 to 81 inclusive (Figs. 1 and 38) and that the minus portion of the shifting groove 644, which alines the minus wheels 611 with the actuators 606, also has four positions, three of which correspond to the control keys 82, 83, and 84, and the other of which is a blank or unused position in the present adaptation of the machine but is available for use if desirable and/or necessary. The shifting groove 644 (Figs. 42 and 52) has, in its bottom, holes 645 corresponding to the various positions of said cam, said holes arranged to be engaged by the lower end of the pin 639 when the selected set of auxiliary totalizer wheels is engaged with the actuators 606 to insure proper alinement of said wheels with said actuators.

*Auxiliary totalizer differential*

The control keys 78 to 84 inclusive for the auxiliary totalizer (Figs. 1 and 38), through a differential mechanism which is similar in every respect to the transaction differential mechanism shown in Figs. 10 and 41 and explained earlier herein, position the drum cam 643 to select the plus or minus wheels of the auxiliary totalizer in a manner now to be described.

The lower ends of the stems of the keys 78 to 84 inclusive (Fig. 38) cooperate with corresponding stop surfaces 646 formed on a control slide 647 mounted for linear sliding movement by means of parallel slots 648 and 649 therein in cooperation with studs 650 secured in a control bank partition plate 651 (Fig. 58). A slot 652 in the forward end of the slide 647 engages a stud 653 in a forward extension of a differential sector 654 free on the shaft 323, which, as previously explained, drives the transaction differential mechanisms. The sector 654 has a slot which engages a stud 656 in an extension of a latch 657 pivoted on a stud 658 in a latch plate 659 free on the shaft 323.

A spring 660 urges the latch 657 clockwise to normally maintain a tooth thereon in engagement with a recess 661 in a latch operating segment 662 free on the shaft 323. Integral with the segment 662 is a partial gear 663, which meshes with a gear segment 664 fixedly connected by a hub 665 to a bell crank 666, said hub journaled on the shaft 335. A rearwardly extending arm of the bell crank 666 is pivotally connected by a link 667 to an arm of a Y-shaped lever 668 (Figs. 38 and 40) free on the stud 338. Angularly disposed arms of the levers 668 carry, respectively, rollers 669 and 670, which cooperate, respectively, with the peripheries of companion plate cams 671 and 672 secured on the main cam shaft 71.

As previously explained, the main cam shaft 71 makes one clockwise revolution each machine operation, and during such revolution the cams 671 and 672 rock the lever 668 first clockwise and then back to normal position, according to the time given in space 19, Fig. 60. The lever 668, through the bell crank 666 (Fig. 38) and the partial gear 663, rocks the segment 662 first clockwise and then back to normal position in synchronism with the lever 668. Initial movement of the drive segment 662, through the recess 661 in cooperation with the latch 657, carries the plate 659 clockwise in unison therewith, causing said plate, through the stud 653, to shift the slide 647 rearwardly.

As the slide 647 (Fig. 38) moves rearwardly, the lower end of any depressed one of the keys 78 to 84 inclusive, in cooperation with the corresponding stop surface 646 on said slide, terminates such movement of said slide and the plate 659 to position said parts in relation to the depressed control key. Termination of clockwise movement of the plate 659 causes the slot therein, in cooperation with the stud 656, to rock the latch 657 counter-clockwise against the action of the spring 660 to disengage the tooth of said latch from the recess 661 in the operating segment 662 and to simultaneously engage a tooth 673 on said latch with the corresponding one of a series of alining notches 674 in an alining plate 675 supported by the rods 87 and 267.

The segment 662 and connected parts continue their clockwise movement without interruption, and during this movement the periphery of said segment moves opposite the tooth of the latch 657 to secure said latch, the plate 659, and the slide 647 in set positions while the beam mechanism functions, in a manner to be explained presently.

The differential positioning of the plate 659 is transmitted to a corresponding printer positioning segment 676 free on the shaft 323 (Fig. 38) through the medium of a beam 677. The upper end of the beam 677 is pivotally mounted on a stud 678 carried by the segment 676, and the lower end of said beam has a slot which engages a stud 679 in the plate 659. During counter-clockwise movement of the bell crank 666, a roller 680, carried by an upward arm of said bell crank, in cooperation with an arcuate surface 681 on the beam 677, forces said beam outwardly or toward the left, as viewed in Fig. 38, until an internal arcuate surface thereof contacts a collar on the shaft 323 to position said beam and the printer positioning segment 676 in accordance with the plate 659 and the depressed control key 78 to 84.

The forward end of a link 682 (Fig. 38) is pivitally mounted on the stud 678, while the rear end of said link is pivotally connected to a gear sector 683 free on a stationary stud 684, said gear sector meshing with a gear 685 secured on the shaft 642, upon which shaft is also secured the drum cam 643 (Figs. 52 and 58) for shifting the auxiliary totalizer. It is therefore obvious that the differential positioning of the segment 676 (Fig. 38) is transmitted to the shaft 642 and the cam 643, to position said cam in accordance with the depressed control keys 78 to 84.

When any one of the plus control keys 78 to 81 inclusive (Figs. 1, 38, and 42) is depressed, the differential mechanism for said keys positions the shaft 642 and the cam 643 so that the upper or plus portion of the cam groove 644, in cooperation with the roller 640, shifts the totalizer framework, comprisinng the rods 612 and 615 and the arms 634 and 635 (Figs. 52 and 58), toward the right to aline the plus set of wheels 610 of the balance totalizer with the auxiliary actuators 606. When one of the minus keys 82, 83, or 84 is depressed (Fig. 38), the control differential mechanism positions the shaft 642 and the cam 643 so that the minus portion of the cam groove 644, in cooperation with the roller 640, shifts the balance totalizer framework toward the left to aline the minus set of wheels 611 with the auxiliary actuators 606.

The beam mechanism (Fig. 38) including the beam 677 and associated parts permits the selected set of totalizer wheels to remain in alinement with the auxiliary actuators 606 at the end of machine operation, and in the immediately succeeding operation the balance totalizer may be shifted from its preset position to its new position to aline the selected of wheels thereon with the actuators.

The printer segment 676 (Fig. 38) meshes with and drives an internal-external gear 686, which bears on the periphery of a corresponding disk 687 supported by the shaft 173. The gear 686 is connected by suitable pinions and one of the square shafts 175 to type wheel driving gears similar to the gear 176 (Fig. 2), said gears in turn meshing with and driving a corresponding type wheel 688 to position said wheel in accordance with the depressed control key 78 to 84 inclusive, so that upon operation of the impression mechanism a symbol characteristic of the depressed control key and the operation initiated thereby may be printed upon the record material.

Near the end of machine operation, counter-clockwise return movement of the segment 662 (Fig. 38 and space 19, Fig. 60) moves the recess 661 therein opposite the tooth of the latch 657, and, at the same time, a right-hand extension of said segment contacts a shoulder on the stud 679, to return the plate 659 counter-clockwise in unison therewith and to simultaneously disengage the alining tooth 673 on the latch 657 from the corresponding notch 674 and to re-engage the driving tooth of said latch with said recess 661.

The beam 677 (Fig. 38) and associated parts constitute a minimum movement mechanism which permits the printer segment 676 and connected parts to remain in set positions at the end of machine operation, which is essential for the proper actuation of the auxiliary totalizer mechanism and for the proper operation of the printer mechanism.

As previously explained, the differential mechanism for the control keys 78 to 84 inclusive (Fig. 38) for the auxiliary totalizer is similar in every respect to the transaction differential mechanism shown in enlarged scale in Fig. 41 and explained earlier herein in connection with the transaction differential mechanism, to which reference may be had for a more complete disclosure of this mechanism.

*Auxiliary totalizer engaging and disengaging mechanism*

At the end of adding and subtracting operations, the selected set of wheels of the auxiliary totalizer remain in engagement with the auxiliary actuator racks 606 and are disengaged therefrom at the beginning of the succeeding operation and prior to operation of the control differential mechanism shown in Fig. 38 and explained earlier herein. The mechanism which controls the type of operation to be performed in the auxiliary totalizer—in other words, the mechanism which controls the engaging and disengaging movement of said auxiliary totalizer—is actuated by the control differential mechanism and functions immediately after the selected set of totalizer wheels has been disengaged from the actuators to select and condition the auxiliary totalizer for the desired type of operation.

Secured on the shaft 642 (Figs. 38 and 52) and positioned by the control differential mechanism are companion plate cams 690 and 691, the peripheries of which cooperate, respectively, with rollers 692 and 693 carried by a cam lever 694 pivoted on a stationary stud 695. A downward extension of the lever 694 carries a stud 696, which engages a slot in an upward extension of a slide 697 mounted for linear shifting movement by means of two parallel slots 698 therein, in cooperation with stationary studs 699. The slide 697 has a slot 700 engaged by a stud 701 in the forward end of a link 702, the rearward end of which link is pivoted on a stud 703 in a crank 704 secured on the engaging shaft 631, to which also are secured the engaging cams 629 and 630. The stud 701 in the shifting link 702 (Fig. 52) cooperates with a shifting notch 706 (Figs. 38 and 56) in an add and subtract slide 707, shiftably mounted by means of parallel slots 708 therein, in cooperation with the upper stud 699 and a stationary stud 709. The slide 707 (Fig. 38) carries a stud 710, which engages a slot in the upper end of a lever 711 secured to a hub 712 free on the shaft 314. Also secured on the hub 712 (Figs. 32 and 39) is a triangular arm 713 carrying rollers 714 and 715, which cooperate, respectively, with the peripheries of companion plate cams 705 and 716, secured on the main cam shaft 71. One clockwise revolution of the shaft 71 and the cams 705 and 716, through the arm 713 and the lever 711, shifts the slide 707 first forwardly and then back to normal position, according to the time given in space 20 of the chart (Fig. 60).

The engaging stud 701 likewise cooperates with an engaging notch 717 (Figs. 10 and 57) in the reset plate 444 and with an engaging slot 718 (Figs. 10 and 37) in the read plate 593.

*Adding and subtracting operations in the auxiliary totalizer*

The engaging and disengaging movement of the auxiliary totalizer is exactly the same in adding and subtracting operations, the only difference being that in adding operations the adding wheels 610 (Fig. 42) are engaged with the auxiliary actuators 606 and in subtracting operations the subtracting wheels 611 are engaged with said actuators.

Assuming that the immediately preceding operation was an adding operation or a subtracting operation, the stud 701 (Figs. 38, 52, and 56) will have been left in engagement with the narrow shifting portion of the notch 706 in the slide 707, as shown here. Consequently initial forward movement of said slide 707, according to the time given in space 20 of the chart, Fig. 60, will shift the stud 701 and the link 702 forwardly in unison therewith to rock the crank 704, the shaft 631, and the cams 629 and 630 clockwise (see also Fig. 45). Clockwise movement of the cams 629 and 630, through the slots 628 therein, in cooperation with the rollers 627, rocks the totalizer framework 625 (Fig. 38) also clockwise to disengage the wheels of the auxiliary totalizer from the auxiliary actuators 606.

In adding operations, while the auxiliary totalizer is in disengaged position, the differential mechanism for the control keys (Fig. 38) functions according to the time given in space 19, Fig. 60, to be positioned by the depressed Add key 79, to in turn position the shaft 642, the shifting cam 643, and the plate cams 690 and 691, as shown in Fig. 52, to retain the stud 701 in engagement with the shifting portion of the notch 706. Positioning of the shifting cam 643 (Figs. 40 and 52) causes the plus side of the shifting groove 644 to aline the plus wheels 610 of the auxiliary totalizer with the actuators 606 in the manner explained previously.

After the amount differential mechanisms have completed their initial movements (space 2, Fig. 59) to position the primary slides 103 and the secondary slides 109 in accordance with the values of the depressed amount keys 73 (Fig. 2), return movement of the slide 707 (Figs. 38 and 39 and space 20, Fig. 60) shifts the stud 701 and the link 702 rearwardly to return the crank 704, the shaft 631, and the cams 629 and 630 counterclockwise, to cause said cams to return the auxiliary totalizer frame 625 also counter-clockwise to engage the add wheels 610 (Figs. 40, 45, and 47) with the teeth 609 of the actuators 606.

After the adding wheels have thus been engaged with the actuators 606, forward return movement of the primary slides 103 and the actuators 606 (Figs. 2 and 47 and space 2, Fig. 59) revolves the add wheels 610 in an additive direction to enter therein the complement of the value set up on the amount keys 73, as it will be recalled that the primary slides 103 are always positioned to the complement of the true values. This movement of the adding wheels 610 in an additive direction, through the reverse gearing shown in Figs. 45 and 46, drives the corresponding minus wheels 611 in a reverse or subtractive direction to in turn position said subtract wheels to the true value of the amount set up on the amount keys. Inasmuch as the minus wheels 611 contain the true value of the amount, likewise the minus numerals on the indicator wheels 614 (Figs. 1 and 45) display the true value of the amount in the auxiliary totalizer, and the shutter mechanism, explained briefly earlier herein, will automatically reveal the minus numerals in a case of this kind.

At the end of adding and subtracting operations, the selected set of totalizer wheels remain in engagement with the teeth of the actuators 606, as explained above, and are disengaged therefrom at the beginning of the succeeding operation.

In subtract operations, if the previous operation was an adding operation or a subtracting operation, the stud 701 (Figs. 38, 52, and 56) will be in engagement with the shifting portion of the notch 706, as explained above, and initial movement of the slide 707 will disengage the wheels of the auxiliary totalizer from the actuators 606 in exactly the same manner as explained for adding operations. After the wheels of the auxiliary totalizer have been disengaged from the actuator racks, the control differential mechanism (Fig. 38) functions and is positioned by the depressed Subtract key 84, to in turn position the shaft 642, the shifting cam 643, and the cams 690 and 691 in accordance with said key 84. This positions said cams 643, 690, and 691 in their second positions (Figs. 42 and 52), causing the minus portion of the groove 644 to aline the minus wheels 611 with the actuators 606, and causing the cams 690 and 691 to position the lever 694 and the slide 697 exactly the same as in adding operations to retain the stud 701 in engagement with the shifting portion of the notch 706 (see also Fig. 56) in said slide 707, exactly as in adding operations.

It is, therefore, obvious that in subtracting operations the minus wheels 611 of the auxiliary totalizer are engaged with and disengaged from the auxiliary actuators 606 the same as in adding operations; that is, according to the time given in space 20, Fig. 60. Consequently, return movement of the primary differential slides 103 (Fig. 2) causes their corresponding auxiliary actuator racks 606 to rotate the minus whels 611 in an additive direction, whereupon said wheels rotate their corresponding adding wheels 610 in a subtractive direction to subtract from said adding wheels the complement of the value of the depressed amount keys 73.

As long as the auxiliary totalizer remains in a positive condition during subtracting operations, the minus wheels of said totalizer contain the true value of the amount therein, and likewise the minus set of numerals on the corresponding indicator wheels 614 (Fig. 45) indicate the true value in said totalizer and in such cases are displayed for reading purposes through their corresponding apertures in the machine cabinet 70 (Fig. 1). However, when the auxiliary totalizer becomes overdrawn during subtracting operations, the plus wheels 610 then contain the true negative balance; likewise the plus numerals on the corresponding indicator wheels 614 indicate the true negative balance, and the shutter mechanism for the indicator wheels functions automatically to cover the minus set of numerals on the indicator wheels 614 (Figs. 1 and 45) and to simultaneously uncover the plus set of numerals on said wheels for reading purposes.

*Reading and resetting operations in the auxiliary totalizer*

When the auxiliary totalizer is in a positive condition, the Sub-Balance and Balance keys 80 and 81 (Figs. 1 and 38) are used to select and condition the plus side of the said totalizer for reading and resetting or sub-balance and balance operations, respectively, and, when the auxiliary totalizer is in an overdrawn condition, the Sub-Balance of Overdraft and Balance of Overdraft keys 83 and 84 are used to select and condition the minus side of said totalizer for reading and resetting operations.

It will be recalled that, at the end of adding and subtracting operations, the selected plus or minus wheels of the auxiliary totalizer remain in engagement with the auxiliary actuator racks 606. In considering a reset or balance operation in connection with the plus side of the auxiliary totalizer, after an adding or subtracting operation, under influence of the Balance key 81, initial forward movement of the slide 707, at the beginning of such resetting operation (Figs. 38, 52, and 56), through the stud 701, the link 702, and the crank 704, rocks the shaft 631 and the cams 629 and 630 clockwise, to rock the totalizer frame 625 also clockwise to disengage the wheels of the auxiliary totalizer from their corresponding actuator racks. By comparing spaces 19 and 20 (Fig. 60), it will be seen that, after the auxiliary totalizer has been disengaged from the actuators, the control differential mechanism shown in Fig. 38 functions and is positioned under influence of the Balance key 81 to position the shifting cam 643 (Figs. 38, 52, and 58) and the plate cams 690 and 691 in their sixth positions. This causes the shifting groove 644 in the cam 643 to aline the plus wheels 610 with the amount actuators 606 and causes the cams 690 and 691 to shift the slide 697 and the stud 701 downwardly from adding position to reset position, to engage said stud 701, which is now in alinement with the shifting notch 717 in the reset plate 444 (Figs. 38 and 57) with said notch 717. Immediately after the stud 701 has been engaged with the notch 717, the reset plate 444 functions according to the time given in space 23, Fig. 60, to engage the plus wheels 610 of the auxiliary totalizer with the actuators 606, prior to initial movement of said actuators and the primary differential slides 103 (Fig. 2).

After the plus wheels of the auxiliary totalizer have been engaged with the actuators 606, initial rearward movement of the primary slides 103 (Figs. 2 and 47) reversely rotates said wheels counter-clockwise until the long teeth thereon contact the upper edges of corresponding transfer trip pawls 729 (Fig. 47) to stop said wheels in zero position and to simultaneously position said primary slides to the amounts contained in said wheels, which, it will be recalled, in this case is the complement of the true value of said amounts. The primary slides 103 (Fig. 2) in turn position their corresponding secondary slides 109, type wheels, and indicators to the true values of the amounts contained in the plus totalizer wheels, so that said true values may be recorded upon the record material and indicated.

It is likewise obvious that the amount cleared from the auxiliary totalizer may be added into or subtracted from any selected set of wheels of any or all of the three transaction totalizer lines 132, 134, and 136 (Fig. 2) at the time said amount is cleared from said auxiliary totalizer.

In balance operations, while the plus wheels of the auxiliary totalizer are in zeroized condition, and prior to return movement of the primary and secondary differential slides 103 and 109, the reset plate 444 (Figs. 38 and 57) is returned forwardly, according to the time given in space 23, Fig. 60, to disengage said wheels from the actuators 606 so that they will remain in zeroized condition.

When the auxiliary totalizer is in an overdrawn condition, the Balance of Overdraft key 82 (Figs. 1 and 38) is used to initiate a reset operation, which is the same in every respect as explained in connection with the Balance key 81, except that the minus wheels 611 (Figs. 42 and 47) of the auxiliary totalizer are alined with the actuator 606 and, upon being zeroized by initial rearward movement of the primary differential slides 103 (Fig. 2), position said slides to the complement of the true negative balance, said slides in turn positioning their corresponding secondary slides 109, type wheels, and indicators to the true negative balance, so that said true negative balance will be recorded and indicated and, if desired, may be entered into the desired ones of the transaction totalizers.

In reading the plus side of the auxiliary totalizer, the Sub-Balance key 80 (Figs. 1 and 38) is used to initiate operation of the machine, and, in case said reading operation immediately succeeds an adding operation or a subtracting operation, initial forward movement of the slide 707 (Figs. 38 and 56) will rock the totalizer frame 625 clockwise to disengage the wheels of the auxiliary totalizer from the actuators 606. While the totalizer wheels are thus disengaged from the actuators, the control differential mechanism functions and is positioned under influence of the Sub-Balance key 80 to in turn position the shifting cam 643 (Figs. 52 and 54) and the plate cams 690 and 691 to their seventh positions, which positioning of the cam 643 causes the plus portion of the groove 644 therein to aline the plus wheels 610 of the auxiliary totalizer with the actuators 606. Movement of the cams 690 and 691 to seventh position, through the lever 694, shifts the slide 697 downwardly one position below adding position (Fig. 52) to engage the stud 701 in the link 702 with the narrow shifting portion of the slot 718 (Figs. 37 and 38), in the read engaging plate 593.

The read engaging plate then functions according to the time given in space 22, Fig. 60, to engage the plus wheels 610 of the auxiliary totalizer with the actuators 606 (Figs. 2 and 47) prior to initial rearward movement of said actuators and the corresponding primary differential slides 103, which movement reversely rotates said wheels, exactly the same as in resetting operations, until the long teeth thereon contact the upper edges of the corresponding transfer trip pawls 720, to locate said wheels in zero positions and to in turn position said primary slides 103 to the complement of the amount on said wheels. The primary slides in turn position their corresponding secondary slides 109, type wheels, and indicators to the true value of the amount taken from said plus wheels, to cause said true amount to be printed and indicated. In reading operations, the selected set of auxiliary totalizer wheels remain in engagement with the actuators 606 during return forward movement of said actuators and the corresponding primary differential slides 103, whereupon said wheels are restored to their original positions instead of remaining in a zeroized condition. After the primary differential slides 103 have completed their forward return movements, the read engaging plate 593 (Fig. 38), functioning according to the time given in space 22, Fig. 60, disengages the selected set of auxiliary totalizer wheels from the actuators 606.

It is to be noted that in balance operations, when the stud 701 in the link 702 (Fig. 52) is in engagement with the shifting notch 717 in the reset plate 444 (Figs. 37, 38, and 57), the long clearance portion of the slot 718 in the read plate 593 provides clearance for said stud 701 to operate without imparting any movement to said read plate 593.

When the auxiliary totalizer is in an overdrawn condition, it is desirable that the minus wheels 611 be read in order to obtain a true negative balance, and such an operation, which is often referred to as a "sub-balance of the overdraft operation," is initiated and conditioned by depression of the Sub-Balance of Overdraft key 83 (Figs. 1 and 38). The key 83, through the control differential mechanism, positions the shifting cam 643 (Figs. 52 and 58) and the plate cams 690 and 691 in third positions. This causes the minus portion of the slot 644 in the cam 643 (Fig. 42) to aline the minus wheels 611 with the actuators 606 and also causes the cams 690 and 691 to engage the stud 701 with the narrow shifting portion of the slot 718 in the read engaging plate 593 (Figs. 37 and 38) to effect sub-balance of overdraft in exactly the same manner as explained in connection with sub-balance operations.

It will be remembered that, when the auxiliary totalizer is in an overdrawn condition, the minus wheels contain the complement of the overdraft and, in being zeroized, position the primary differential slides 103 to the complement, said slides in turn positioning the corresponding secondary slides 109, the printing wheels, and the indicators to the true negative balance, which is the desired result.

As explained in connection with balance or reset operations in the auxiliary totalizer, if desirable, either plus or negative amounts read from the auxiliary totalizer may be transferred to any of the transaction totalizers in the machine by the simple expedient of depressing the proper selecting and control keys 74, 75, 76, and 77 (Fig. 1).

*Non-add operations in the auxiliary totalizer*

A non-add operations is initiated in the auxiliary totalizer by use of the Non-Add key 78 (Figs. 1 and 38), which key, when depressed, positions the control differential mechanism in its ninth or normal position. This, through the corresponding beam mechanism, positions the shifting cam 643 (Figs. 42, 52, and 58) and the plate cams 690 and 691 also in ninth position. Positioning of the shifting cam 643 in ninth position causes the plus portion of the shifting groove 644 therein to aline the plus wheels 610 of the auxiliary totalizer with the actuators 606. However, in non-add operations this is immaterial, as no engaging and disengaging movement is imparted to the totalizer frame 625 in such operations. The positioning of the cams 690 and 691 in ninth position, through the lever 694 (Fig. 52), shifts the slide 697 upwardly one step above adding position, as shown here, to non-adding position. This moves the stud 701 upwardly in unison therewith out of the narrow shifting portion of the notch 706 in the slide 707 (Figs. 38 and 56) and into an elongated clearance portion of said notch 706.

By comparing spaces 19 and 20, Fig. 60, it will be seen that the above-described shifting of the stud 701 to non-adding position is effected after the slide 707 has completed its initial movement (Fig. 38) to disengage the wheels of the auxiliary totalizer from the actuators 606. Inasmuch as the stud 701 is in alinement with the elongated portion of the notch 706, return rearward movement of the slide 707 has no effect upon said stud, and its associated mechanism. Consequently the auxiliary totalizer remains in disengaged position during such return movement.

In the above-described non-add operation, the Non-Add key 78 is used chiefly as a release key to initiate machine operation when it is desired to carry on computations in the transaction totalizers without involving the auxiliary totalizer in such computations.

The positioning of the control differential mechanism (Fig. 38) under influence of the control keys 78 to 84 inclusive, through the segment 676, the gear 686, and corresponding type wheel positioning gears, positions the type wheels 688 so that an identifying symbol of the operation being performed will be printed upon the record material.

While no connecting mechanism is shown between the control differential (Fig. 38) for the auxiliary totalizer and the indicating mechanism, it is but a matter of mechanical skill to provide connections similar to that shown for the amount bank (Fig. 2) for said control differential and also for the transaction differential mechanisms (Fig. 10) for the three transaction totalizers to effect the selection and the displaying of indicator tablets similar to the amount tablets 202 and 203 characteristic of the effective control keys.

The control differential mechanism is constructed to provide for the inclusion of a regular machine release bar to use instead of the Non-Add key 78 in intiating operations not involving the auxiliary totalizer. In such operations, no control key is depressed in the control bank for the auxiliary totalizer (Fig. 38), and in this case the forward ends of the slots 648 and 649 in the slide 647, in cooperation with their corresponding studs 650, position said slide in No. 1 or extreme rearward position, which positioning, through the beam mechanism, is transmitted to the shifting cam 643 (Fig. 52) and the selecting cams 690 and 691. The positioning of the selecting cams 690 and 691 in No. 1 position, through the lever 694, shifts the slide 697 upwardly to move the stud 701 to non-add position exactly the same as explained in connection with the Non-Add key 78, to cause the auxiliary totalizer to be non-added.

It will be recalled that, in adding and subtracting operations in the auxiliary totalizer, the selected set of totalizer wheels remain in engagement with the actuators 606 at the end of such machine operations and in the beginning of the succeeding operation, prior to the functioning of the control differential mechanism (Fig. 38 and spaces 19 and 20, Fig. 60), disengages said totalizer wheels from said actuators. Consequently, in reading and resetting operations, following an adding or subtracting operation, the above-explained disengaging movement will take place in the beginning of such operations, and such disengaging movement, in combination with the regular engaging and disengaging movement of the read plate 593 (Fig. 38) and the reset plate 444, obtains the results shown in spaces 22 and 23, Fig. 60.

In reading and resetting operations in the auxiliary totalizer, the wheels of said totalizer are disengaged from the actuators 606 at the end of machine operation, and consequently, in a succeeding reading and/or resetting operation, it is unnecessary to disengage said auxiliary totalizer. As a result, the engaging and disengaging movement of said totalizer in such operations conforms to the true movements of the read plate 593 (Fig. 38) and the reset plate 444, which movements are shown respectively in spaces 24 and 25 of the time chart, Fig. 60.

Likewise, if an adding operation is performed immediately after a reading or resetting operation in the auxiliary totalizer, the wheels of said auxiliary totalizer will be disengaged at the beginning of such adding operations, and, as a result, initial forward movement of the slide 707 (Figs. 38 and 39), under influence of the cams 705 and 716, will be but an idle movement, and functioning of the control differential mechanism immediately thereafter will, through the positioning of the selecting cams 690 and 691 (Figs. 52 and 56), cause the stud 701 to be engaged with the shifting portion of the notch 706 in said slide 707, after which return rearward movement of said slide will engage the wheels of the auxiliary totalizer with the actuators in adding time. The engaging movement of the auxiliary totalizer framework 625 in adding operations, immediately following a reading or resetting operation, is given in space 26, Fig. 60.

What was said immediately above concerning the engaging and disengaging of the auxiliary totalizer in adding operations, immediately following reading and/or resetting operations, applies equally as well to the engaging and disengaging of said totalizer in subtracting operations following reading and resetting operations, as both of these movements are exactly the same, the only difference being that in the first instance the plus wheels 610 of said auxiliary totalizer are engaged with the amount actuators 606 and in the second instance the minus wheels 611 of said totalizer are engaged with said actuators.

Aliner for auxiliary totalizer

An aliner 722 (Figs. 43, 45, 47, and 52) is provided for alining the wheels 610 and 611 of the auxiliary totalizer when said wheels are disengaged from the actuators 606.

The aliner 722 has a series of alining teeth 721 arranged to engage the teeth of the corresponding gears 613, which, it will be recalled, are integral with the corresponding indicator wheels 614 and mesh with the corresponding add wheels 610. The aliner bar 722 (Figs. 43 and 52) extends between similar right and left arms 723, each of said arms having alined slots which shiftably engage the rods 612 and 613, said arms 723 and said aliner bar 722 being shiftable laterally in unison with said rods to always maintain the teeth 721 in alinement with the corresponding gears 613 (Figs. 45 and 47). Each of the right and left arms 723 has, in its lower end, a similar slot which engages a corresponding stud 724 in a corresponding bell crank 725 pivoted on studs 726 secured, respectively, in the right and left arms 623 and 624 of the totalizer framework 625. The bell cranks 725 carry, on downward extensions thereof, rollers 727, which engage corresponding cam slots 728 in right and left cams 729 secured on the auxiliary totalizer engaging shaft 631 and moving in unison with said shaft and the cams 629 and 630, in accordance with the type of operation being performed, as explained earlier herein.

The contour of the cam slots 728 in the cams 729 in comparison to that of the cam slots 628 in the totalizer engaging cams 629 and 630 (Figs. 43, 47, and 52) is such that, when said cams are in their counter-clockwise position, as shown here, the alining teeth 721 are disengaged from their corresponding gears 613 immediately after the totalizer wheels 610 or 611 are engaged with their corresponding actuator racks 606. Clockwise movement of the shaft 631 and the cams 629, 630, and 729 causes said cam 729 to shift the aliner bar 722 downwardly to engage the teeth 721 thereof with the corresponding teeth in the gears 613 prior to any disengaging movement imparted to the framework 625 by said cams 629 and 630. After the aliner teeth 721 have been engaged with the corresponding gears 613, prior to disengaging movement of the totalizer framework 625, the cam slots 728, in conjunction with the cam slots 628, cause the aliner 722 to move upwardly in unison with said totalizer framework 625, so that said teeth 721 will remain in engagement with said gears 613 to retain the totalizer wheels 610 and 611 in alinement while they are disengaged from the actuators 606.

The engaging and disengaging movement of the aliner 722 as compared with the movement of the totalizer framework 625 in adding and subtracting operations may be had by comparing spaces 20 and 21, Fig. 60, from which it will be seen that the aliner teeth 721 move into engagement with the teeth of the gears 613 (Fig. 47) prior to disengaging movement of the totalizer frame 625 and remain in engagement with said teeth during disengaging movement of said totalizer framework and during the time that the totalizer framework is in disengaged position. When the totalizer framework 625 is moved to actuator-engaging position to engage the selected set of wheels 610 or 611 with the actuators 606, the aliner 722 moves inwardly in unison therewith until said selected set of totalizer wheels is engaged with said actuators, after which said aliner 722 is moved out of engagement with the gears 613 prior to actuation of said selected set of totalizer wheels.

*Transfer mechanism for auxiliary totalizer*

The auxiliary totalizer is provided with a transfer mechanism for transferring tens digits in adding and subtracting operations.

The transferring of tens digits is effected in the auxiliary totalizer by movement of the actuator racks 606 (Fig. 47) independently of the corresponding primary slides 103, after said slides have completed their forward return movements, such transferring movement being effected by the springs 742. A latch mechanism restrains the racks 606 against transferring movement until an adjacent lower order wheel passes through zero during return movement of said slides 103, whereupon said latch mechanism is unlatched.

It will be recalled that, at the end of adding and subtracting operations, the selected set of wheels of the auxiliary totalizer remain in engagement with their corresponding actuators 606 and are disengaged therefrom at the beginning of the immediately succeeding operation. The transferring movements of the racks 606 do not take place upon the unlatching of their corresponding latches, but said racks are further restrained against such transferring movement by corresponding retaining pawls which are not released until the primary slides 103 and the corresponding actuators 606 have completed their return forward movements and are resting in home position. After such return movement of the primary slides 103 has been completed and near the end of machine operation, the retaining pawls for the racks 606 are all released, and all of said racks, which have been unlatched, move forwardly under action of the springs 742 to advance the corresponding totalizer wheel one step to effect the transfer of tens digits. The tripped actuator racks 606 remain in their moved positions at the end of machine operation, and in the immediately succeeding operation, just after the wheels of the auxiliary totalizer have been disengaged from said racks and prior to initial movement of the slides 103, the transfer restoring mechanism functions to restore all unlatched racks to latched position.

By referring to Figs. 47 to 51 inclusive and Figs. 53 and 54, it will be recalled that each denominational order is provided with a transfer trip pawl 720, a hooked upward extension of which, in cooperation with the long teeth on the corresponding selected set of totalizer wheels, stops said wheels in zero position in reading and resetting operations. The hooked upward extensions of the pawls 720 also act to trip the transfer mechanism when the corresponding ones of the selected set of totalizer wheels pass through zero while rotating in an additive direction.

The transfer trip pawl 720 for each denominational order is secured to a corresponding hub 731 free on a stud 732 secured in a corresponding bracket 733, in turn secured to the corresponding denominational order plate 86 (Fig. 2). Also secured to the hub 731, and in fixed relationship to the pawl 720, is a corresponding finger 734, which cooperates with a corresponding shoulder on a tripping latch 735 for the adjacent higher order, said latch being pivoted on a stud 736 secured to the bracket 733. A forward extension of the latch 735 has a bent-over ear 738, which cooperates with a corresponding ear 739 on the actuator rack 606 for the adjacent higher order totalizer wheel to that which trips the pawl 720.

When the lower order wheel passes through zero, while traveling in an additive direction, its long tooth wipes past the hook-shaped upper end of the pawl 720, rocking said pawl and the corresponding finger 734 counter-clockwise against the action of a spring 737 tensioned between said finger and the transfer latch 735. Counter-clockwise movement of the finger 734 disengages it from the shoulder on the latch 735 to release said latch to the action of the spring 737, which immediately rocks said latch clockwise to the position shown in Fig. 53, which position is determined by the finger 734 contacting the surface adjacent to the shoulder on the upward extension of said latch. This clockwise tripping movement of the latch 735 moves the ear 738 upwardly out of the path of the corresponding ear 739 on the actuator 606 for the adjacent higher order to free said actuator for forward transfer movement.

The above-described tripping of the transfer latch 735 takes place during forward return movement of the primary slides 103 and the corresponding actuators 606, and the tripped transfer latch 735 remains in tripped position, as shown in Fig. 53, until after the beginning of the succeeding operation, as will be explained presently.

The release of the latch 735 (Figs 47, 48, 53, and 54) does not permit forward transfer movement of the corresponding actuator rack 606, upon arrival of said rack in home position, as said rack is further restrained against such movement by a retaining pawl 740 free on the rearward one of the studs 608 in the corresponding primary slide 103, said pawl being urged clockwise by the spring 742 into engagement with an ear 743 on the forward end of the corresponding actuator rack 606, to normally restrain said rack 606 against forward transferring movement.

After the primary slide 103 and the corresponding actuator rack 606 have completed their return movement, as shown if Fig. 53, a restoring finger 744 secured on a shaft 745 journaled in the machine framework is rocked clockwise in unison with said shaft for the purpose of releasing the retaining pawl 740. The restoring finger 744 for the denomination shown in Fig. 53 has pivotally connected thereto the upper end of a pitman 746 with a slot 747 in its lower end, which engages a stud 748 in a downward extension of the transfer latch 735 for the adjacent higher order.

Clockwise movement of the finger 744 from the position shown in Fig. 53 to the position shown in Fig. 54 shifts the pitman 746 in unison therewith, causing a camming surface 749 thereon, in cooperation with a stud 750 in the retaining pawl 740, to rock said pawl counter-clockwise against the action of the spring 742, to disengage the shoulder on the rearward end of said pawl from the ear 743 to release the actuator rack 606 for forward transferring movement. Forward transferring movement of the actuator rack 606 (Figs. 53 and 54), under influence of the spring 742, which movement is determined by the studs 608 in cooperation with the slots 607, causes the teeth 609 therein, in cooperation with the teeth of the corresponding totalizer wheel 610 or 611, to advance said wheel the equivalent of one tooth space to transfer a tens digit from the adjacent lower order thereto.

The parts of the transfer mechanism remain in the position shown in Fig. 54 until the immediately succeeding machine operation, in the beginning of which they are restored to untripped or normal positions, as will be explained presently.

When there is no transferring of tens digits from a lower order to an adjacent higher order, the transfer latch 735 for the higher order is not tripped and therefore remains effective, as shown in Fig. 47, and the ear 738 on said latch remains in the path of the ear 739 on the corresponding actuator 606 to obstruct forward transferring movement of said actuator after the corresponding retaining pawl 740 is disengaged by the corresponding pitman 746, as explained in connection with Figs. 53 and 54.

The shift 745 (Fig. 43) is rocked, as explained above, through the medium of a crank 752 (Fig. 43) secured thereon, said crank being pivotally connected by a link 753 to a lever 754 free on the shaft 314. The lever 754 carries rollers 755 and 756, which cooperate, respectively, with the peripheries of companion plate cams 757 and 758 secured to the main cam shaft 71. The cams 757 and 758 function according to the time given in space 28, Fig. 60, to rock the shaft 745 and connected mechanism back and forth.

By comparing spaces 20 and 28, Fig. 60, it will be seen that, in the beginning of an operation immediately following an adding operation or a subtracting operation, the wheels of the auxiliary totalizer are disengaged from their corresponding actuators 606, and that, immediately after such disengagement, the cams 757 and 758 (Fig. 43), through the lever 751 and the link 753, rock the crank 752, the shaft 745, and the fingers 744 counter-clockwise from home position, as shown here, to fully restored position, as shown in Fig. 51. This counter-clockwise movement of the fingers 744 withdraws the surfaces 749 of the pitmans 746 from the corresponding studs 750 to release the corresponding retaining pawls 740 to the action of their springs 742, and simultaneously the lower ends of said fingers 744 engage the ears 743 on the corresponding actuator racks 606 to restore said racks forwardly from tripped position, as shown in Fig. 54, to untripped position, as shown in Fig. 51. This restoration of the actuators 606 moves the ears 743 slightly beyond the shoulders on the retaining pawls 740 to insure that said shoulders will move into the path of said ears. Simultaneously with the restoration of the actuators 606, the slot 747 (Fig. 51) in the pitman 746 for the adjacent lower order, in cooperation with the stud 748 in the transfer latch 735, restores said latch counter-clockwise against the action of the spring 737, from tripped position, as shown in Fig. 54, to the position shown in Fig. 51, in which the ear 738 on said latch moves into the path of the coresponding ear 739 on the actuator 606 to obstruct forward transfer movement of said actuator 606.

The restoration of the latches 735 takes place after the corresponding actuators 606 have been restored forwardly; consequently the ears 739 on said actuators are out of the path of the ears 738 on said latches at the time of such restoration. The counter-clockwise restoration of the latches 735 to the position shown in Fig. 51 moves the shoulders on their upper ends beyond the fingers 734, thus permitting the springs 737 to restore the pawls 720 and to move said fingers 734 into the paths of said shoulders to retain said latches in untripped position, as shown here.

After full movement of the shaft 745 and the fingers 744 counter-clockwise has restored the transfer mechanism, as explained above, said shaft, said fingers, and the pitmans 746 are restored part way clockwise, according to the time given in space 28, Fig. 60, to the position shown in Figs. 48 and 53. The shaft 745, the fingers 744, and the pitmans 746 remain in this partially restored position, in which they do not interfere with the tripping of the transfer mechanisms, until near the end of machine operation and until after the primary slides 103 and the secondary slides 109 have completed their forward return movements, as shown in space 2, Fig. 59, after which the cams 757 and 758, functioning according to the time given in space 28, Fig. 60, completes the clockwise return movement of said fingers 744 and pitmans 746 to release the pawls 740 in the same manner explained previously, to permit transfer movement forwardly of all tripped actuator racks 606.

Fugitive 1 mechanism

It will be recalled that the balance or auxiliary totalizer with which the present machine is equipped is arranged for computing complementary values, and for this reason it was necessary to set the plus wheels at 9 and the minus wheels at zero, which is the reverse of the usual practice in totalizers of this type, in which the plus and minus wheels of each denominational order are geared together for reverse movement. In this arrangement of the totalizer wheels, the entering of complementary values in the plus side of said totalizer, in adding operations, causes the corresponding minus wheels to be set to the true values of said complementary values, and consequently, in order to obtain a recording and indication of the true values, it is necessary, as long as the auxiliary totalizer is in a positive condition, to read and reset the minue wheels.

In subtract operations, the complementary values are added in the minus side of the balance totalizer, and, as long as said totalizer is not overdrawn, the minus wheels are set to the true values and consequently are read and reset in order to obtain a recording of said true values. If, during subtract operations, the auxiliary totalizer changes from a plus condition to a minus condition—that is, becomes overdrawn—the plus wheels will contain the true negative balance and are read and reset to obtain a recording of said true negative balance.

The indicator wheels 614 (Figs. 1, 45, 46, and 47) for each denominational order are geared to and driven by the corresponding plus and minus wheels. It will be recalled that the indicator wheels 614 have thereon two sets of numerals, one of which corresponds to the minus wheels of the same order, and the other set of which corresponds to the plus wheels of the same order. The shutter mechanism, which alternately reveals one set of numerals on the indicator wheels 614 and conceals the other set of numerals, functions automatically, and, when the auxiliary totalizer is in a positive condition, the minus set of numerals is exposed for reading purposes, and, when the auxiliary totalizer is in an overdrawn condition, the plus set of numerals is exposed for reading purposes. The plus and minus sets of numerals on the indicator wheels 614 may, if desired, be of different colors, so that the operator may readily distinguish a plus balance from a negative balance or overdraft.

It is a well-known fact that in conventional totalizers, in which the plus and minus wheels of each denominational order are geared together for reverse movement and in which the plus wheels are set at zero and the minus wheels set at 9, when the totalizer changes from a positive condition to a negative condition, it is necessary to enter a fugitive 1 into the lowest order minus wheel in order to offset the correction of an erroneous condition, which is a characteristic of this type of totalizer. Likewise, when totalizers of this type change from a negative condition to a positive condition, it is necessary to enter a fugitive 1 into the lowest order plus wheel to again correct the amount in said totalizer.

In the auxiliary totalizer of the present machine, which, as previously explained, deals in complementary values, and in which the plus wheels are set at 9 and the minus wheels at zero, it is necessary to enter a fugitive 1 in the lowest order every time the highest order wheel passes through zero, regardless of whether the auxiliary totalizer is in a positive condition or in an overdrawn condition, and regardless of whether the type of operation being performed is an adding operation or a subtracting operation. In other words, in adding operations in the auxiliary totalizer, every time the highest order adding wheel passes through zero, it is necessary to enter a fugitive 1 in the lowest order adding wheel in order to correct the totalizer, and in subtracting operations, every time the highest order subtract wheel passes through zero, it is also necessary to enter a fugitive 1 into the lowest order subtract wheel in order to correct the auxiliary totalizer, and the changing of the auxiliary totalizer from a positive condition to a negative condition or vice versa does not alter or in any way change the above-described sequence of the entering of the fugitive 1.

The long teeth on the highest order plus and minus wheels 610 and 611 (Fig. 49) cooperate with a hook-shaped tripping extension on a fugitive 1 trip pawl 760 free on a stud 761 secured in the highest order partition plate 86. A link 762 pivotally connects the pawl 760 to a crank 763 secured on the left-hand end of a shaft 764 journaled in the partition plates 86. Secured on the right-hand end of the shaft 764 (Figs. 49 and 50) is a fugitive 1 trip arm 766 having a shoulder 767, which engages an upward extension of a latch 768 free on a stud 769 in a bracket (not shown) similar to the bracket 733 (Fig. 48) for the lowest order denomination. A spring 765 (Fig. 49) urges the shaft 764 and the trip pawl 760 clockwise to normally maintain the tripping extension on said pawl in the path of the long tooth of the highest order adding or subtracting wheel 610 or 611, whichever is effective, and to maintain the shoulder 767 in yielding engagement with the upward extension of the latch 768, as shown in Fig. 50.

When the latch 768 is retained in untripped position by the arm 766, as shown in Fig. 50, a bent-over ear 770 on a forward extension of said latch is retained in the path of a similar ear 771 on the actuator rack 606 for the lowest order denomination to restrain said rack against forward transfer movement in exactly the same manner as explained in connection with the transfer mechanisms shown in Figs. 47 and 48.

In adding operations, the long tooth on the highest order plus wheel 610 is alined with the fugitive 1 trip pawl 760, and in subtracting operations the long tooth on the highest order minus wheel 611 is alined with said tripping pawl. Consequently, when either one of said wheels passes through zero while traveling in a clockwise or additive direction, the long tooth thereon wipes past the tripping extension on the pawl 760 and rocks said pawl and, through the link 762, the crank 763, the shaft 764, and the arm 766 (Figs. 49 and 50) a slight distance counter-clockwise against the action of the spring 765. This slight counter-clockwise movement of the arm 766 withdraws the shoulder 767 thereon from the upward extension of the latch 768 and releases said latch to the action of a spring 772, which immediately rocks said latch clockwise a slight distance until its upward extension contacts a stop shoulder 773 on the rear end of the arm 766. This clockwise movement of the latch 768 moves the ear 770 upwardly out of the path of the ear 771 on the actuator rack 606 for the lowest order, to free said rack for transfer movement upon subsequent release of its retaining pawl.

Even though the ear 770 is moved out of the path of the ear 771, the rack 606 (Fig. 50) is further restrained against transfer movement by a retaining pawl 774 free on the rearward stud 608 in the primary slide 103 for the lowest order. The pawl 774 is urged clockwise by a spring 775 to normally maintain a shoulder on a rearward extension thereof in the path of an ear 776 on the rearward end of the rack 606, to obstruct transfer forward movement of said rack 606 until said retaining pawl 774 is rocked to ineffective position near the end of machine operation. Near the end of machine operation, return movement of the shaft 745 and the finger 744 clockwise from the position shown in Fig. 48 to home position (Fig. 50) causes the camming surface 749 on the pitman 746 for the lowest order, in cooperation with a stud 777 in the retaining pawl 774, to rock said pawl counter-clockwise against the action of the spring 775 out of engagement with the ear 776. This releases the lowest order actuator rack 606 for forward transfer movement to enter the fugitive 1 in the lowest order plus or minus wheel 610 or 611, whichever is selected for actuation.

The movement of the transfer shaft 745 and the transfer finger 744 is given in space 28 of the chart, Fig. 60, from which it may be seen that, at the beginning of the next operation, after the set of wheels (plus or minus) selected in the previous operation have been disengaged from the actuators 606, counter-clockwise restoring movement is imparted to the shaft 745 and the restoring fingers 744, causing said restoring finger for the lowest order (Fig. 50) to engage the ear 776 and restore the lowest order actuator rack 606 rearwardly and to simultaneously withdraw the surface 749 from the stud 777 so that the retaining pawl 774 may be carried by the spring 775 into the path of said ear 776 to retain said lowest order rack 606 in restored or untripped position. Simultaneously a pitman 778, similar to and operating in unison with the pitmans 746, through a slot 779 in its forward extension, in cooperation with a stud 780 in a downward extension of the latch 768, restores said latch counter-clockwise against the action of the spring 772 to move the ear 770 into the path of the ear 771 and to simultaneously move the upward extension of said latch out of engagement with the shoulder 773 and beyond the shoulder 767, whereupon the spring 765 (Figs. 49 and 50) restores the arm 766, the shaft 764, and the fugitive 1 trip pawl 760 clockwise to untripped positions, as shown here.

The retaining pawls 749 (Fig. 47) for the different denominational orders of the machine and the retaining pawl 774 (Fig. 50) for the lowest order denomination are always rocked to ineffective positions near the end of each machine operation. However, the transfer latches 735 for all denominational orders, except the lowest order, and the fugitive 1 latch 768 for the lowest order obstruct transfer movement of their corresponding actuator racks 606 unless such latches have previously been tripped in the manner explained above.

It is believed that five different examples of computations in the auxiliary totalizer may be helpful in imparting a better understanding of the functioning of this totalizer.

*Example 1.*—For simplicity, let it be assumed that the auxiliary totalizer has three denominational orders instead of the ten denominational orders provided in the machine used to illustrate the present invention. Considering that the auxiliary totalizer is in a normal or zeroized condition—that is, the plus side at 9 and the minus side at zero—it is desired to add "234" into said totalizer. In adding operations, the plus wheels are engaged with the auxiliary actuators, and, inasmuch as said actuators are positioned by their corresponding primary differential slides to the complement of the true value, the complement of 234 (765) is added into the plus side of the auxiliary totalizer. The addition of the complementary value 765 to the plus side produces the sum 764, and, as the highest order wheel passes through zero, a fugitive 1 is entered in the lowest order, resulting in the final figure 765 on the plus side of the auxiliary totalizer and the true figure 234 on the minus side of said totalizer. In this case, as the minus side of the auxiliary totalizer contains the true value, this side will be read and/or reset, and likewise the minus numerals on the indicator wheels 614 (Fig. 45) will be exposed for reading purposes.

*Example 2.*—In Example 2, the plus and minus sides of the auxiliary totalizer are as they were left in Example 1—that is, standing at 765 and 234, respectively—and in this case it is desired to add 432 in said totalizer. The complement of 432 (567) is added in the plus side of the auxiliary totalizer, thus giving the sum of 332, and, inasmuch as the highest order wheel again goes through zero, a fugitive 1 is entered in the lowest order, making a final figure of 333 on the plus side and a final figure of 666 on the minus side, which in this case is the true value of the amount in the auxiliary totalizer.

*Example 3.*—In Example 3, the plus and minus wheels of the auxiliary totalizer are in the positions in which they were left at the end of Example 2—that is, at 333 and 666, respectively—and in this case it is desired to subtract 567 from said totalizer.

In subtract operations, the minus side of the auxiliary totalizer is engaged with the actuator racks, and, inasmuch as said racks are positioned to the complement of the true value, the complement of 567 (432) is entered additively into the minus side of the auxiliary totalizer, giving the sum of 098, and, as the highest order minus wheel has passed through zero, a fugitive 1 was entered in the lowest order, giving a final figure of 099 on the minus side of the auxiliary totalizer and 900 on the plus side.

In connection with Example 3, it will be seen that, as long as the balance totalizer remains in a positive condition—that is, not overdrawn—the minus wheels of said totalizer contain the true value, the same as in adding operations.

*Example 4.*—In Example 4, the plus and minus wheels of the auxiliary totalizer are in the positions in which they were left at the end of Example 3—that is, at 900 and 099, respectively—and in this example it is desired to subtract 765 from said totalizer.

As in the previous example, the complement of 765 (234) is added to the minus side of the auxiliary totalizer, giving the sum of 333 on said minus side, and in this case the highest order wheel does not pass through zero; consequently there is no entering of a fugitive 1, in the lowest order, and, as a result, the minus wheels remain at 333 and the corresponding plus wheels at 666.

It will be seen that in Example 4 the auxiliary totalizer changed from a positive condition to a negative condition and that regardless of this fact, if the highest order wheel of the minus side of said totalizer does not pass through zero, there is no entering of the fugitive 1, as in the case of conventional totalizers. It will likewise be seen that, when the auxiliary totalizer changes from a positive condition to a negative condition, the plus side of said totalizer contains the true negative balance, and in this case said wheels are read and reset in order to obtain a recording of said true negative balance. Likewise, when the auxiliary totalizer is overdrawn, the plus numerals on the indicator wheels 614 (Fig. 45) display the true negative balance and are exposed for reading purposes in such operations.

*Example 5.*—In Example 5, the plus and minus wheels of the auxiliary totalizer are in the positions in which they were left at the end of Example 4—that is, at 666 and 333, respectively—and in this case it is desired to subtract 123 therefrom. Adding the complement of 123 (876) to the minus side of the auxiliary totalizer gives the sum of 209, and, inasmuch as the highest order minus wheel passed through zero, a fugitive 1 is automatically entered in the lowest order to make a final figure of 210 in the minus side of the auxiliary totalizer and 789 in the plus side. Inasmuch as the auxiliary totalizer is still in an overdrawn condition, the plus wheels contain the true negative balance (789), and said plus wheels are therefore selected for reading and resetting, in case it is desired to obtain a recording of the true negative balance.

It should be remembered that amounts may be transferred from the auxiliary totalizer to any of the totalizers on the three transaction totalizer lines, and likewise, amounts may be transferred from any of the totalizers on the three transaction totalizer lines to the auxiliary totalizer.

As explained above, in overdraft operations the plus side of the auxiliary totalizer is read and reset in order to obtain a recording of the true negative balance. In resetting the plus side of the auxiliary totalizer, its wheels are left in a zeroized condition—that is, standing at zero—while the corresponding minus wheels are left standing at 9, which is the reverse of the normal result. However, this erroneous condition is corrected in the immediately following operation, whether it be an adding operation or a subtracting operation, by the entering of a plus or a negative amount into the auxiliary totalizer.

*Operation*

It is believed that a thorough understanding of the operation of the machine chosen to illustrate the present invention will have been obtained from a careful perusal of the preceding specification; however, a brief résumé of the operation of the machine may be helpful.

Directing attention to Fig. 1, which is a diagrammatic plan view of the keyboard of the machine of this invention, it will be recalled that the machine has three lines of transaction totalizers of the add-subtract type, each of which lines has nine sets of totalizer wheels thereon, and that the totalizers on each of the respective lines are selected and controlled for operation by means of a corresponding row of selecting and control keys 74 to 77 inclusive.

In addition to the three lines of transaction totalizers, the present machine also has a balance totalizer, often referred to herein as an auxiliary totalizer and sometimes referred to as a crossfooter. The auxiliary totalizer is selected and conditioned for operation by means of the control keys 78 to 84 inclusive, located at the extreme right-hand side of the keyboard. The control keys 78 to 84 inclusive for the auxiliary totalizer are motorized keys—that is, starting keys for initiating operation of the machine, and, in operations where it is desirable that the auxiliary totalizer not be selected and conditioned for operation, the Non-Add key 78 may be used as a regular starting bar.

The indicator wheels 614 (Fig. 1), which, it will be recalled, are controlled by the auxiliary totalizer, always indicate the amount in said totalizer, and this regardless of whether the amount is a positive amount or a negative amount.

In adding operations, the amount to be added is set up on the amount keys 73, after which the keys 77 are used to select the desired totalizer on any one of or on all of the three transaction totalizer lines, and, if it is desired to add this amount into the auxiliary totalizer, the Add key 79 is depressed to initiate operation of the machine and simultaneously select and condition the auxiliary totalizer for an adding operation. It will be remembered that the depression of any one of the selecting keys 77, in addition to selecting the corresponding totalizer on the corresponding line, also conditions said totalizer line for an adding operation. It will likewise be recalled that, when no key 77 is depressed, the corersponding transaction totalizer line is non-added.

During operation of the machine, the amount set up on the amount key 73 is entered additively into the selected transaction totalizers and simultaneously added into the auxiliary totalizer. Likewise, in adding operations, the amount set up on the amount key 73 is recorded upon the record material 181 (Fig. 2) and simultaneously visibly indicated by the displaying of the corresponding front and back indicator tables 202 and 203. Also the indicator wheels 614 show at all times the amount in the auxiliary totalizer.

In subtract operations, the amount to be subtracted is set up on the amount keys 73, the proper selecting key 77 is depressed, and the corresponding Subtract key 76 is depressed to select the desired totalizer and to cause the corresponding transaction totalizer line to be engaged and disengaged in subtract timing. If the amount of the subtract operation is to be subtracted in the auxiliary totalizer, the Subtract key 84 is depressed to select the minus side of said totalizer and to simultaneously initiate machine operation. During operation of the machine, the amount set up on the keyboard is subtracted from the selected transaction totalizer and simultaneously subtracted from the auxiliary totalizer. As in adding operations, the amount subtracted from the selected totalizer or totalizers is simultaneously recorded upon the record material 181 (Fig. 2) and indicated by the corresponding front and back indicator tablets 202 and 203.

While it is possible to add or subtract in the auxiliary totalizer and in the selected totalizers on the No. 1, No. 2, and No. 3 transaction totalizer line at the same time, it is impossible to perform totalizing operations, including reading and resetting operations, in more than one of the totalizers at a time. However, amounts read or reset from any totalizer may be added to or subtracted from the other totalizers at the same time, if desirable.

In reading operations, in the transaction totalizers, the Read keys 74 are used in conjunction with the corresponding selecting keys 77, and in resetting operations the Reset keys 75 are used in conjunction with the corresponding selecting keys 77 to record the total amounts in the selected totalizers. In resetting operations, the wheels of the selected totalizer remain in a zeroized condition at the end of machine operation, and in reading operations the wheels of the selected totalizer are returned to their original positions after the total is recorded.

Ordinarily, in reading operations, the amounts are not transferred from the totalizer being read to other totalizers, and in this case the Non-Add key 78 is used to initiate operation of the machine. In resetting operations in the transaction totalizers, if it is desired to transfer the amount being cleared from the selected totalizer additively to the auxiliary totalizer, the Add key 79 is used to initiate operation of the machine, and, if it is desired to transfer the amount being cleared from the selected totalizer subtractively into the auxiliary totalizer, the Subtract key 84 is used to initiate operation of the machine. Likewise, amounts cleared from any totalizer on one of the transaction totalizer lines may be transferred additively to the selected totalizers on the other two transaction totalizer lines by depression of the proper selecting keys 77, and such amounts may be transferred subtractively to said selected transaction totalizers by depression of the Subtract keys 76 in conjunction with the corresponding selecting keys 77.

To read and reset the auxiliary totalizer, the Sub-Balance key 80 (Fig. 1) and the Balance key 81 are used respectively when said totalizer is in a positive condition and the Sub-Balance of Overdraft key 83 and the Balance of Overdraft key 82 are used respectively when said totalizer is in an overdrawn condition. Either positive or negative amounts cleared from the auxiliary totalizer may be transferred additively or subtractively to any desired transaction totalizer by depression of the proper selecting keys 77 in adding operations, and by use of the Subtract keys 76 in conjunction with said selecting keys 77 in subtracting operations.

The machine chosen to illustrate the present invention is very flexible in nature and may be used to solve the accounting problems encountered in substantially all present-day business systems.

For example, the machine may be used as a bank service or commercial posting machine for solving the accounting problems in connection with individual checking accounts, including the issuing of periodical statements for each of the individual checking accounts. In using the machine as a bank service machine, the first row of selecting keys 77 (Fig. 1) may be used to designate withdrawal items and the second row of selecting keys 77 may be used to designate deposit items, while the third row of selecting keys 77 may be used to designate group totals of all deposits, all withdrawals, total old balances, total new balances, etc.

In the posting of individual checking accounts, which usually takes place daily in all active accounts, the amount of the customer's old or previous balance is ascertained from his ledger card, set up on the amount keys 73, and entered in the plus side of the auxiliary totalizer by use of the Add key 79. Next, the various withdrawal and other debit items are subtracted from the previous balance, and the various deposit and other credit items are added thereto, and a new balance is arrived at and recorded upon the ledger card by reading or resetting the auxiliary totalizer in the manner explained previously. If the new balance is a positive amount, as ascertained by viewing the indicator wheels 614, the Sub-Balance key 80 and the Balance key 81 are used, respectively, in sub-balance and balance operations to record a new balance, and, if the new balance is a negative amount, as ascertained by viewing the indicator wheels 614, the Sub-Balance of Overdraft key 83 and the Balance of Overdraft key 82 are used to record the amount of the new balance.

Likewise, the machine of this invention may be easily adapted for use in solving the accounting problems in connection with the rendering of statements by various public utility concerns. In such use, the selecting keys 77 in the first row and their corresponding transaction totalizers may be used for various service items, and the selecting keys in the second row and their corresponding totalizers may be used for various items of merchandise sold to subscribers by the public utility concern, while the third row of selecting keys 77 and their corresponding totalizers may be used for various miscellaneous items or for totals of certain service items and/or certain items of merchandise.

Another good example of use of the machine of this invention is in solving the accounting problems of merchandising establishments. In such use, the first row of selecting keys 77 (Fig. 1) and their corresponding transaction totalizers may be used for accumulating the total sales of the clerks in certain departments, the second row of selecting keys 77 and their corresponding totalizers may be used for totals of certain articles of merchandise, and the third row of selecting keys 77 and their corresponding totalizers may be used to accumulate totals of the combined sales of several items, or the combined sales of several departments, etc. Also, in adapting the machine for use in merchandising establishments, the third row of selecting keys 77 may be used to accumulate totals of cash transactions, charge transactions, received-on-account transactions, etc.

Many merchandising establishments have a system whereby the customers may build up a cash balance for use in purchasing various desirable items by systematically depositing amounts to the credit of their accounts and, when purchasing various articles, instead of charging these articles, have their cost deducted from the cash balances. This system is similar in many respects to certain banking systems, and, as a rule, merchandising establishments employing systems of this kind prepare and send a monthly statement to their customers showing the deposits and the withdrawals during the preceding fiscal month and the balance of their accounts at the end of said month. In auditing accounts of this nature, the auxiliary totalizer may be used, the same as explained in connection with bank service machines for posting the credit items in the nature of deposits and for posting the debit items in the nature of goods purchased by the customer, these computations resulting in a balancing of the customer's account.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, the combination of a denominational order of digital elements; means to record and indicate the value of the effective digital element; means to drive the recording and indicating means; a primary differential member constructed and arranged to be positioned by the effective digital element; a pinion driven by the primary member; a primary lug integral with the primary pinion; a secondary differential member constructed and arranged to be positioned by the primary member; a pinion driven by the secondary differential member; a secondary lug integral with the secondary pinion; means to connect the differential members for complementary movement; means coacting with the connecting means to drive the members to cause the primary member and the primary lug to be positioned by the effective digital element to the complementary value thereof, and to cause the secondary member and the secondary lug to be positioned by the primary member to the true value of said effective digital element; and means including a pinion operatively connected to the driving means for the recording and indicating means, and lugs integral with said pinion, said lugs coacting with the primary and secondary lugs to position said driving means and the recording and indicating means in accordance with the true value of the effective digital element.

2. In a machine of the class described, having a denominational order of digital elements, and means to record and indicate the value of the effective digital element, the combination of a primary differential member constructed and arranged to be positioned by the effective digital element; a secondary differential member constructed and arranged to be positioned by the primary member; means to connect the differential members for complementary movement; means to drive the recording and indicating means; means including a first lug operatively connected to the driving means, said lug, the driving means, and the recording and indicating means arranged to remain in set positions at the end of machine operation; means coacting with the driving means at the beginning of each machine operation to restore said driving means, the lug, and the recording and indicating means from set position to an initial or starting position; means including a second lug operatively connected to and positioned by the secondary member in accordance therewith; and means coacting with the connecting means for the members to impart an initial movement to said members to cause the primary member to be positioned by the effective element to the complementary value thereof and to cause the secondary member and the second lug to be positioned by the primary member to the true value of said effective element, said second lug while being positioned arranged to coact with the first lug to move the recording and indicating means in unison therewith from starting position to a position corresponding to the true value of said effective element, said imparting means also effective to impart return movement to the primary and secondary differential members to withdraw the second lug from the first lug without interfering with the position of said lug so that the recording and indicating means will remain in set position and continue to display the value of the effective digital element after machine operation has been terminated.

3. In a machine of the character described capable of several types of machine operations, said machine having a totalizer, the combination of a denominational order of digital elements for setting up values to be entered in the totalizer; a first differential member coacting with the elements; a second differential member coacting with the totalizer; means to connect the members for complementary movement; means to drive the members; positionable recording means, said means arranged to remain positioned at the end of machine operation; means to restore the recording means in one direction in one type of machine operation and in another direction in another type of machine operation; means operated by the second member and coacting with the recording means, when same is restored in said one direction, to position said recording means; and means operated by the first member and coacting with the recording means when same is restored in said another direction to position said recording means.

4. In a machine of the class described, capable of various types of operations, said machine having a totalizer and digital elements for setting up values to be entered in said totalizer, said machine also having means to record said digital values and the values in the totalizer, the combination of a first member coacting with the elements; a second member coacting with the totalizer, said members connected for complementary movement; means to drive the members; means to position the recording means; means to restore the positioning means from preset position to a starting position in one direction in one type of machine operation and in another direction in another type of machine operation; means operating in unison with the second member and coacting with the positioning means, when it is restored in said one direction, to position the recording means to the values of the effective digital elements; and means operating in unison with the first member and coacting with the positioning means, when it is restored in said another direction, to position the recording means to the values in the totalizer.

5. In a machine of the class described, capable of adding, subtracting, and total-taking operations, said machine having a totalizer and amount elements for setting up values to be entered in the totalizer, said machine also having recording means for recording the values entered in the totalizer and the values taken from said totalizer, the combination of a first member coacting with and positioned by the elements; a second member connected to the first member for complementary movement in relation thereto, said second member coacting with the totalizer for entering values therein and for taking values therefrom; means to drive the members; means to position the recording means; means to restore the positioning means and the recording means from preset position in one direction to a starting position in adding and subtracting operations, and to restore said positioning means and the recording means from preset position in another direction to a starting position in total-taking operations; means operably connected to the second member and coacting with the positioning means, in adding and subtracting operations, to position the recording means to the values being entered in the totalizer; and means operably connected to the first member and coacting with the positioning means, in total-taking operations, to position the recording means to the values being taken from the totalizer.

6. In a machine of the class described, capable of amount entering and total-taking operations, said machine having a totalizer, amount elements for setting up values to be entered in the totalizer, and recording means for recording the values entered in the totalizer and the values taken from said totalizer, the combination of a first member coacting with and positioned by the elements in amount entering operations; a second member coacting with and positioned by the totalizer in total-taking operations; means to connect and drive the members in complementary relationship to each other, whereby the positioning of the first member is transmitted to the second member and the totalizer and whereby the positioning of the second member is transmitted to the first member; means to position the recording means; means operably connected to the second member and coacting with the positioning means in amount entering operations to position the recording means to the value being entered in the totalizer; means operably connected to the first member and coacting with the positioning means in total-taking operations to position the recording means to the value taken from the totalizer; and means to move the positioning means into position to be actuated by the second member in amount entering operations and into position to be actuated by the first member in total-taking operations.

7. In a machine of the class described, capable of amount entering and total-taking operations, said machine having a totalizer and means to record values entered in the totalizer and values taken from the totalizer, the combination of elements for setting up values to be entered in the totalizer; two members connected for complementary movement in relation to each other, the first of said members coacting with the elements and the second of said members coacting with the totalizer; means to position the recording means; means operated by the second member and coacting with the positioning means to position the recording means to the value of the effective amount element; means operated by the first member and coacting with the positioning means to position the recording means to the values taken from the totalizer; and means, including a reversible mechanism and controllable operating means therefor, to move the positioning means into cooperative relationship with the means operated by the second member in amount entering operations and to move the positioning means into cooperative relationship with the means operated by the first member in total-taking operations.

8. In a machine of the character described, capable of amount entering and total-taking operations, said machine having a totalizer and means to record values entered in the totalizer, and values taken from the totalizer, the combination of elements for setting up values to be entered in the totalizer; a first member coacting with and positioned by the elements in amount entering operations; a second member coacting with the totalizer to enter values therein and to take totals therefrom, said second member positioned by the totalizer in total-taking operations; means to connect and drive the members in complementary relationship to each other, whereby the positioning of the first member is transmitted to the second member and the totalizer, and whereby the positioning of the second member is transmitted to the first member; means to drive the recording means; means operating in unison with the second member and coacting with the driving means to position the recording means to the value of the effective element; means operating in unison with the first member and coacting with the driving means to position the recording means to the value of the total taken from the totalizer; and reversible means to move the driving means into cooperative relationship with the means operating in unison with the second member in amount entering operations, said means effective to move the driving means into cooperative relationship with the means operating in unison with the first member in total-taking operations.

9. In a machine of the class described, capable of amount entering and total-taking operations, said machine having a totalizer and means to record values entered in the totalizer and values taken from the totalizer, the combination of elements to set up values to be entered in the totalizer; a first member positioned by the elements to the complement of the values of said elements; a second member positioned by the first member to the true values of the elements, said second member coacting with the totalizer to enter values therein and to take values therefrom; means to drive the recording means; means operated by the second member and coacting with the driving means in amount entering operations to position the recording means to the values of the elements; means operated by the first member and coacting with the driving means in total-taking operations to position the recording means to the values taken from the totalizer; and means, including a reversible mechanism, to move the driving means into cooperative relationship with the means operated by the second member in amount entering operations and to move the driving means into cooperative relationship with the means operated by the first member in total-taking operations.

10. In a machine of the class described, capable of amount entering and total-taking operations, said machine having a totalizer, elements to set up amounts to be entered in the totalizer, and means to record amounts entered in the totalizer, and amounts taken from the totalizer, the combination of a first and a second differential member, said members connected for complementary movement, said first member coacting with and positioned by the elements, and said second member coacting with the totalizer to enter amounts in said totalizer and to take totals therefrom; driving means for the recording means, said driving means and said recording means remaining in set positions at the end of machine operation; means operated by the first member and positioned in relation thereto, said means coacting with the driving means; means operated by the second member and positioned in relation thereto, said means coacting with the driving means; and means effective in amount entering operations to move the driving means from preset position into cooperative relationship with the means operated by the second member to restrain said member against movement until the first member has been positioned by the effective amount element, whereupon said second member and the means operated thereby move the driving means and the recording means to the amount set up on the element, said moving means also effective in total-taking operations to move the driving means from preset position into cooperative relationship with the means operated by the first member to restrain said member against movement until the second member has been positioned by the totalizer, whereupon the first member and the means operated thereby move the driving means and the recording means to the amount taken from the totalizer.

11. In a machine of the character described, capable of amount entering and total-taking operations, said machine having a totalizer, elements to set up amounts to be entered in the totalizer, and recording means to record the values of amounts entered in the totalizer and the values of amounts taken from the totalizer, the combination of a first differential member positioned by the elements in amount entering operations; a second differential member positioned by the first differential member in amount entering operations and effective to position said first member in total-taking operations, said second member coacting with the totalizer to enter amounts therein and to take totals therefrom; means including a first projection operated by the first member; means including a second projection operated by the second member; driving means including elements operably connected to the recording means and a third projection co-operating with the other projections, said driving means and said recording means constructed and arranged to remain in set positions at the end of machine operation; and means effective in the beginning of amount entering operations to restore the driving means from preset position to move the third projection into the operating range of the second projection, to place a restraining load upon the second member so that the first member will be positioned by the effective amount element, after which said second member and said second projection position the recording means to the value of the amount and enter same in the totalizer, said restoring means also effective in the beginning of total-taking operations to restore the driving means from preset position to move the third projection into the operating range of the first part to place a restraining load upon the first member so that the second member will be positioned by the totalizer, after which said first member and said first projection position the recording means to the value of the amount taken from the totalizer.

12. In a machine of the class described, capable of amount entering and total-taking operations, said machine having a totalizer and elements to set up amounts to be entered in the totalizer, the combination of a first member positioned by the amount elements; a second member coacting with the totalizer to enter amounts therein and to take amounts therefrom, said members connected for complementary movement whereby the first member positions the second member in amount entering operations and whereby the second member positions the first member in total-taking operations; means operated by the second member to latch the first member in set position in amount entering operations; means operated by the first member to latch the second member in set position in total-taking operations; and means effective in amount entering operations to render the first latching means effective and to simultaneously render the second latching means ineffective, said means effective in total-taking operations to render the second latching means effective and the first latching means ineffective.

13. In a machine of the character described, capable of amount entering and total-taking operations, said machine having a totalizer, elements to enter amounts in the totalizer, and means to record amounts entered in the totalizer and to record amounts taken from said totalizer, the combination of a first member positioned by the elements; a second member coacting with the totalizer to enter amounts therein and to take amounts therefrom; means to connect the members for complementary movement whereby the first member positions the second member in amount entering operations and whereby the second member positions the first member in total-taking operations; means operated by the second member to position the recording means in amount entering operations; means operated by the first member to position the recording means in total-taking operations; means operated by the second member to latch the first member in set position in amount entering operations to insure that the second member positions the recording means; means operated by the first member to latch the second member in set position in total-taking operations to insure that the first member positions the recording means; and means effective in amount entering operations to render the first latching means effective and to simultaneously render the second latching means ineffective, said means effective in total-taking operations to render the second latching means effective and to simultaneously render the first latching means ineffective.

14. In a machine of the class described, capable of amount entering and total-taking operations, said machine having a totalizer, elements to set up amounts to be entered in the totalizer, and means to record amounts entered in the totalizer and to record amounts taken from the totalizer, the combination of means to drive the recording means; a first differential member positioned by the amount elements; a second differential member coacting with the totalizer to enter amounts therein and to take amounts therefrom; means to connect the members for complementary movement whereby the first member positions the second member in amount entering operations and whereby the second member positions the first member in total-taking operations; means coacting with the connecting means to actuate the members; means operated by the second member and coacting with the driving means to position the recording means in amount entering operations; means operated by the first member and coacting with the driving means to position the recording means in total-taking operations; means operated by the second member to latch the first member in set position; means operated by the first member to latch the second member in set position; and means to control the latching means to cause the first latching means to be effective in amount entering operations and to cause the second latching means to be effective in total-taking operations.

15. In a machine of the class described, having means to record and indicate amounts, the combination of a denominational order of elements to set up amounts; a differential mechanism positioned by the effective element to the value thereof; means including a first segment positioned by the differential mechanism; means including a second segment positioned by the first segment and operatively connected to the recording and indicating means; a latch normally effective to connect the segments for unitary movement to transmit the positioning of the differential mechanism to the recording and indicating means; and means effective when no amount element is effective to first unlatch the latch and then move the second segment and the recording and indicating means independently of the first segment to a non-recording and a non-indicating position to eliminate the recording and indication of zeros.

16. In a machine of the character described, having means to record amounts and means to indicate amounts, the combination of elements to set up amounts to be recorded and indicated; a first differential member positioned by the elements; a second differential member positioned by the first member; a device operating in unison with the second member; a first part positioned by the device to the value of the effective amount element; a second part operatively connected to the recording means and to the indicating means; a latch normally effective to connect the parts to transmit the positioning of the first part to the recording and indicating means; and means effective when no amount element is effective to unlatch the latch and move the second part and the recording and indicating means to a non-recording and indicating position to eliminate the recording and indication of zeros.

17. In a machine of the character described, having means to record amounts, means to indicate amounts, and elements to set up amounts to be recorded and indicated, the combination of a differential device comprising primary and secondary members connected for complementary movement, said primary member positioned by the effective amount element; a first part; a second part operatively connected to the recording and indicating means; a latch on the second part and normally effective to connect it to the first part; means controlled by the members and coacting with the first part to position it, the second part, and the recording and indicating means in accordance with the effective amount element, said parts and connected mechanism arranged to remain positioned at the end of machine operation; means to restore the parts and connected mechanism from preset position to zero position; and means coacting with the latch and the second part, after they have been restored and when no amount element is effective, to disconnect said latch and to move said second part, the recording means, and the indicating means from zero position to a non-recording and a non-indicating position to prevent the recording and indication of zeros, said means also effective to restore said part to zero position and to reconnect the latch.

18. In a machine of the character described, capable of amount-entering and total-taking operations, said machine having a totalizer, and elements to set up amounts to be entered in the totalizer, the combination of a differential device coacting with the elements and the totalizer, said device positioned by the elements in amount-entering operations and positioned by the totalizer in total-taking operations; means to record and indicate the amounts entered in or taken from the totalizer; means to transmit the positioning of the differential device to the recording and indicating means, said transmitting means and the recording and indicating means constructed and arranged to remain in set positions at the end of machine operation; means to restore the transmitting means and the recording and indicating means to a neutral or starting position at the beginning of each machine operation, as a preliminary step to the positioning of said mechanisms; an aliner for the transmitting means; movable means operative to move the aliner to effective position after the transmitting means and the recording and indicating means have been positioned to retain said mechanisms in set positions, said movable means also operative at the beginning of each machine operation to move the aliner to ineffective position to free said transmitting means and the recording and indicating means for restoring and positioning movements; and manually operable means to render the restoring means and the moving means inoperative to cause the transmitting means to be retained in preset positions and control the positioning of the differential device in accordance with said preset position to repeat the amount of the previous operation.

19. In a machine of the class described, capable of amount entering and total-taking operations, said machine having a totalizer, elements to set up amounts to be entered in the totalizer, and recording and indicating means to record and indicate amounts entered in or taken from the totalizer, the combination of a differential device comprising complementary positionable members, one of which coacts with the elements and the other of which coacts with the totalizer, said device positioned by the elements in amount entering operations and positioned by the totalizer in total-taking operations; means operable by the members and coacting with the recording and indicating means to position them, said means operable by the members and said recording and indicating means arranged to remain in set position at the end of machine operation; means effective at the beginning of machine operation to restore the means operable by the members and the recording and indicating means from preset position to a neutral position as a preliminary step to the positioning of said recording and indicating means; means movable to effective position to secure the means operable by the members and the recording and indicating means in set positions, said securing means also movable to ineffective position to free said means operable by the members and the recording and indicating means while they are being restored and positioned; and manually operable means to render the restoring means inoperative and to prevent movement of the securing means to ineffective position to cause the means operable by the members and the recording and indicating means to control the positioning of the differential members in accordance with the preset position of said recording and indicating means to repeat the amount of the previous operation.

20. In a machine of the class described, capable of amount entering and total-taking operations, said machine having a totalizer, elements to set up amounts to be entered in the totalizer, and means to record and indicate amounts entered in and/or taken from the totalizer, the combination of a differential member coacting with the amount elements; a differential member coacting with the totalizer; means to connect and to operate the differential members in complementary relationship to each other; means to drive the recording and indicating means, said driving means and said recording and indicating means arranged to remain in set position at the end of machine operation; means controlled by the differential members and coacting with the driving means to position the recording and indicating means in amount entering and total-taking operations; and means to control the driving means to cause it to position the differential members to repeat the amount of the previous operation.

21. In a machine of the character described, capable of amount entering and total-taking operations, said machine having a totalizer, elements to set up amounts to be entered in the totalizer, and means to record the amounts entered in and taken from the totalizer, the combination of means to drive the recording means, said driving means and said recording means arranged to remain in set position at the end of machine operation; a differential device comprising a member coacting with the elements and a member coacting with the totalizer, said members connected to each other for complementary movement, both of said members coacting with the driving means whereby amounts set up on the amount elements are transferred to the totalizer and the recording means, and whereby amounts taken from the totalizer are transferred to the recording means; and manually operable means to control the driving means to cause it to remain in preset position and to position the differential members in accordance therewith to repeat the amount of the preceding operation.

22. In a machine of the class described, capable of amount-entering and total-taking operations, said machine having a totalizer, elements to set up amounts to be entered in the totalizer, and means to record and indicate amounts entered in the totalizer and amounts taken from the totalizer, the combination of a differential device including complementary movable members, one of which coacts with the amount elements and the other of which coats with the totalizer to position said differential device according to the effective amount element in amount-entering operations and to position said differential device according to the amount taken from the totalizer in total-taking operations; means to operatively connect the recording and indicating means to the differential device to transmit the positioning of said device to said recording and indicating means in amount entering, and in total-taking operations, said connecting means and the recording and indicating means, arranged to remain in set positions at the end of machine operations; means to secure the connecting means and the recording and indicating means in set positions; means to restore the connecting means and the recording and indicating means from set position to a starting position at the beginning of each machine operation; and means to control the securing means and the restoring means to cause the connecting means and the recording and indicating means to be retained in preset position, and position the differential device accordingly, to repeat the amount of the preceding operation.

23. In a machine of the class described, capable of value entering operations, said machine having a totalizer, the combination of elements to set up values to be entered in the totalizer; means to record and indicate the values entered in the totalizer; means to drive the recording and indicating means; a differential device comprising complementary movable members, one of which coacts with the effective amount element and the other of which coacts with the totalizer to enter the values of the effective element therein; means connecting the differential device to the driving means to position the recording and indicating means to the values of the effective element, said driving means and said recording and indicating means arranged to remain in set position at the end of machine operation and returnable to a starting position at the beginning of the next machine operation; and manually operable means to control the driving means to cause the connecting means to position the differential device to repeat the amount of the preceding operation.

24. In a machine of the class described, capable of amount entering operations and having a totalizer to receive amounts, the combination of amount elements; a differential device comprising complementary positionable members, one of which coacts with the effective amount element and the other of which coacts with the totalizer, to enter the value of said effective element in said totalizer; positionable means adjustable under control of the complementary differential members, said positionable means arranged to remain in set position at the end of machine operation; means to return the positionable means from preset position to home position in the succeeding operation; and manually operable means to render the returning means ineffective to cause the positionable means to remain in preset position and to in turn position the differential device in accordance therewith to repeat the amount entered in the totalizer.

25. In a machine of the character described, capable of amount entering operations, said machine having a totalizer to receive amounts, the combination of elements to set up amounts to be entered in the totalizer; a differential device comprising complementary movable members, one of which coacts with the elements and the other of which coacts with the totalizer for entering an amount in said totalizer; a segment; means to transfer the setting of the differential device to the segment; and means to subsequently control the segment to cause it, through the transferring means, to transfer the setting of said segment to the differential device to effect a repeat entry of the amount in the totalizer.

26. In a machine of the class described, capable of amount entering operations and having a totalizer to receive amounts, the combination of elements to set up amounts to be entered in the totalizer; a differential device comprising complementary movable members, one of which coacts with the elements and the other of which coacts with the totalizer for entering an amount in said totalizer; a segment; means to transfer the setting of the differential device to the segment, said segment arranged to remain in set position at the end of machine operation; means to secure the segment in set position; means to return the segment to a neutral position at the beginning of the next operation; and means to control the securing means and the returning means to cause the segment to remain secured in preset position so that said segment through the transferring means will transfer its setting to the differential device to effect a repeat entry of the amount in the totalizer.

27. In a machine of the character described, capable of total-taking operations and having a totalizer, the combination of a differential device comprising complementary movable members to zeroize the totalizer to take a total therefrom; means controlled by the complementary movable members to record and indicate the total taken from the totalizer, said recording and indicating means arranged to remain in set position at the end of total-taking operations; means to secure the recording and indicating means in set position; means effective in the next operation to return the recording and indicating means to a starting position; and manually operable means to control the securing means and the returning means to cause the recording and indicating means to remain secured in preset position to repeat the amount taken from said totalizer.

28. In a machine of the character described, having a plurality of totalizers, said machine capable total-taking and total-transfer operations, the combination of a differential device comprising complementary movable members, coacting with the totalizers to take totals therefrom; means to record and indicate the totals taken from the totalizers; a driving element for the recording and indicating means; means operably connecting the element to the complementary movable members to transfer the positioning of said members to said element and to the recording and indicating means, and, conversely, to transfer the positioning of said element and the recording and indicating means back to said differential members, said element and the recording and indicating means arranged to remain in set position at the end of machine operation; means to secure the element and the recording and indicating means in set positions; means to move the element and the recording and indicating means from preset position to starting position in the succeeding operation; and manually controlled means operable prior to the succeeding machine operation to control the securing means and to control the moving means to cause the element and the recording and indicating means to transfer their setting back to the differential members, to position said members according to the amount of the previous total operation, said members in turn arranged to transfer said amount to a selected totalizer to transfer a total from one totalizer to another.

MAXIMILIAN M. GOLDBERG.

REFERENCES CITED

The following references are of record in the file of this patent:

UNITED STATES PATENTS

| Number | Name | Date |
|---|---|---|
| 1,202,800 | Carroll | Oct. 31, 1916 |
| 1,233,492 | Martin | July 17, 1917 |
| 1,706,726 | Brand | Mar. 26, 1929 |
| 1,879,245 | Hogfors | Sept. 27, 1932 |
| 2,070,419 | Bornkessel | Feb. 9, 1937 |
| 2,139,718 | Breitling | Dec. 13, 1938 |
| 2,167,771 | Neureiter | Aug. 1, 1939 |
| 2,178,272 | Vigborg | Oct. 31, 1939 |
| 2,192,164 | Neureiter et al. | Feb. 27, 1940 |
| 2,289,055 | Landsiedel | July 7, 1942 |